United States Patent [19]

Bogan et al.

[11] Patent Number: 4,490,819

[45] Date of Patent: Dec. 25, 1984

[54] RATE CONVERTER

[75] Inventors: Leonard E. Bogan; Paul H. Knapke, both of Columbus; Robert L. Miller, Westerville, all of Ohio

[73] Assignee: International Telephone and Telegraph Corporation, New York, N.Y.

[21] Appl. No.: 370,608

[22] Filed: Apr. 22, 1982

[51] Int. Cl.³ .............................................. H04J 3/02
[52] U.S. Cl. ....................................... 370/84; 370/100
[58] Field of Search ............................ 370/84, 100, 91

[56] References Cited

U.S. PATENT DOCUMENTS

| | | | |
|---|---|---|---|
| 3,982,074 | 9/1976 | Clark | 370/84 |
| 4,058,682 | 11/1977 | Delle Donne et al. | 370/100 |
| 4,229,815 | 10/1980 | Cummiskey | 370/91 |
| 4,313,198 | 1/1982 | Mazzocchi | 370/100 |
| 4,322,844 | 3/1982 | Fellinger et al. | 370/84 |
| 4,402,079 | 8/1983 | Fellinger et al. | 370/84 |

FOREIGN PATENT DOCUMENTS 0060130  5/1981  Japan .................................... 370/84

*Primary Examiner*—Douglas W. Olms
*Assistant Examiner*—Wellington Chin
*Attorney, Agent, or Firm*—John T. O'Halloran; Jeffrey P. Morris; Alfred C. Hill

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. A first processor is utilized to communicate with the central office switching system and to coordinate the operations within the line switch module. A second processor is provided to control clock generation and rate conversion circuits. Each group of line circuits includes a third processor to control the operations of the line circuits and to gather information from the line circuit. A busing arrangement is provided within the line switch such that both control information and PCM voice data are routed throughout the line switch.

The bus arrangement operates at a data rate higher than that of the PCM lines. A rate converter serves to interface two PCM lines to an internal PCM bus by interleaving channels from the two PCM lines onto the PCM bus and by further providing an additional control channel on the PCM bus. The rate converter further serves to demultiplex channels from the PCM bus onto the PCM lines.

14 Claims, 79 Drawing Figures

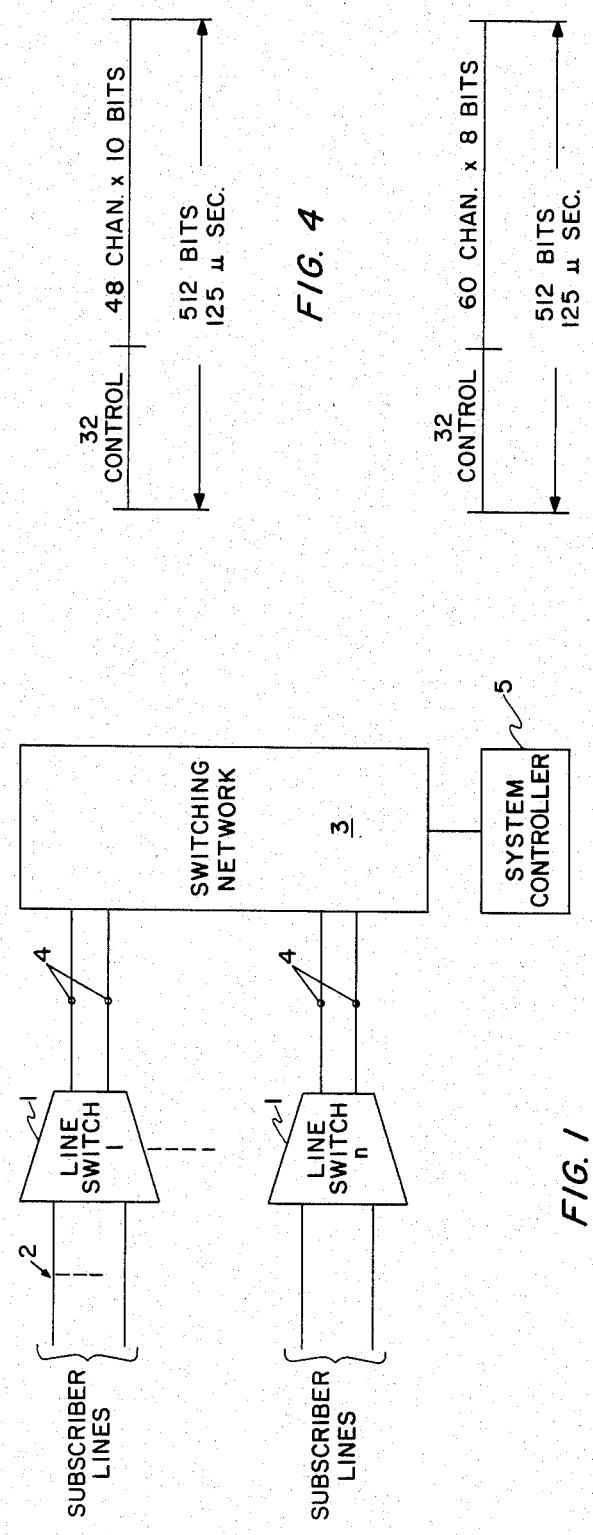
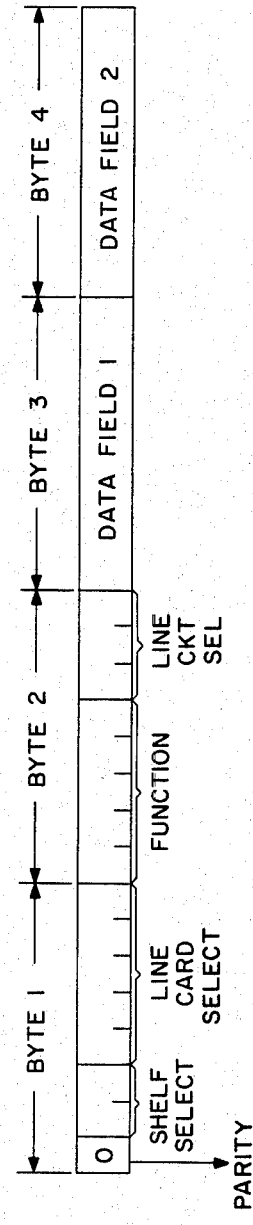

| LINE SWITCH CONFIGURATION | TRAFFIC | |
|---|---|---|
| | 24 CHANNEL | 32 CHANNEL |
| 160 SUBSCRIBER LINES — MODULE Ia / MODULE Ib — PCMA, PCMA — 160 SUBSCRIBER LINES | 32.2E TOTAL .1E./LINE | 42.3E TOTAL .132 E/LINE |
| 160 SUBSCRIBER LINES — MODULE Ia / MODULE Ib — PCMA, PCMB, PCMA — 160 SUBSCRIBER LINES | 52.7E TOTAL .164 E./LINE | 68.6E TOTAL .214 E./LINE |
| 160 SUBSCRIBER LINES — MODULE Ia / MODULE Ib — PCMA, PCMB, PCMA, PCMB — 160 SUBSCRIBER LINES | 73.9E TOTAL .23 E./LINE | 95.5E TOTAL .298E./LINE |

FIG. 3

| LINE SWITCH CONFIGURATION | TRAFFIC | |
|---|---|---|
| | 24 CHANNEL | 32 CHANNEL |
| 160 SUBSCRIBER LINES<br>192 SUBSCRIBER LINES<br>MODULE Ia — PCMA<br>MODULE Ic<br>MODULE Ib — PCMA<br>160 SUBSCRIBER LINES | 32.2E TOTAL<br>.063E/LINE | 42.3E TOTAL<br>0.83E/LINE |
| 160 SUBSCRIBER LINES<br>192 SUBSCRIBER LINES<br>MODULE Ia — PCMA, PCMB<br>MODULE Ic<br>MODULE Ib — PCMA<br>160 SUBSCRIBER LINES | 52.7E TOTAL<br>.103E/LINE | 68.6E TOTAL |
| 160 SUBSCRIBER LINES<br>192 SUBSCRIBER LINES<br>MODULE Ia — PCMA, PCMB<br>MODULE Ic<br>MODULE Ib — PCMA, PCMB<br>160 SUBSCRIBER LINES | 73.9E TOTAL<br>.144E/LINE | 95.5E TOTAL<br>.186E/LINE |

FIG. 3A

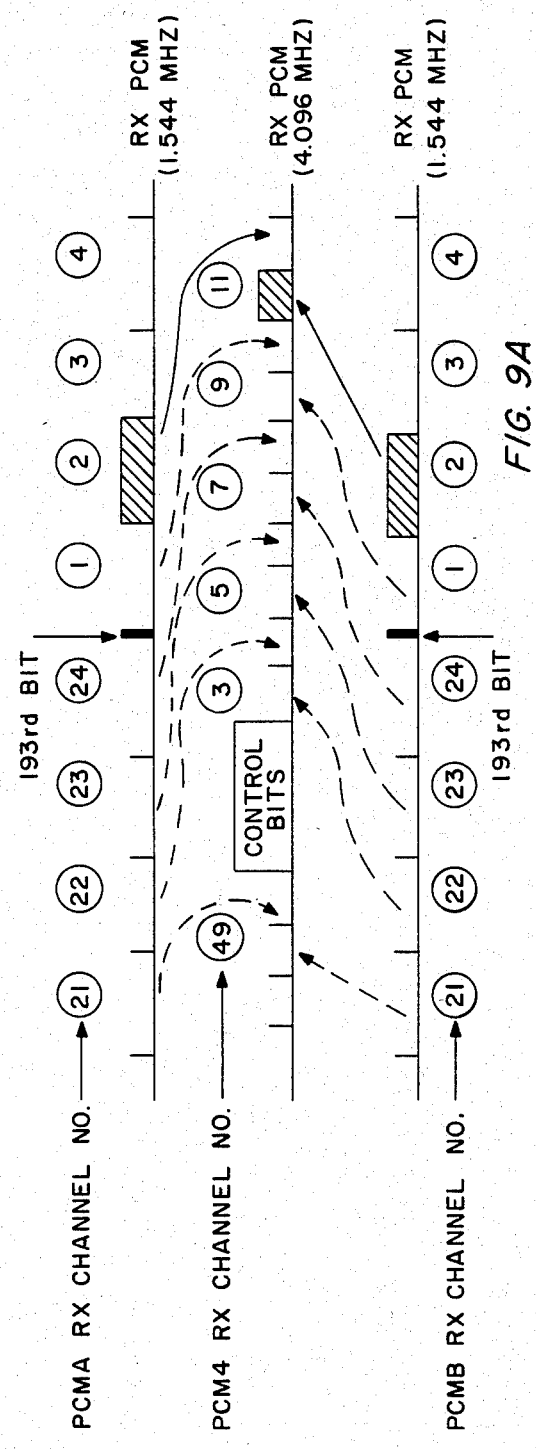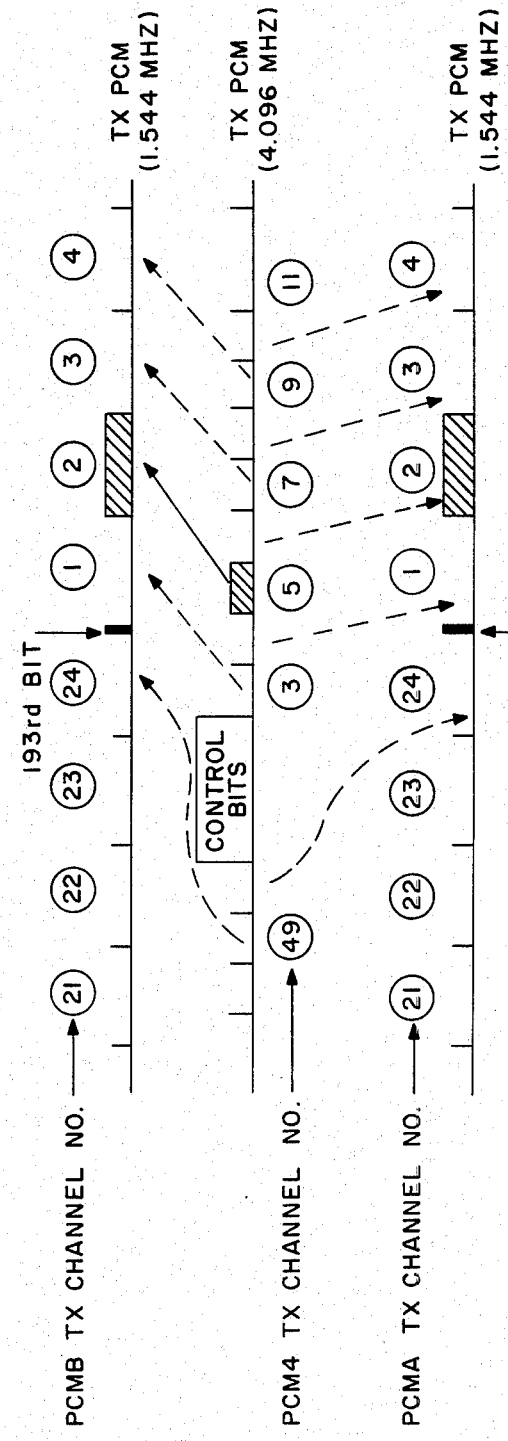

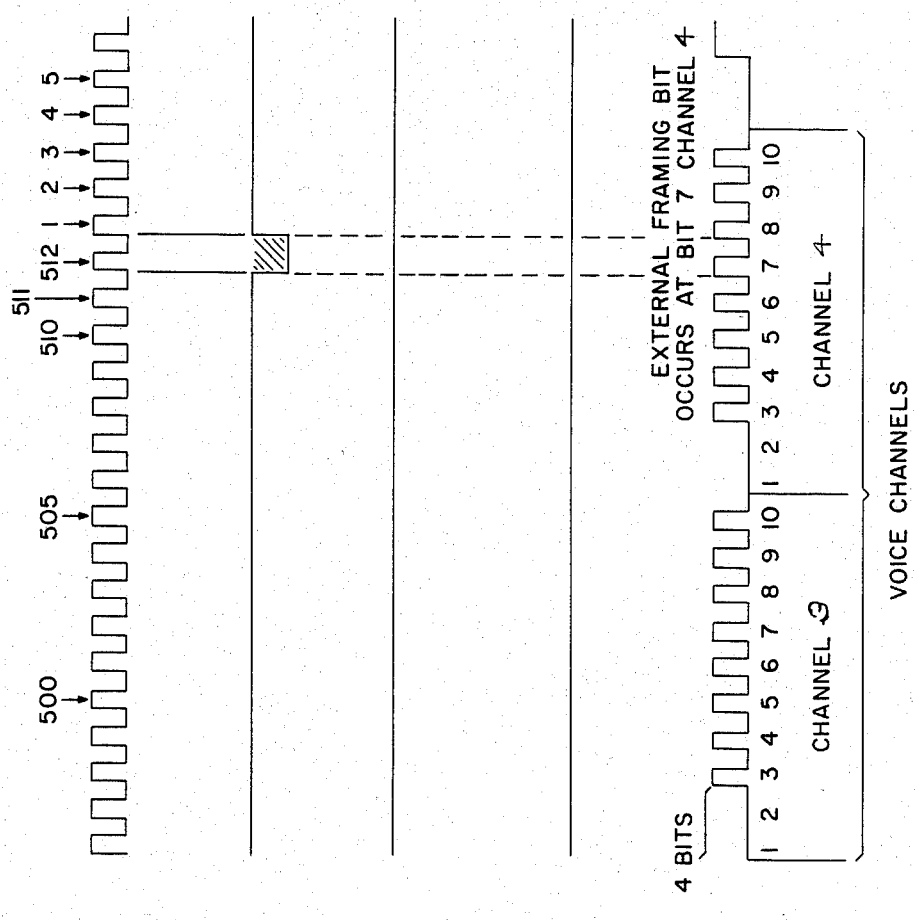

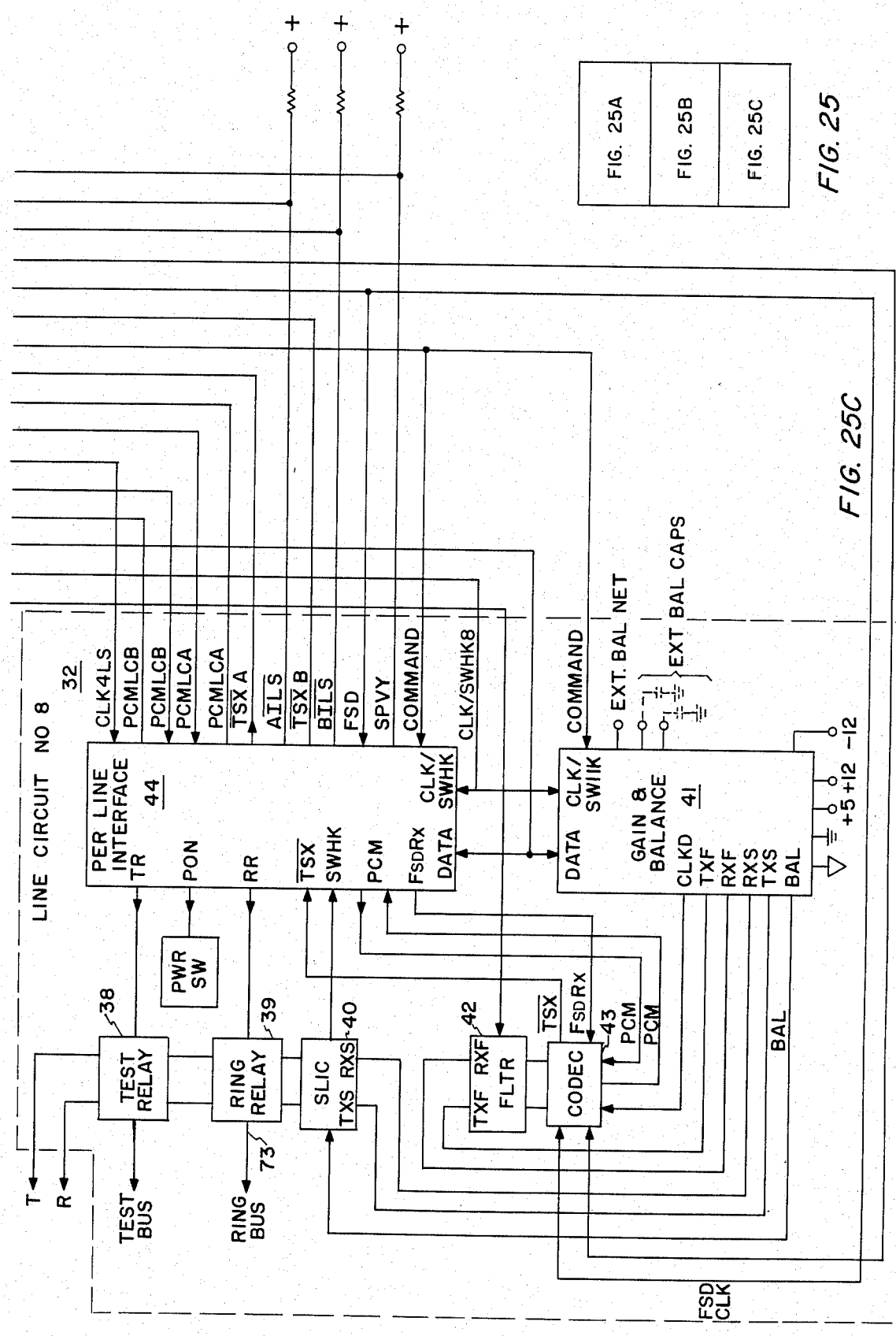

PER-LINE INTERFACE CONTROL FORMAT

| BIT 0 | 1 | 2 | 3 | 4 | 5 | 6 | 7 | 8 | 9 | 10 | 11 |
|---|---|---|---|---|---|---|---|---|---|---|---|
| R/W | | ADDRESS | | N/A | EURO. SEL. | POWER | TR | RR | LC ENA. | ILS | A/B SEL. |

(12 BITS)

*FIG. 26*

GAIN-BALANCE CONTROL FORMAT

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| R/W | ADDRESS | | | CLK +/- | ⊠ | ⊠ | ⊠ | LINE BALANCE | | | | Rx GAIN SETTING | | | | | | | | Tx GAIN SETTING | | | | | | | |

← 4 BITS → ← 8 BITS → ← 8 BITS →

*FIG. 28*

CODEC CONTROL FORMAT

| 0 | 1 | 2 | 3 | 4 | 5 | 6 | 7 | 8 | 9 | 10 | 11 |
|---|---|---|---|---|---|---|---|---|---|---|---|
| R/W | | ADDRESS | | CODEC MODE | | CHANNEL ASSIGNMENT | | | | | |

| BIT 1 2 | MODE |
|---|---|
| 0 0 | Tx & Rx CHANNEL |
| 0 1 | Tx CHANNEL |
| 1 0 | Rx CHANNEL |
| 1 1 | STANDBY |

*FIG. 29*

| FRAMES AFTER START OF TEST | 'A' CONTROL WORD REGISTER CONTENTS (HEX) | | | | 'B' CONTROL WORD REGISTER CONTENTS (HEX) | | | |
|---|---|---|---|---|---|---|---|---|
| | BYTE 1 | BYTE 2 | BYTE 3 | BYTE 4 | BYTE 1 | BYTE 2 | BYTE 3 | BYTE 4 |
| ɸ | 63 | C1 | F8 | ɸF | XX | XX | XX | XX |
| 1 | ɸ7 | Eɸ | 3D | 8F | ɸ7 | Eɸ | 3D | 8F |
| 2 | 8ɸ | F6 | 3C | 1F | 8ɸ | F6 | 3C | 1F |
| 3 | D8 | Fɸ | 7E | ɸ3 | D8 | Fɸ | 7E | ɸ3 |
| 4 | C1 | F8 | ɸF | 63 | C1 | F8 | ɸF | 63 |
| 5 | Eɸ | 3D | 8F | ɸ7 | Eɸ | 3D | 8F | ɸ7 |
| 6 | F6 | 3C | 1F | 8ɸ | F6 | 3C | 1F | 8ɸ |
| 7 | Fɸ | 7E | ɸ3 | D8 | Fɸ | 7E | ɸ3 | D8 |
| 8 (FINAL DATA) | F8 | ɸF | 63 | C1 | F8 | ɸF | 63 | C1 |

MATCHES DATA LOADED INTO FIXED ADDRESS REGISTER AT START OF TEST

*FIG. 33*

```
                VERIFIES SHIFT OPERATION OF 'A' & 'B' CONTROL WORD REGISTERS
                USING THE TEST DATA FEEDBACK FEATURE OF THE PIC.

INITIALIZE MODE REGISTER (PIC INTERNAL REG. LOCATION 0DH)
                MOV     R0,#0DH
                MOV     R,#8BH
                MOVX    CR0,A    ; WRITE 8BH INTO MODE REG.

LOAD 'A' CONTROL WORD REG. WITH TEST DATA
                MOV     R0,#0EH
                CLR     A
                MOVX    CR0,A    ; WRITE 0 INTO PIC CONTROL REG. POINTER (CRP)
                INC     R0       ; R0 POINTS TO CCRP (PIC INTERNAL REG. LOCATION 0FH)
                MOV     R5,#63H  ; C/R TEST DATA BYTE 1 (R5)
                MOV     R4,#0C1H ; C/R TEST DATA BYTE 2 (R4)
                MOV     R3,#0F8H ; C/R TEST DATA BYTE 3 (R3)
                MOV     R2,#0FH  ; C/R TEST DATA BYTE 4 (R2)

MOV     R1,#5    ; INITIALIZE TEST DATA BYTE POINTER (R1)
                MOV     R7,#4    ; INITIALIZE TEST DATA BYTE COUNTER (R7)

LOOP 1: MOV     A,CR1    ; FETCH NEXT BYTE OF TEST DATA
                MOVX    CR0,A    ;   AND WRITE IT INTO NEXT BYTE OF 'A' C/R
                DEC     R1       ; ADJUST TEST DATA POINTER
                DJNZ    R7,LOOP1 ; REPEAT LOOP 1 FOR ALL 4 TEST DATA BYTES

LOAD FIXED ADDRESS REGISTER WITH C/R BYTE 3 TEST DATA
                MOV     R0,#08H  ; PIC FIXED ADDRESS REG. INTERNAL ADDR.
                MOV     A,R3
                MOVX    CR0,A

INITIALIZE FRAME COUNTER AND START DYNAMIC TEST
                STOP    TCNT
                MOV     A,0F6H   ; -10 IN 2'S COMPLEMENT
                MOV     T,A
                JTF     $+2      ; RESET TIMER FLAG
                STRT    CNT

LOOP 2: MOV     A,T
                ADD     A,#8
                JNZ     LOOP 2   ; REPEAT LOOP 2 UNTIL FRAME COUNT REACHES 0F8H (-8)

MOV     R0,#0DH
                MOV     A,#8FH   ; WRITE 8FH INTO MODE REGISTER (SET CONTROL SHIFT ENR)
                MOVX    CR0,A    ; ENABLE SELF-TEST CONTROL SHIFTING
```

*FIG. 34*

```
WAIT FOR 8 FRAMES TO PASS (TF=1), I.E. LET C/R CYCLE THRU 8 TIMES
                                       42 CLOCK PULSES PER FRAME
LOOP 3:  JTF     $+4        ; SKIP NEXT INSTRUCTION WHEN TIMER FLAG (TF) = 1
         JMP     LOOP 3

DISABLE CONTROL REGISTER SHIFTING
         CLR     A
         MOVX    CR0,A      ; WRITE 0 INTO MODE REGISTER

VERIFY THAT BOTH 'A' & 'B' CARD ADDRESS COMPARATORS INDICATE
   AN ADDRESS MATCH OCCURRED AFTER 8 FRAMES
         MOV     R0,#0CH    ; PIC INTERNAL REG. ADDRESS OF STATUS REGISTER
         MOV     A,CR0      ; FETCH STATUS BYTE
         CPL     A
         JB0     CFAIL      ; JUMP TO ERROR ROUTINE (CFAIL) IF ADDRESS MATCH
         JB1     CFAIL      ;    IS NOT INDICATED BY EITHER CARD ADDRESS COMPARATOR

VERIFY CONTENTS OF 'A' & 'B' CONTROL WORD REGS. MATCH EXPECTED CONTENTS
         MOV     A,R5
         XCH     A,R3       ; 63H EXPECTED IN C/R BYTE 3 (R3)
         XCH     A,R5       ; F8H EXPECTED IN C/R BYTE 1 (R5)
         MOV     A,R4
         XCH     A,R2       ; C1H EXPECTED IN C/R BYTE 4 (R2)
         XCH     A,R4       ; 0FH EXPECTED IN C/R BYTE 2 (R4)

MOV     R0,#0FH    ; PIC INTERNAL ADDR. OF CCRP

MOV     R6,#2
LOOP 4:  MOV     R1,#5      ; INITIALIZE TEST DATA BYTE POINTER
         MOV     R7,#4      ; INITIALIZE TEST DATA BYTE COUNTER

LOOP 5:  MOVX    A,CR0      ; FETCH NEXT C/R DATA BYTE
         XRL     A,CR1      ;   & COMPARE WITH EXPECTED DATA
         JNZ     CFAIL      ; JUMP TO ERROR ROUTINE (CFAIL) IF ANY DATA MIS-MATCH
                                IS DETECTED
         DEC     R1         ; ADJUST TEST DATA POINTER
         DJNZ    R7,LOOP5;  REPEAT LOOP 5 FOR ALL 4 BYTES OF C/R

DJNZ    R6,LOOP4;  REPEAT LOOP 4 FOR BOTH 'B' & 'A' C/R'S

END OF PIC DYNAMIC OPERATION TEST
```

*FIG. 35*

TX & RX GAIN AUTO-SET ROUTINE - FLOWCHART (CONT.)

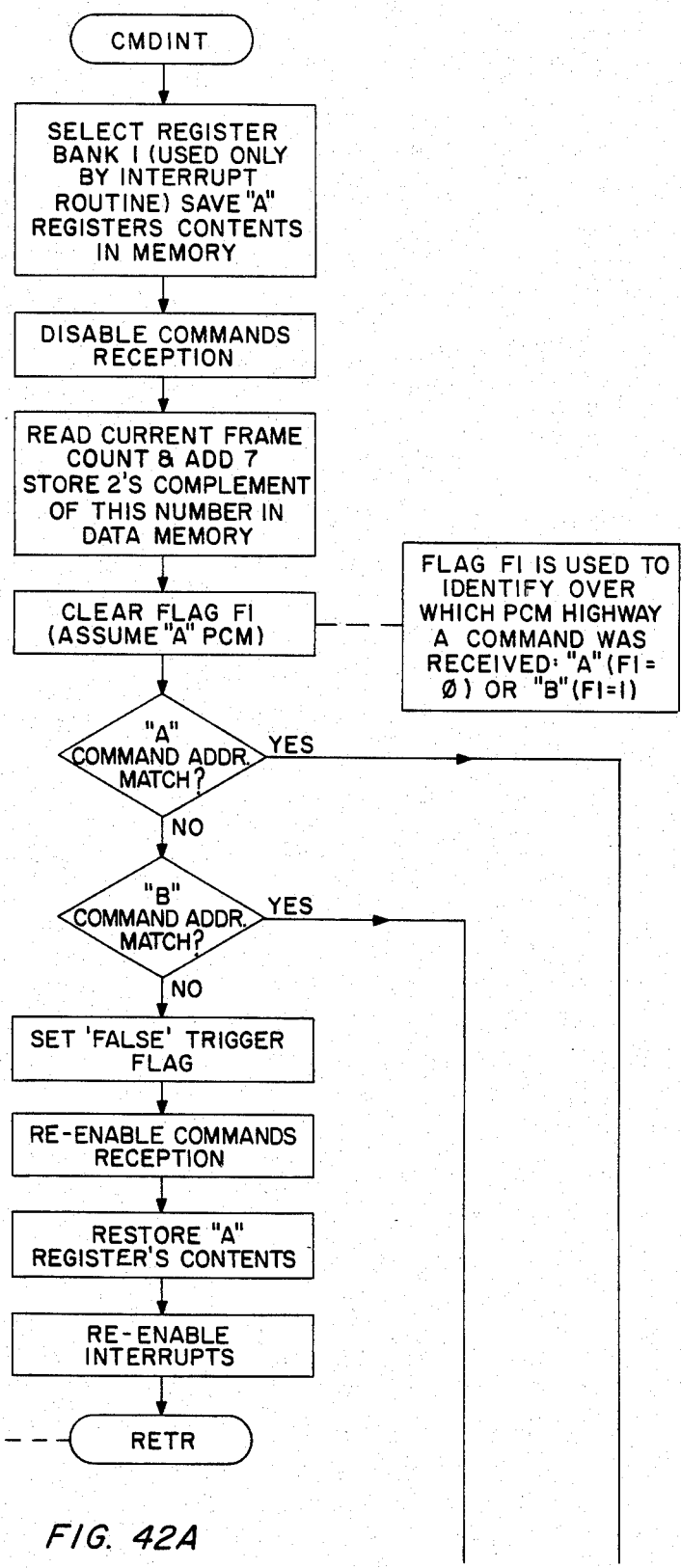
FIG. 42A

RATE CONVERTER

BACKGROUND OF THE INVENTION

This invention pertains to telephone switching systems in general, and to a rate converter for use in distributed control digital telephone switching systems in particular.

The ITT 1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5-1 to 39: 5-7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching systems is attributable to the line switches. Also the line switch design determines the transmission performance per subscriber line, traffic handling and line signaling functions of the switching system.

It is therefore desirable to provide an improved line switch having a low cost per subscriber line and improved transmission performance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller includes a multifunctional interface circuit which provides an interface between a microcomputer and the internal PCM bus structure.

An illustrative embodiment of the invention is a line switch having one or more line switch modules each terminating one or more PCM lines which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion that PCM voice channels data from the two PCM lines is alternately applied to the PCM bus structure, i.e. first the PCM data for one channel from one PCM line is read and then the PCM data for one channel of the other PCM line is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronism with either of the PCM lines. When two or more line switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIG. 1 illustrates in block diagram form a digital switching system in accordance with the principles of the present invention;

FIGS. 3 and 3A illustrate the traffic handling capability of the line switch of FIGS. 2 and 2A, respectfully;

FIG. 4 illustrates the format of PCM frames that can be employed in the system of FIG. 1;

FIG. 5 illustrates an alternate PCM frame format that can be employed in the system of FIG. 1;

FIG. 9A illustrates the interleaving operation of the RX rate converter portion of interface logic 6 of FIG. 8;

FIGS. 9F–9N are flow charts illustrating the operation of the line switch controller 7 of FIG. 9E;

FIG. 10A illustrates the demultiplexing operation of the TX rate converter of FIG. 8;

FIGS. 24A and 24B when arranged as shown in FIG. 24 are timing diagrams in the buffer and distributor 9 of FIG. 22;

FIGS. 25A, 25B and 25C when arranged as shown in FIG. 25 illustrate in block diagram form a line circuit group in accordance with the principles of the present invention;

FIG. 26 illustrates a command word format;

FIG. 28 illustrates the format of a control word directed to the per line control interface 44;

FIG. 29 illustrates the format of a control word directed to CODEC 43 of FIG. 25;

FIG. 31 illustrates the format of a control word transmitted over buses PCMLCA, PCMLCB;

FIG. 33 illustrates the register status of interface 33 during a self-test operation;

FIGS. 34 and 35 are flow charts of the self-test operation of interface 33;

FIGS. 42A and 42B when arranged as shown in FIG. 42 and FIGS. 43A and 43B when arranged as shown in FIG. 43 are flow charts of programs for the line group processor 34.

DETAILED DESCRIPTION

Figure 2:
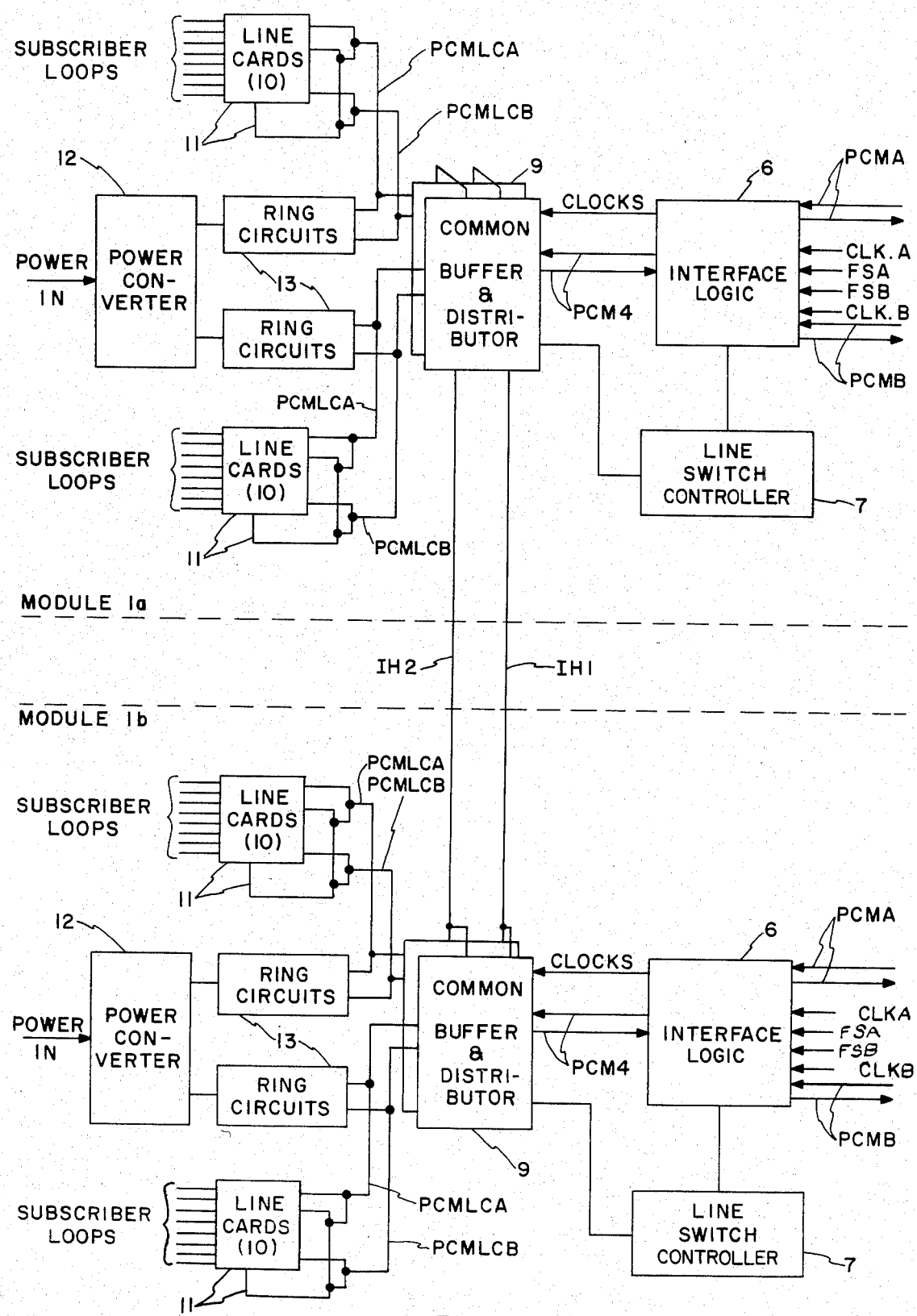
FIGS. 2 and 2A illustrate in block diagram form two embodiments of a line switch comprising two line modules employed in the system of FIG. 1.
Figure 2A:
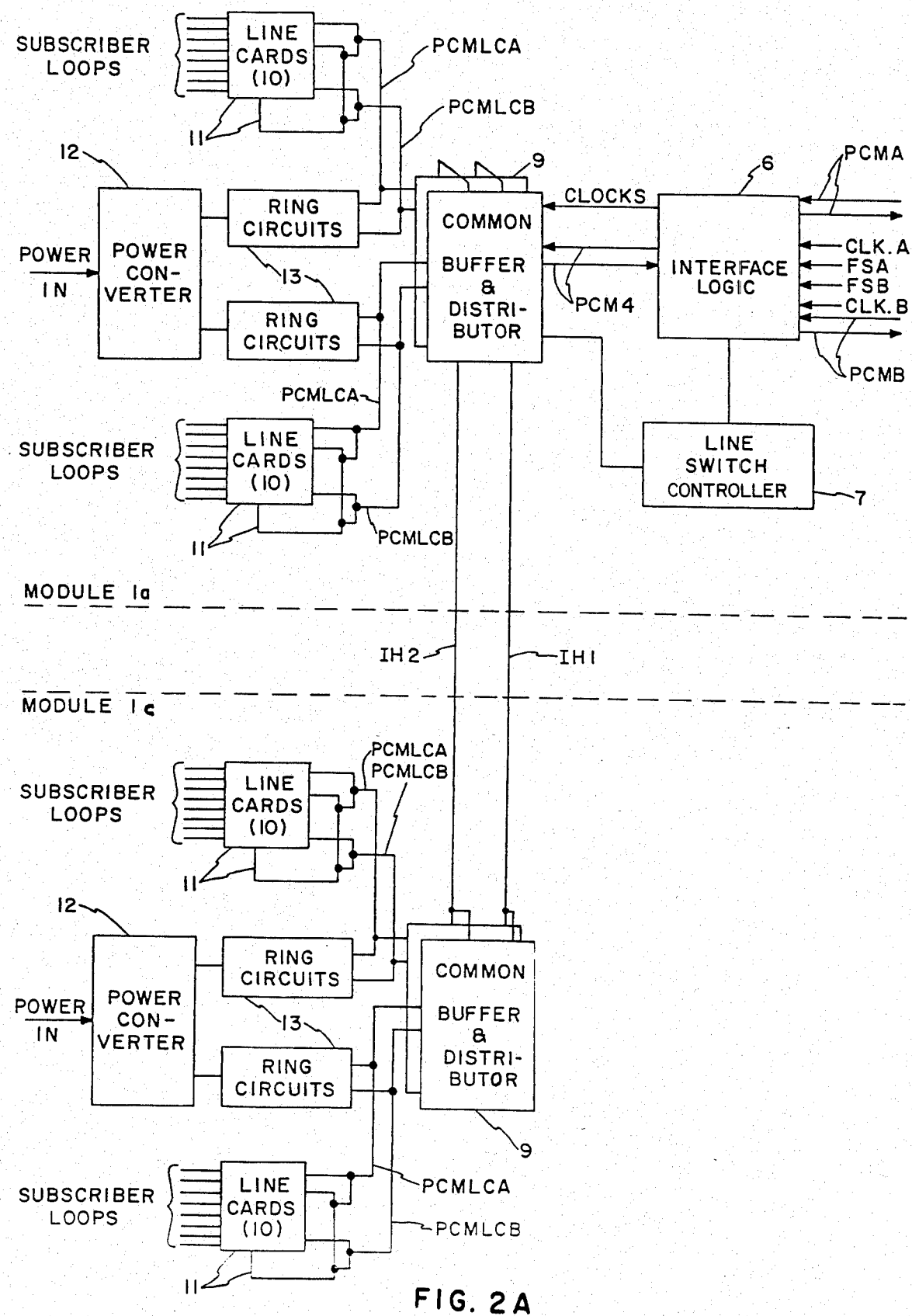

1. GENERAL (FIGS. 1 and 2)

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission from a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between the system controller 5 and the line switches 1 is transmitted over the PCM lines 4. Typical information is sent by a line switch to the system controller 5 including the following:

1. Report of line seizures which the line switch has detected; and
2. Report of a fault detected in the line switch.

Typical commands sent by the system control 5 to a line switch include the following:

1. Request for assignment of a subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributed processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operations of the line circuits and to gather information from the line circuits.

A further aspect of the line switch architecture is that an internal busing arrangement is provided wherein both control and PCM data are routed throughout the line switch. With this arrangement, a standardized interface between each processor and the PCM bus may be provided.

In addition to having the capability for establishing connections between subscriber lines connected to the line switch and the switching network 3, the present line switch has the capability of establishing intra-line switch connections without the switching network 3.

In accordance with the aformentioned security block organization the line switch 1 is organized as two identical line switch modules 1a, 1b. Each of the line switch modules 1a, 1b is self-contained to the extent that it can operate as a line switch and is connectable to up to 160 subscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connected to only one PCM line.

The frame clock lines FSA, FSB each provide a 4 kHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determine the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separates PCM channels from bus PCM4 to the PCM lines PCMA, PCMB. More specifically, the bus PCM4 operates at a 4.096 mbs. rate. Data transmitted over bus PCM4 is arranged in frames of 512 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4.096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch module of the line switch. Thus, each line switch controller 7 has access to all the line circuits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all the line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As pointed out hereinabove, each group of 8 line circuits is arranged on a single circuit card. Each of group circuits is controlled by a microprocessor which is in turn controlled by the line switch controller 7 via the 32 control by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each frame. Timing of the ringing is done via the microprocessors which reside on each line card and on each ring card.

Each line module also includes a power converter 12.

2.0 TRAFFIC HANDLING CAPACITY (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 32 channel systems.

3.0 PCM BUSES (FIGS. 4,5,6 and 7)

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherein each channel will be arranged as shown in FIG. 5. FIG. 5 shows each frame arranged as sixty 8-bit channels and 32 control bits. Other formats may easily be utilized for use in other systems.

Figure 6:
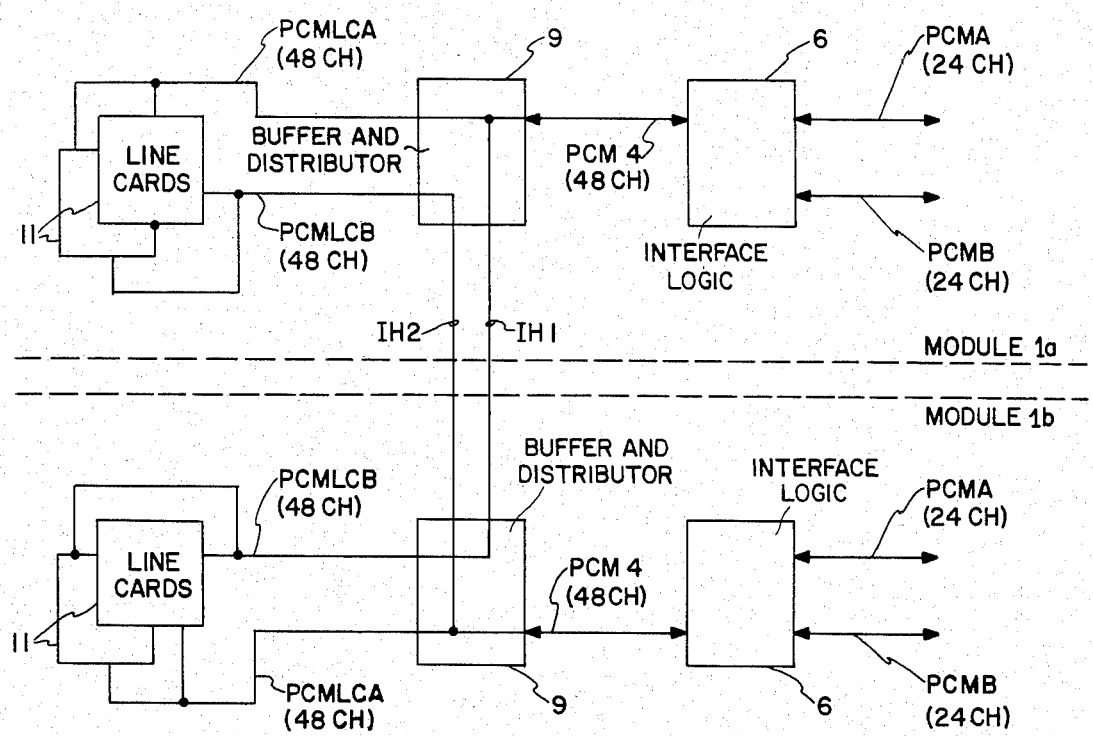
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between the PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus IH1 or IH2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has access to the two 24 channel PCM lines PCMA, PCMB in the same module and also to the two 24 channel PCM lines PCMA, PCMB in the other module.

Figure 7:
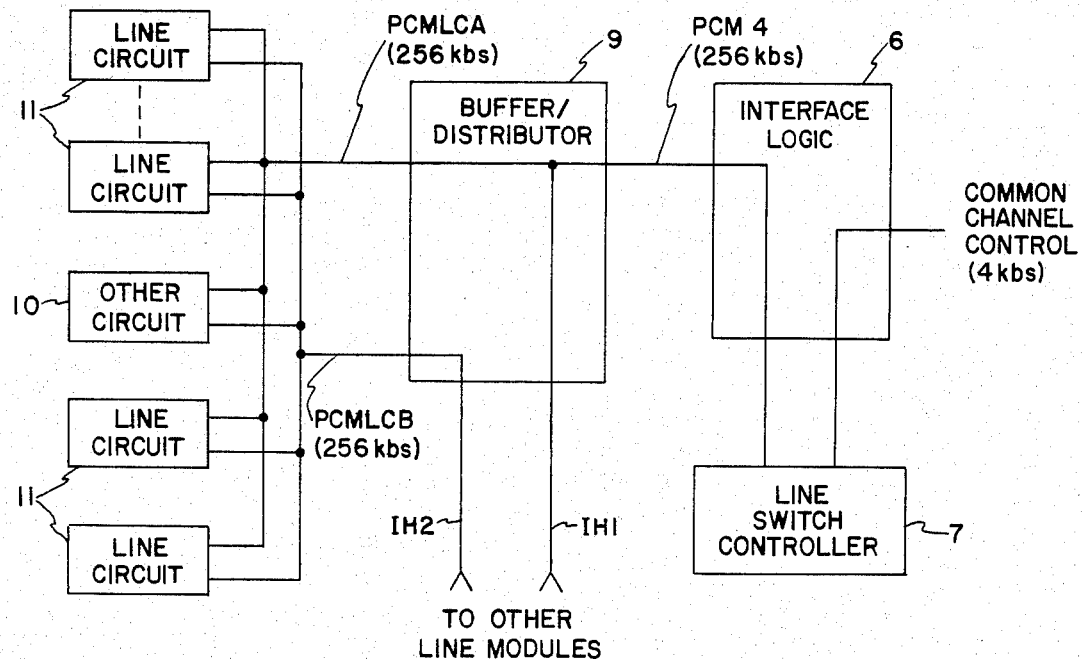
FIG. 7 illustrates in a general form the control communication paths within the line switch of FIG. 2.

As pointed out hereinabove, the line switches 1 are controlled by the system controller 5 of FIG. 1. The line switch controllers 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames×8000 frames/sec=4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame×8000 frames/sec=256 kbs. A line switch controller 7 thus provides a common 256 kbs. control channel to each line circuit 11 or other circuit (which may be the ring circuit 13 or power converter circuit 12 of FIG. 2) via buses PCM4 and PCMLCA in a line switch module and additionally provides via bus IH1 or IH2 the same 256 kbs control data channel to other line switch modules in a line switch. Furthermore, bus IH2 or IH1 via bus PCMLCB provides a 256 kbs control channel from the other line switch modules in a line switch to the line circuits of the line switch module shown in FIG. 7.

4.0 INTERFACE LOGIC 6 (FIG. 8)

4.1 General

Figure 8:
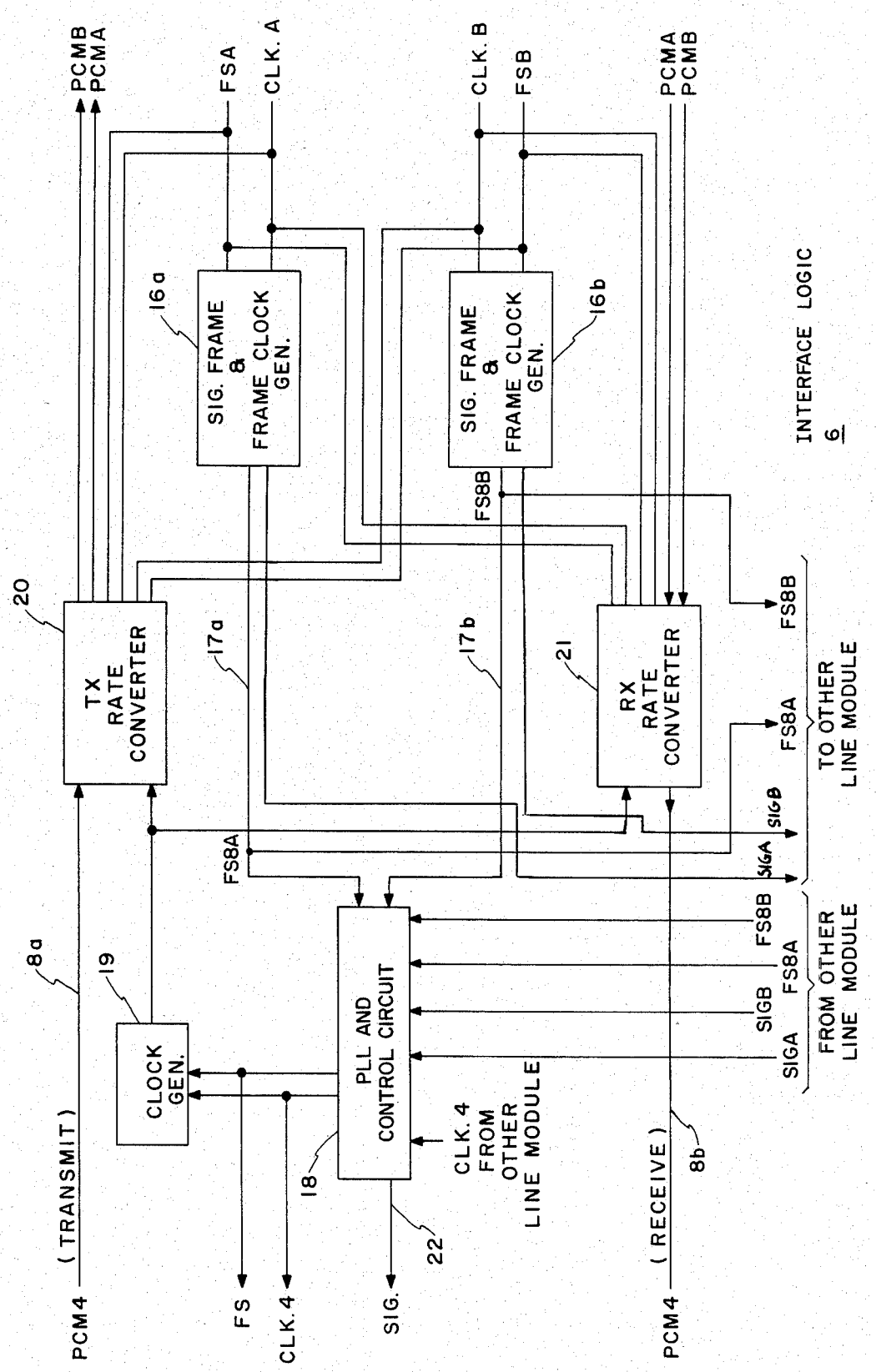
FIG. 8 illustrates in block diagram form the interface logic 6 of FIG. 2.

The interface logic 6 shown in block diagram form of FIG. 8 provides rate conversion and interlacing/demultiplexing of data between the two PCM lines PCMA, PCMB and the bus PCM4. Bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each generator 16a, 16b derives an 8 khz clock signal on leads 17a, 17b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX RATE CONVERTER (FIGS. 8, 9A-D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network or 2.048 mHz for the other systems. More specifically for the North American Network data from PCM line PCMA is clocked into RX rate converter 21 at a 1.544 mbs rate as determined by the 1.544 PCM clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Data from the two PCM lines PCMA, PCMB is alternately read from the RX rate converter and applied to the receive portion of bus PCM4, i.e., path 8b. FIG. 9A illustrates the interleaving of channels from the PCM lines PCMA, PCMB onto the bus PCM4.

Figure 9B:
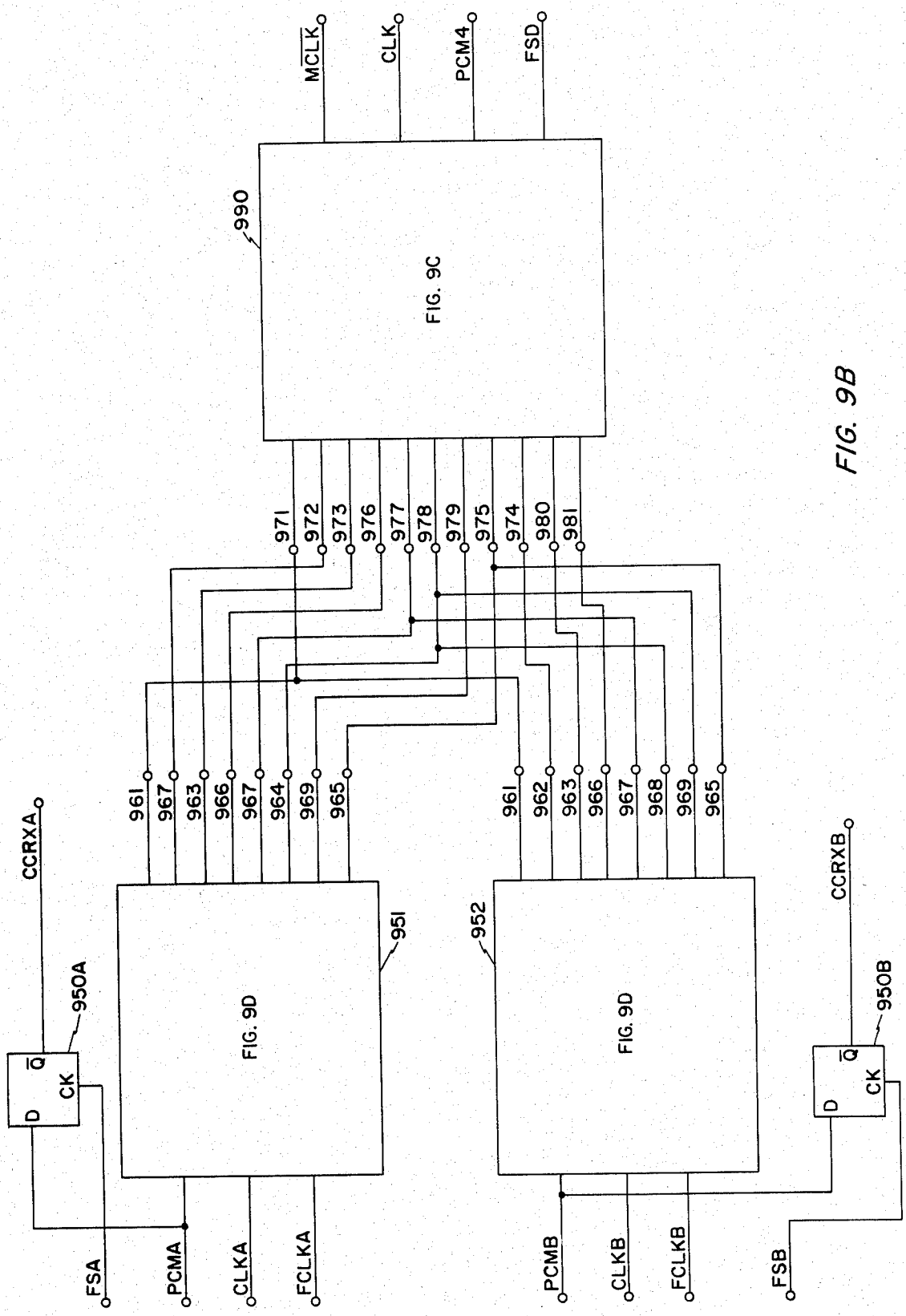
FIGS. 9B, 9C and 9D illustrate in block diagram form RX rate converter 20 of FIG. 8.
Figure 9C:
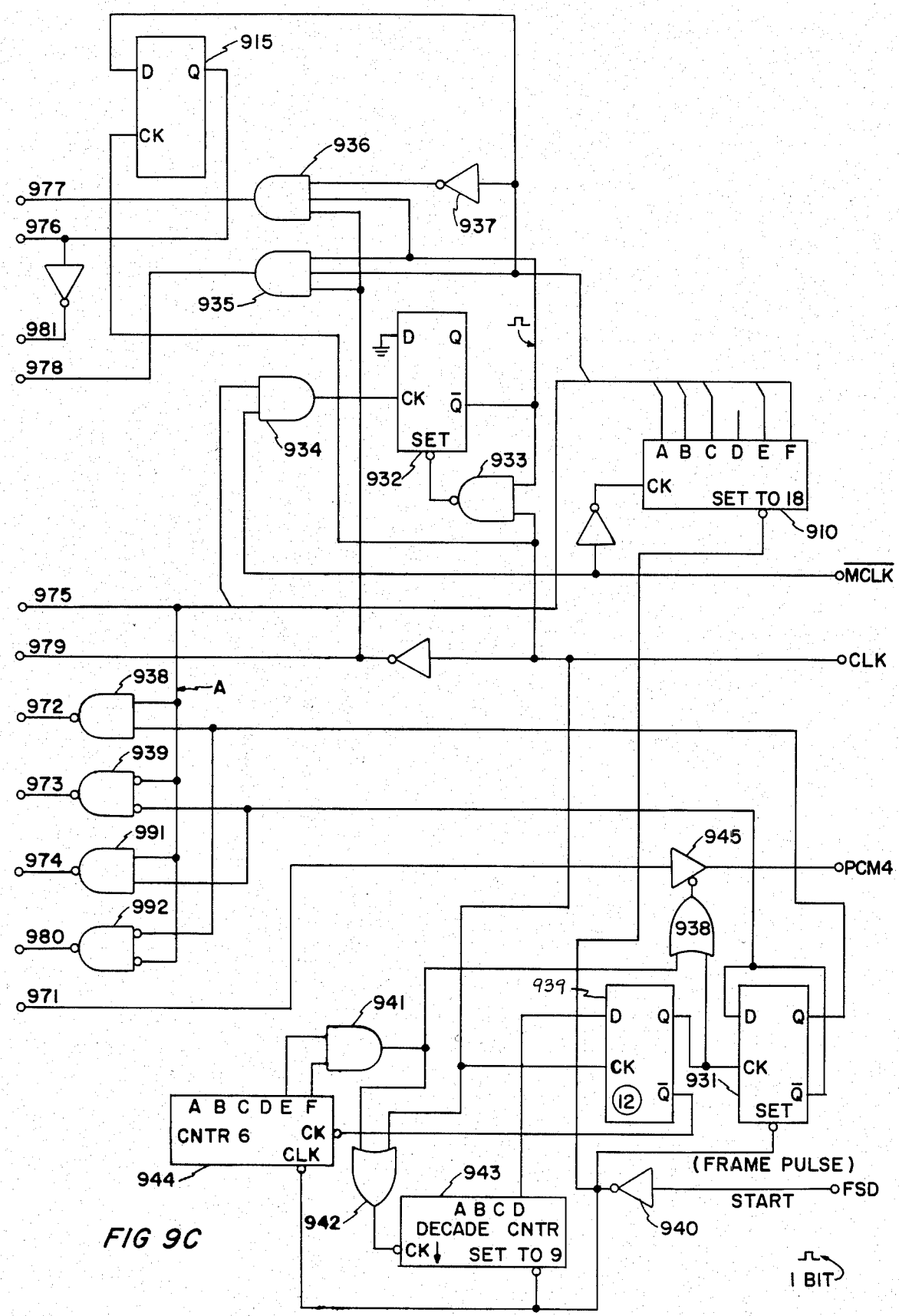
Figure 9D:
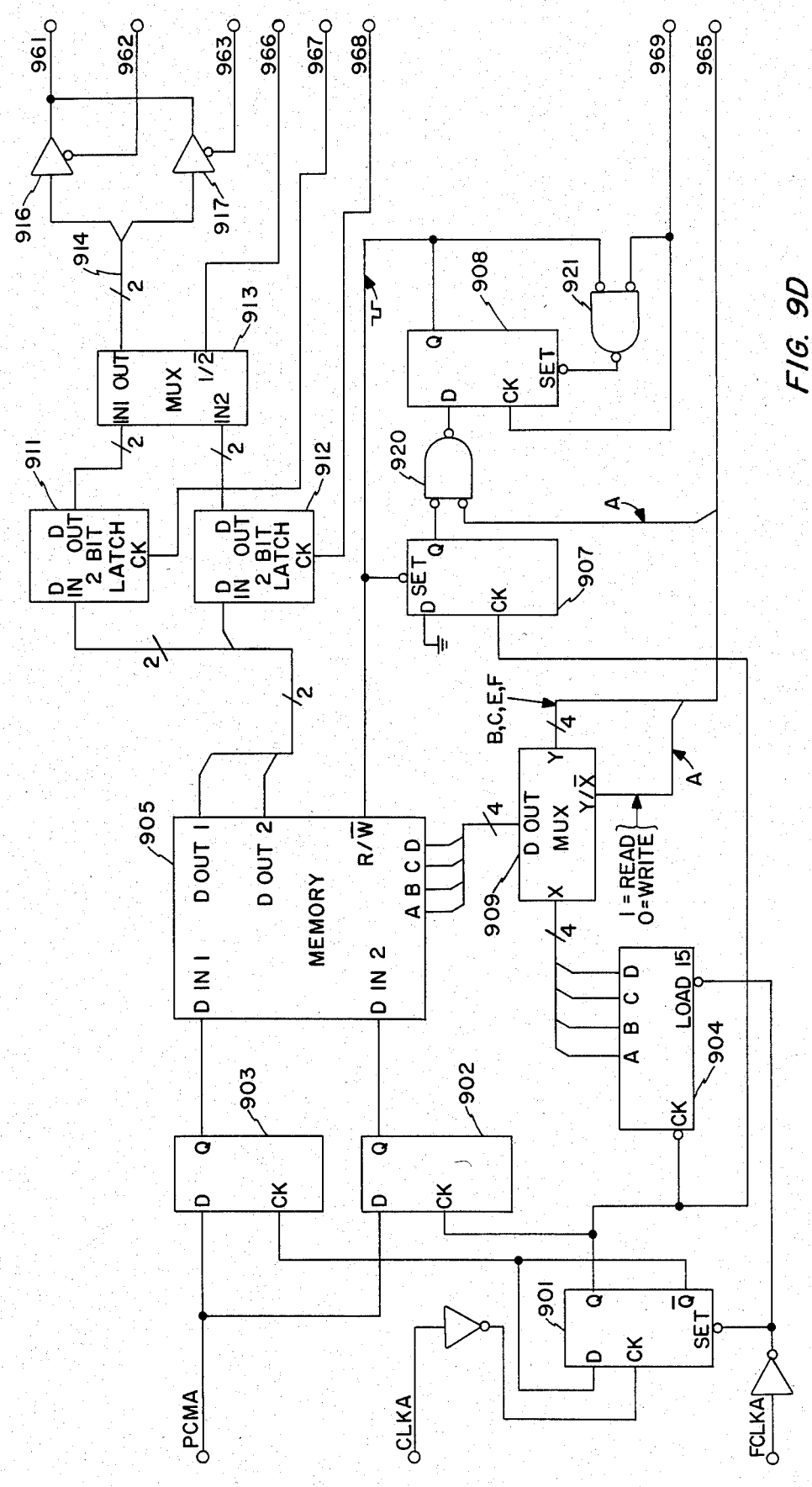

The RX rate converter 20 is shown in greater detail in FIGS. 9B, 9C and 9C. FIG. 9B illustrates the interconnection of the circuits of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bits words for storing in the memory 905. Memory 905 is organized as sixteen 2 bit words and is a random access memory. Memory 905 includes four address bit inputs and read/write input. A read write control circuit comprising flip-flops 907, 908 and gates 920, 921 determines whether a read or write operation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flop 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit line 914. Tri-state buffer gates 916, 917 controlled by gates 938,939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{MCLK}$ which as will be described below defines the format of PCM4. Pulses are provided by $\overline{MCLK}$ which correspond to the PCM voice bits on the bus PCM4.

The gates 938, 940, 941, 942, flip-flop 939, decade counter 943 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of bus PCM4 are stored in a FIFO memory of the TX rate converter 20. Information is received at a 4.096 mbs rate and stored under control of the 4.096 mHz clock signals of clock generator 19. Alternate channels of data stored by the TX rate converter are forwarded to the PCM lines PCMA, PCMB at a 1.544 mbs rate as determined by the respective clock signals CLKA, CLKB of the PCM lines. This demultiplexing operation is shown in FIG. 10A.

Figure 10B:
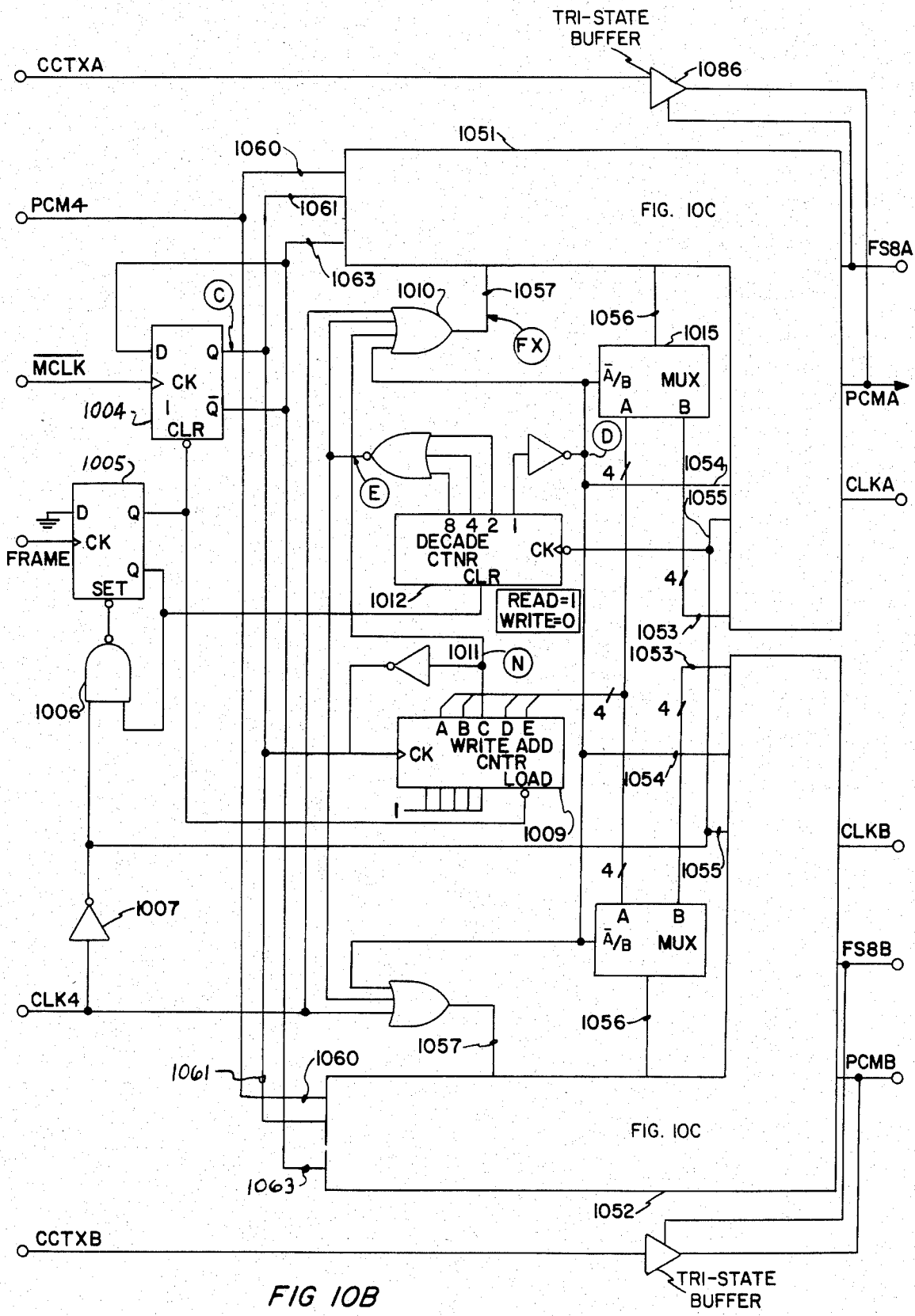
FIGS. 10B and 10C illustrate in block diagram form the TX rate converter 21 of FIG. 8.
Figure 10C:
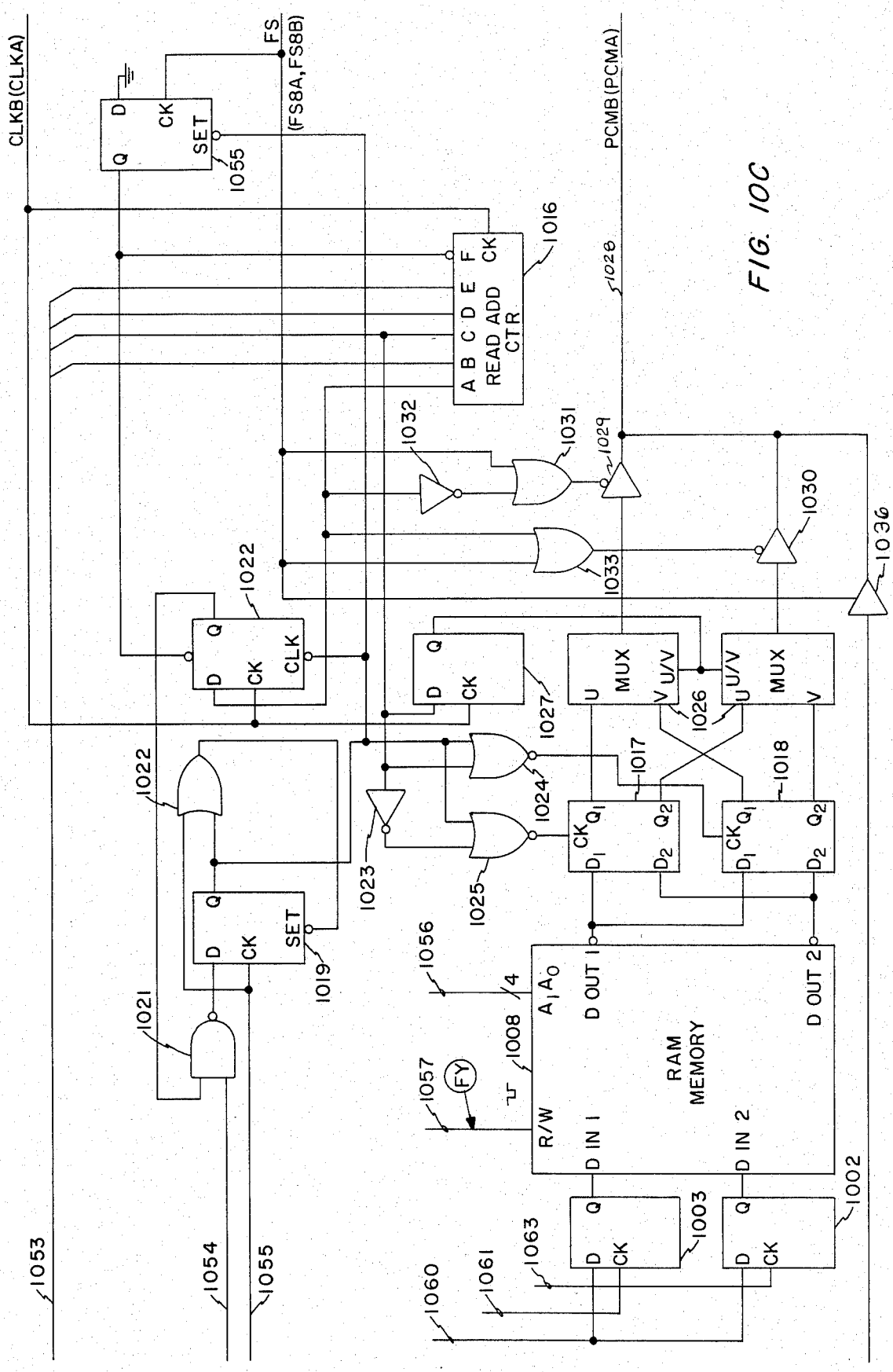

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 1003. Flip-flops 1004 which is clocked by the signal $\overline{MCLK}$ selects which of the flip-flops 1002 or 1003 into which a PCM bit is to be stored. The flip-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bit binary counter which is clocked at one half the rate of the $\overline{MCLK}$ signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memory read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 1016 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operate as a parallel to serial converter.

The flip-flop 1055 clears the counters 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If however, the PCM lines PCMA, PCMB are 30 channel 2.048 mHz lines then the PCM clock lines CLKA, CLKB would operate at 2.048 mHz and the format of FIG. 5 would be used for bus PCM4.

4.4 PHASE-LOCKED LOOP AND CLOCK CIRCUIT (FIGS. 2, 8, 11–20)

The rate converters require that the clock frequency of bus PCM4, i.e. be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limited only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design the rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustrative embodiment of FIG. 2 two 4.096 mHz buses PCM4 are driven by the same clock i.e. one bus in each of the line switch modules 1a, 1b. Up to four external PCM lines, PCMA, PCMB in both line switch modules, whose phase relative to one another can vary, will interface to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM lines. In summary, the PLL must have a phase error whose variance is minimized relative to the PCM lines;

The PLL must be capable of using any one of the PCM lines as a reference so that a failure of any PCM line doesn't affect service on the other PCM lines; and Two PLL circuits must exist that are independently selectable to ensure that a single failure in the PLL does not affect the PCM clock CLK4.

Figure 11:
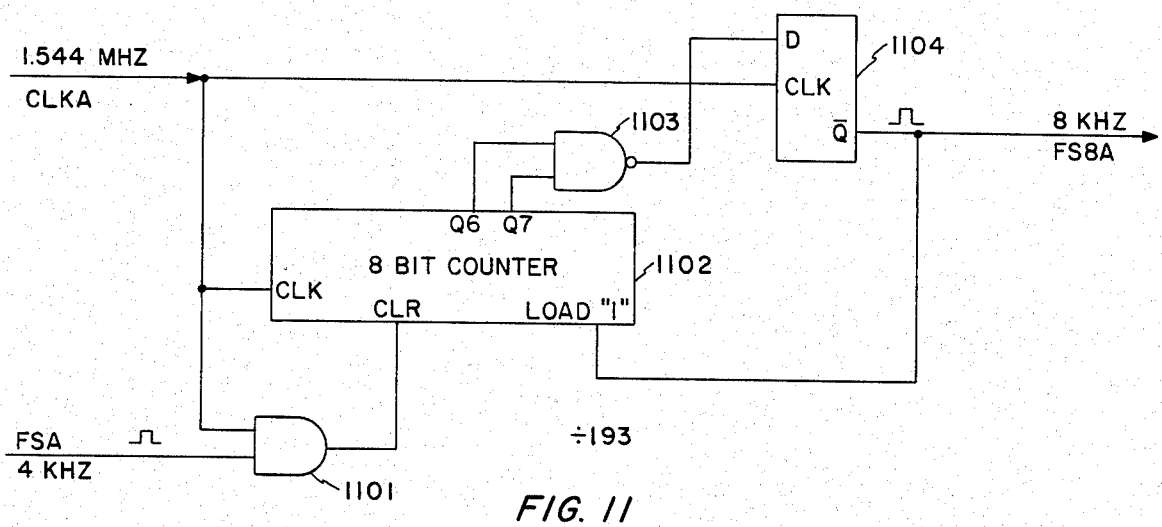
FIG. 11 illustrates in block diagram form a portion of generator 16a of FIG. 8.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 is coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figure 12A:
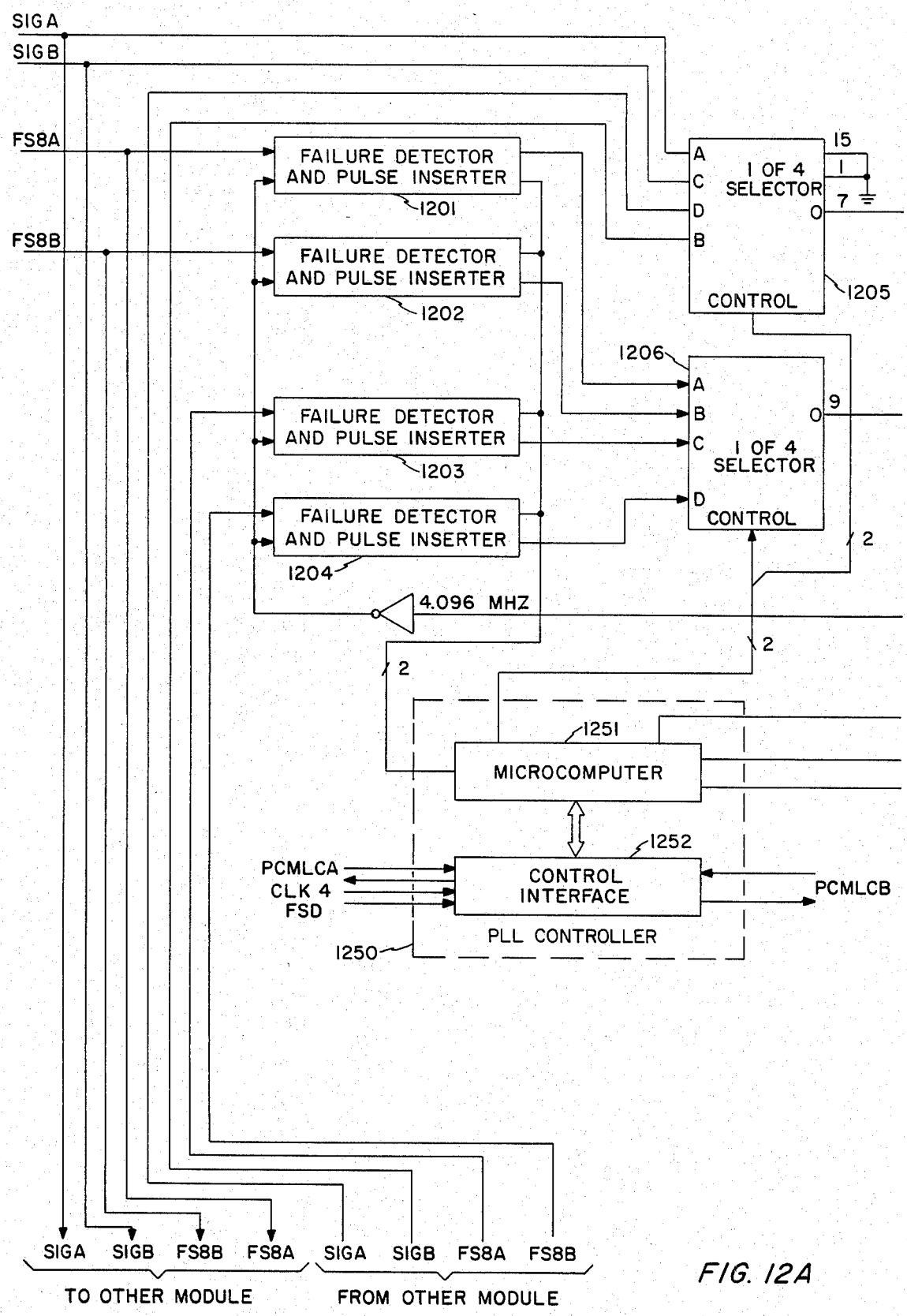
FIGS. 12A and 12B when arranged as shown in FIG. 12 illustrate in block diagram form the PLL and control circuit 18 of FIG. 8.
Figures 12, 12B:
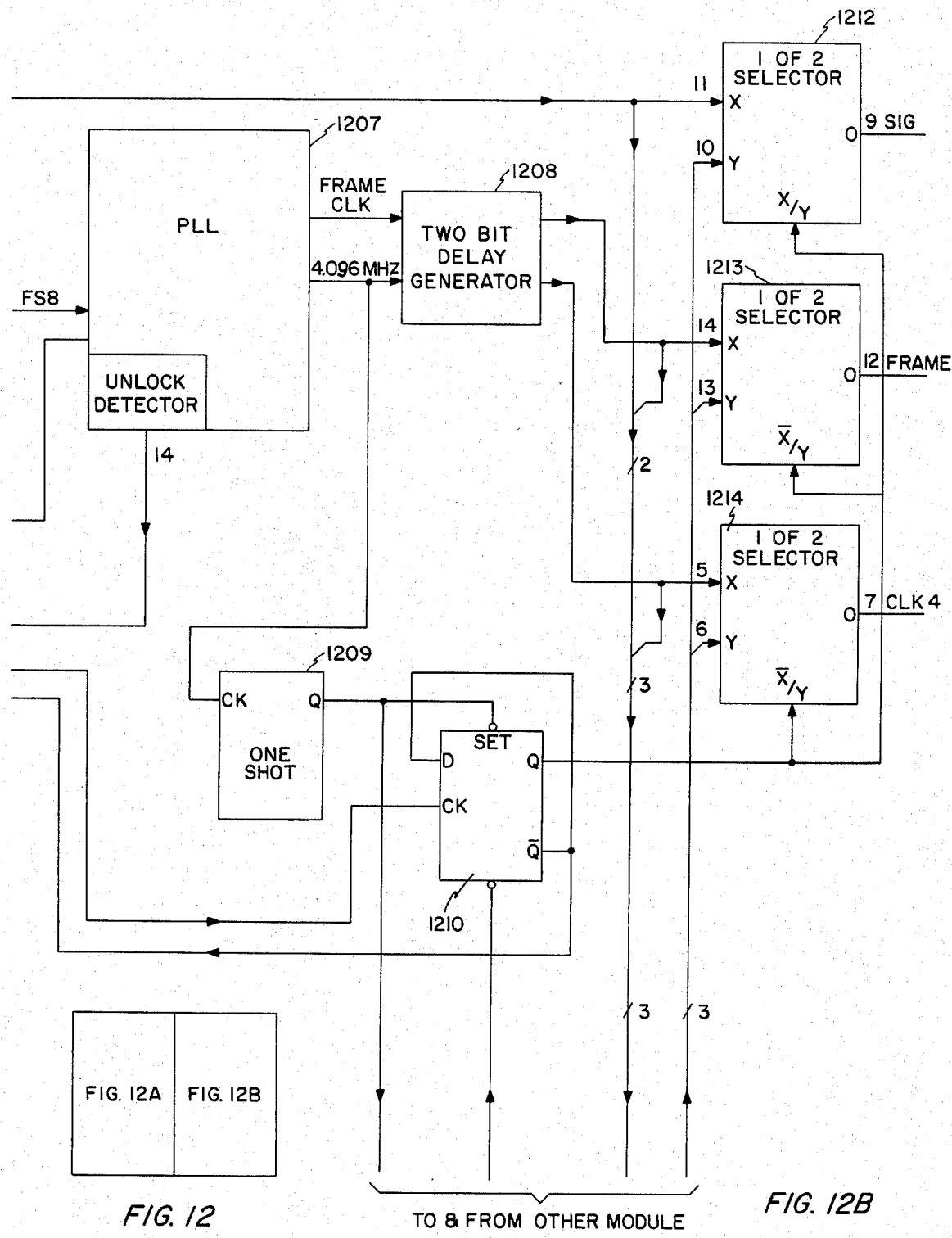
Figure 13:
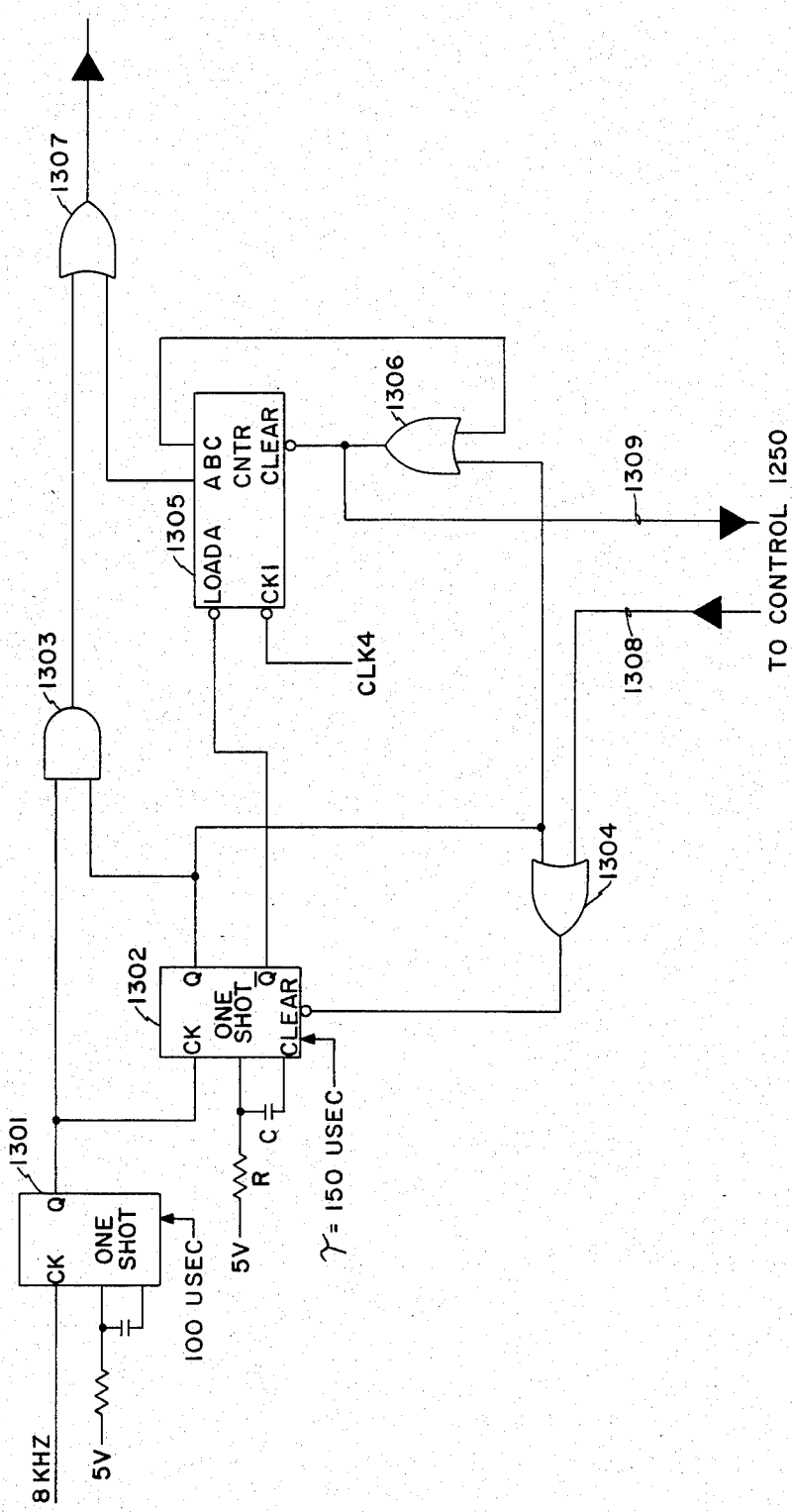
FIG. 13 illustrates in block diagram form failure detector 1201 of FIG. 12A.

Turning now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 microsec. If, however, the time between two pulses is less than a predetermined interval, i.e., 100 microsec., the one shot 1301 will prevent the fast pulse from being propagated. If the time interval between pulses is greater than 100 microseconds, (and less than a second predetermined interval as discussed below) the pulse will be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, $\overline{Q}$ is high. Three bit binary counter 1305 is arranged such that when Q is low, a binary 4 (ABC=001) is loaded and when Q goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
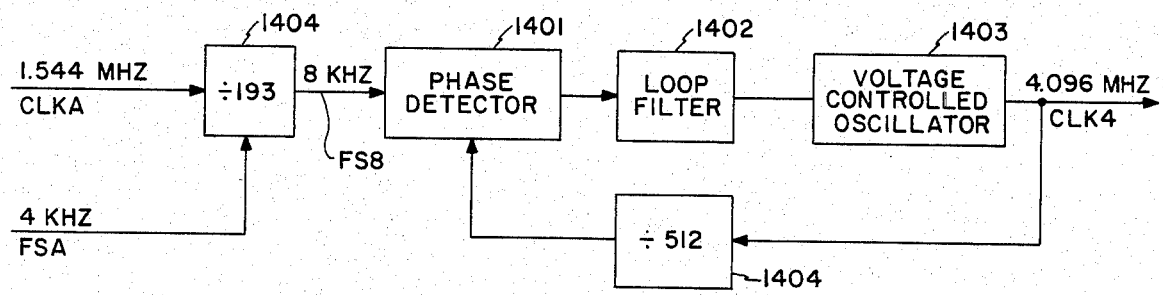
FIG. 14 is a block diagram of PLL 1207 of FIG. 12B.

A block diagram of the PLL 1207 is shown in FIG. 14.

The PLL 1207 comprises a clock input FS8 to which a voltage controlled oscillator (VCO) 1403 is slaved. This a accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exacty 512/193 times CLKA.

Figure 15:
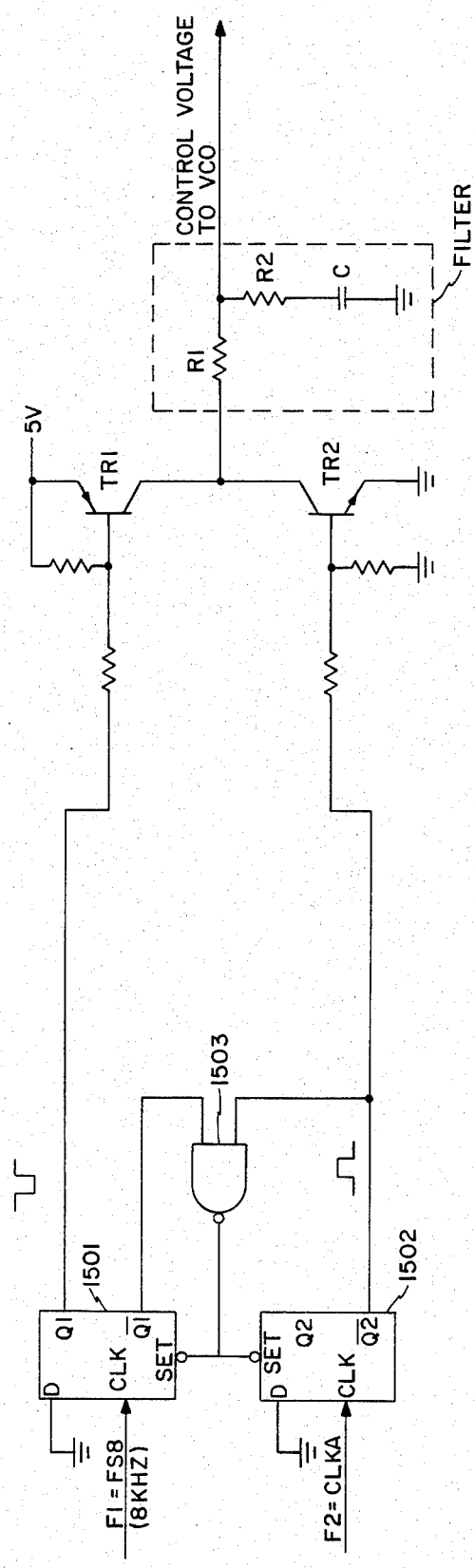
FIG. 15 illustrates in block diagram form the phase detector of FIG. 14.

In order to minimize the phase variance in the PLL 1207, a phase detector is provided that gives a phase error near zero under steady state conditions. A simple phase detector that meets this critical requirement is shown in FIG. 15.

The phase detector requires TTL compatible inputs and unlike a quadrature or an EXCLUSIVE OR type of phase detector, it is not duty-cycle dependent on the inputs since it is strictly rising-edge sensitive which prevents phase lock from occurring on an integer multiple (harmonic) of the desired VCO frequency. It similarly rejects subharmonic phase lock.

Figure 16:
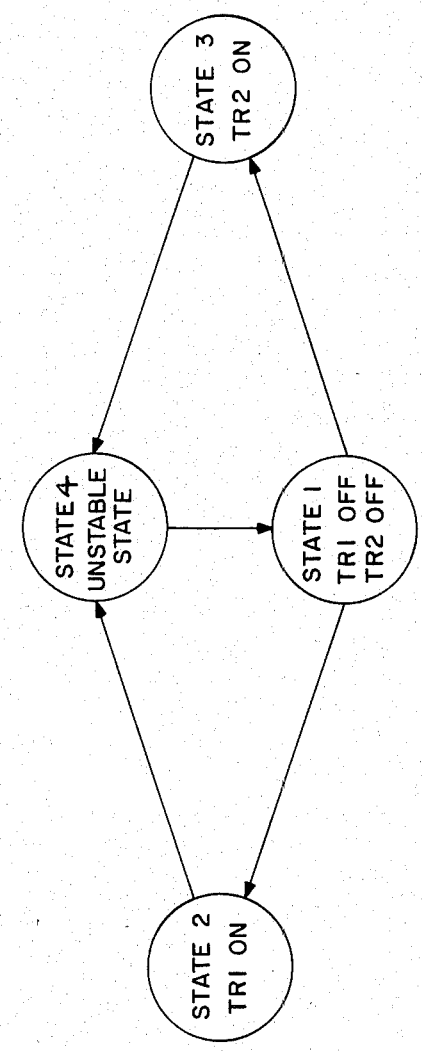
FIG. 16 is a state diagram for the phase detector of FIG. 14.

The outputs (Q1 and Q2) of flip-flops 1501, 1502 have the following four states:
State 1=Both Q1 and Q2 high
State 2=Q1 is low, Q2 is high
State 3=Q1 is high, Q2 is low
State 4=Both Q1 and Q2 low State 4 is an unstable condition since this causes a set pulse which returns the flip-flop pair to State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degress in either direction or F2 is not equal to F1, the cycle time is not necessarily 125 microseconds (out of lock condition). However, the phase detector will always cycle through State 2 when F2 is less than F1 and through State 3 when F2 is greater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much more difficult to control. With such phase detectors any required change in control voltage (due to part variance or temperature change) causes a proportional phase error change.

Figure 17:
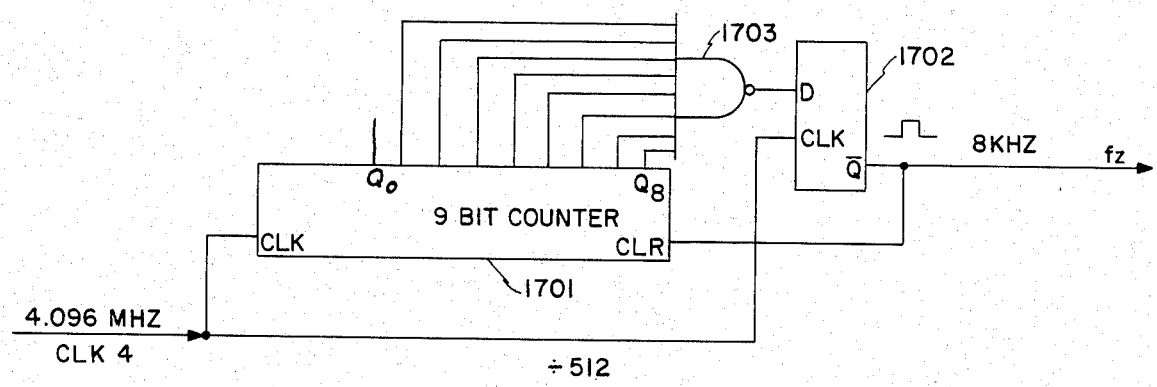
FIG. 17 is a block diagram of divider 1404 of FIG. 14.

Phase error between the VCO and its reference is dependent primarily on the propagation delay through the dividers (512 and 193) and the phase detector. The dividers were both designed with this consideration and have only one flip-flop delay from input to output. The ÷193 counter is that of FIG. 11 and the ÷512 counter is shown in FIG. 17. The phase detector uses two flip-flops that are inherently closely matched since they are in the same integrated circuit package.

The PLL has a measured nominal phase difference F1 and F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase-frequency discrimination attributes of the phase detector give the PLL a capture and lock range limited only by the frequency range of the VCO. This allows great flexibility in the design of the remaining portions of the PLL.

Figure 18:
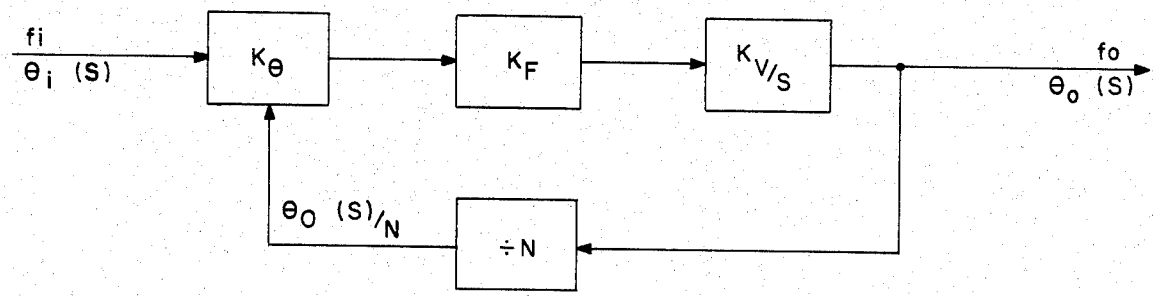
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration in the 8 kHz reference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
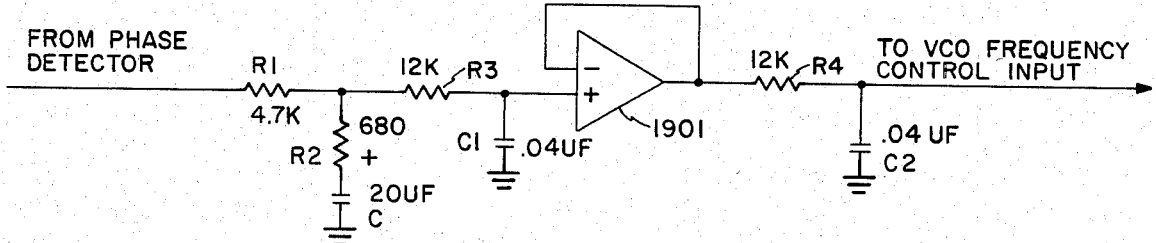
FIG. 19A is one embodiment of loop filter 1402 of FIG. 14.
Figure 19:
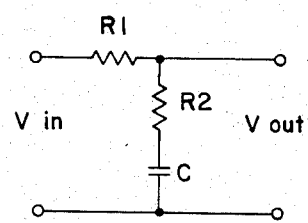
FIG. 19 is a basic loop filter circuit.

Using Laplace Transforms, it is possible to analyze the stability of the PLL. Using servo theory, $$\theta_o(s) = \frac{G(s)}{1 + G(s) H(s)} \theta_i(s)$$

where
$\theta_o(s)$ = Output phase
$\theta_i(s)$ = Input phase
$G(s)$ = Forward gain product = $K_0 \times K_F \times K_V/s$
$H(s)$ = Feedback gain product = $1/N$ Three of the gain blocks (Ko, Kv, and N) are fixed. The transfer function of the loop filter is selectable. The loop filter of FIG. 19 is chosen for its great flexibility in determining both loop natural frequency ($\omega n$) and damping factor ($\zeta$).

$$\frac{V_{out}}{V_{in}} = \frac{sR_2C + 1}{s(R_1 + R_2)C + 1} \quad (2)$$

$$K_F = F_{(s)} = \frac{\tau_2 s + 1}{\tau_1 s + 1}$$

where
$\tau_2 = R_2C$
$\tau_1 = (R_1 + R_2)C$

Referencing FIG. 18, forward gain and reverse gain products are entered into Equation 1 and reduced to Equation 4.

$$\frac{\theta_o(s)}{\theta_i(s)} = \frac{K_\theta K_V (\tau_2 s + 1)/\tau_1}{s^2 + 2\zeta\omega_n s + \omega_n^2}$$

where $$\omega_n = \sqrt{K_\theta K_V / \tau_1 N} \text{ rad/sec.} = \text{natural frequency of } PLL$$

and $$\zeta = \frac{1}{2}\left(\frac{1}{\tau_1 \omega_n} + \omega_n \tau_2\right) = \text{damping factor of } PLL$$

Table 1 lists the values of the PLL parameters used to determine the loop damping factor ($\zeta$) and natural frequency ($\omega_n$).

TABLE 1

| PLL GAIN PARAMETERS |
|---|
| $K_V$ = 550 kHz/volt = 3.46 × $10^6$ rad/volt-sec. |
| $K_0 = \frac{5V}{4\pi}$ volts/rad = .398 volts/rad. |
| N = 512 |
| $K_F = \frac{\tau_2 S + 1}{\tau_1 S + 1}$    $\tau_2$ = 13.6 msec; $\tau_1$ = 107.6 msec. |

These are used in Equation 4 to obtain the following:
$w_n = 158$ rad/sec. (25.1 Hz)
$\zeta = 1.09$ This indicates a PLL with a narrow loop bandwidth and is very stable since it is overdamped.

Figure 20:
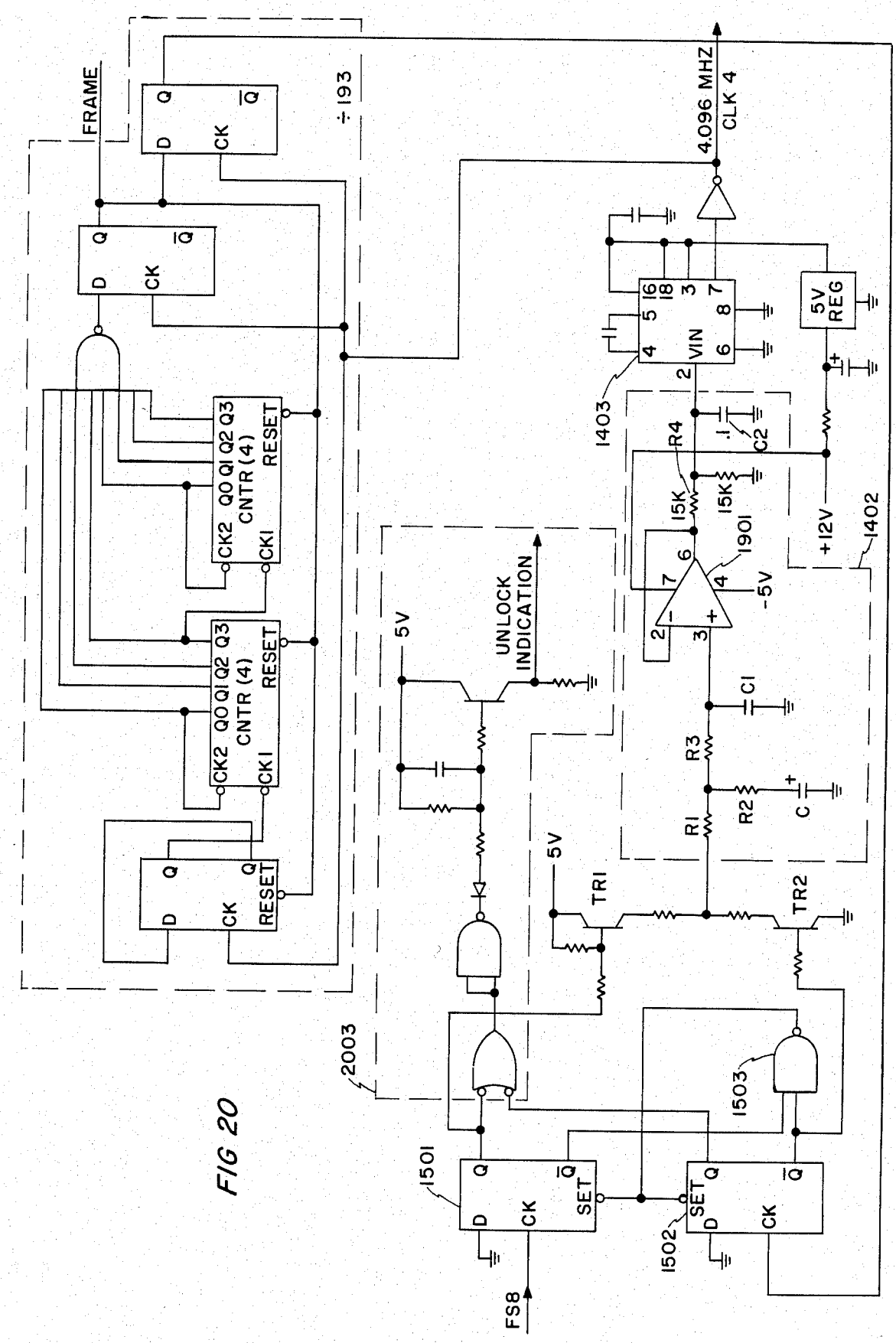
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp- 1901 is used to provide the low leakage required since the VCO has an input impedance under 100k ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not critical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximately 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 1210 and will provide a failure indication to the PLL controller 1250. Flip-flop 1210 will automatically operate the selector 1214 to switch to the phase-locked loop in the other line switch module e.g 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL controller 1250 includes a microcomputer 1251 and an interface circuit 1252. The microcomputer 1251 in the illustrative embodiment is an INTEL 8049 microcomputer. The interface circuit comprises a protocol interface circuit (PIC) which will be described in greater detail in conjunction with the line group controller. The INTEL 8409 microcomputer is described in INTEL COMPONENT CATALOG 1979, INTEL CORPORATION, 1979, pp 8-27 to 8-30.

The system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1251 detects a failure in the clock circuits, it arbitrarily switches to another line clock to be used as a master. The failure detecting microcomputer will send information back to the system controllers 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 LINE SWITCH CONTROLLER (FIGS. 9B, 9E to 9N, 10B, 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB. The line switch controller 7 has access to the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is presented to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
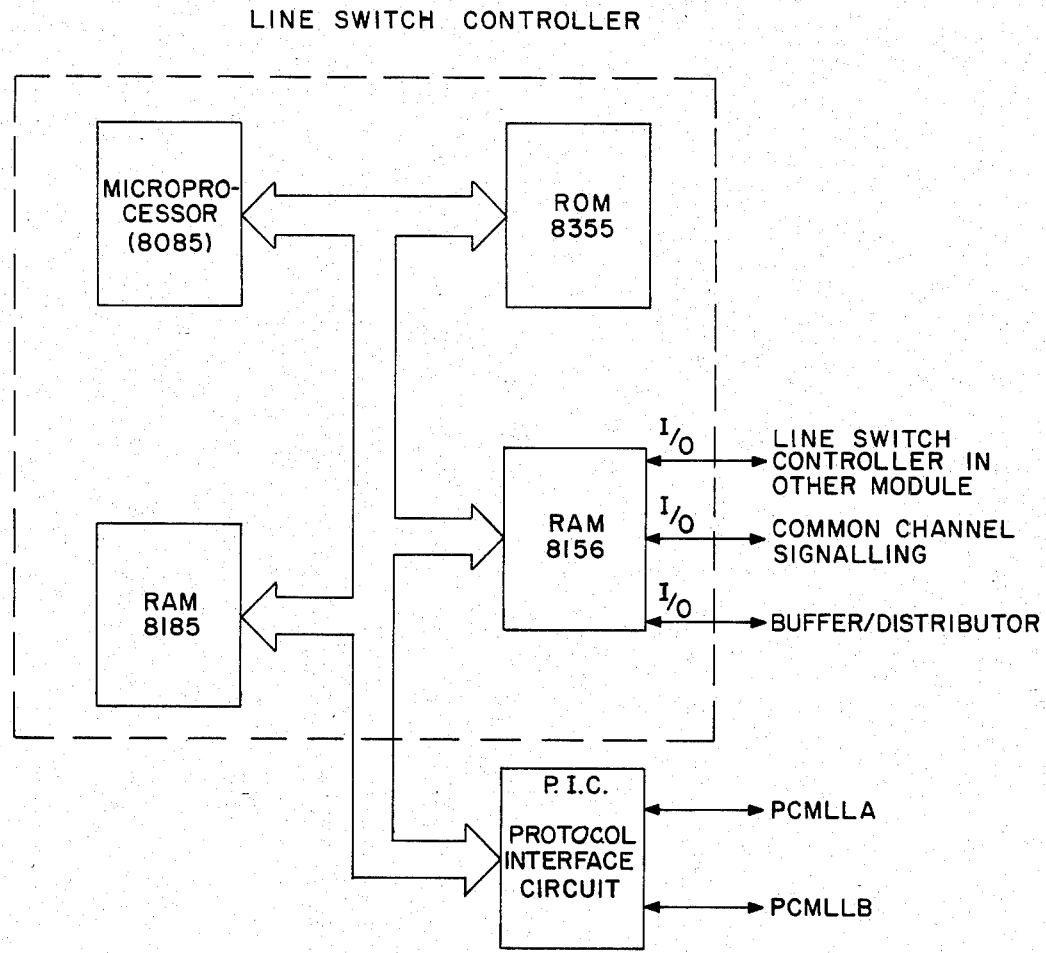
FIG. 9E illustrates in block diagram form the line switch controller 7 of FIGS. 2 and 2A.

Turning now to FIG. 9E, the line switch controller is shown as comprising a Protocol interface circuit PIC and a microcomputer. The microcomputer utilized in the illustrative embodiment is the MCS-85 TM system available from INTEL CORPORATION which is described in *INTEL COMPONENT DATA CATALOG* 1979, Intel Corporation, 1979, 9-79 to 9-139. More specifically, the microcomputer configuration may be that shown in FIG. 1 at page 9-78 of the aforementioned Intel reference. The 8085 microprocessor, the 8156 RAM with I/O ports and timer, the 8355 ROM and the 8185 RAM shown are all described in detail in the aforementioned INTEL reference.

The protocol interface circuit PIC serves as a control data interface between the parallel data bus of the microcomputer and the high speed, bit serial PCM bus PCM 4. The line switch controller 7 operates as the master in a master slave relationship with all other circuits connected to the PCM buses PCM4, PCMLCA, PCMLCB. More specifically, only the line switch controller 7 may transmit control word commands over the PCM buses. A circuit will transmit a control word response on the PCM buses only after receiving a command addressing that circuit. The convention established for the line switch control communication specifies that commands and responses must occur in pairs, only a line switch controller 7 can initiate a command, and the response to a command always occurs a fixed number of frames after the command.

Figure 9F:
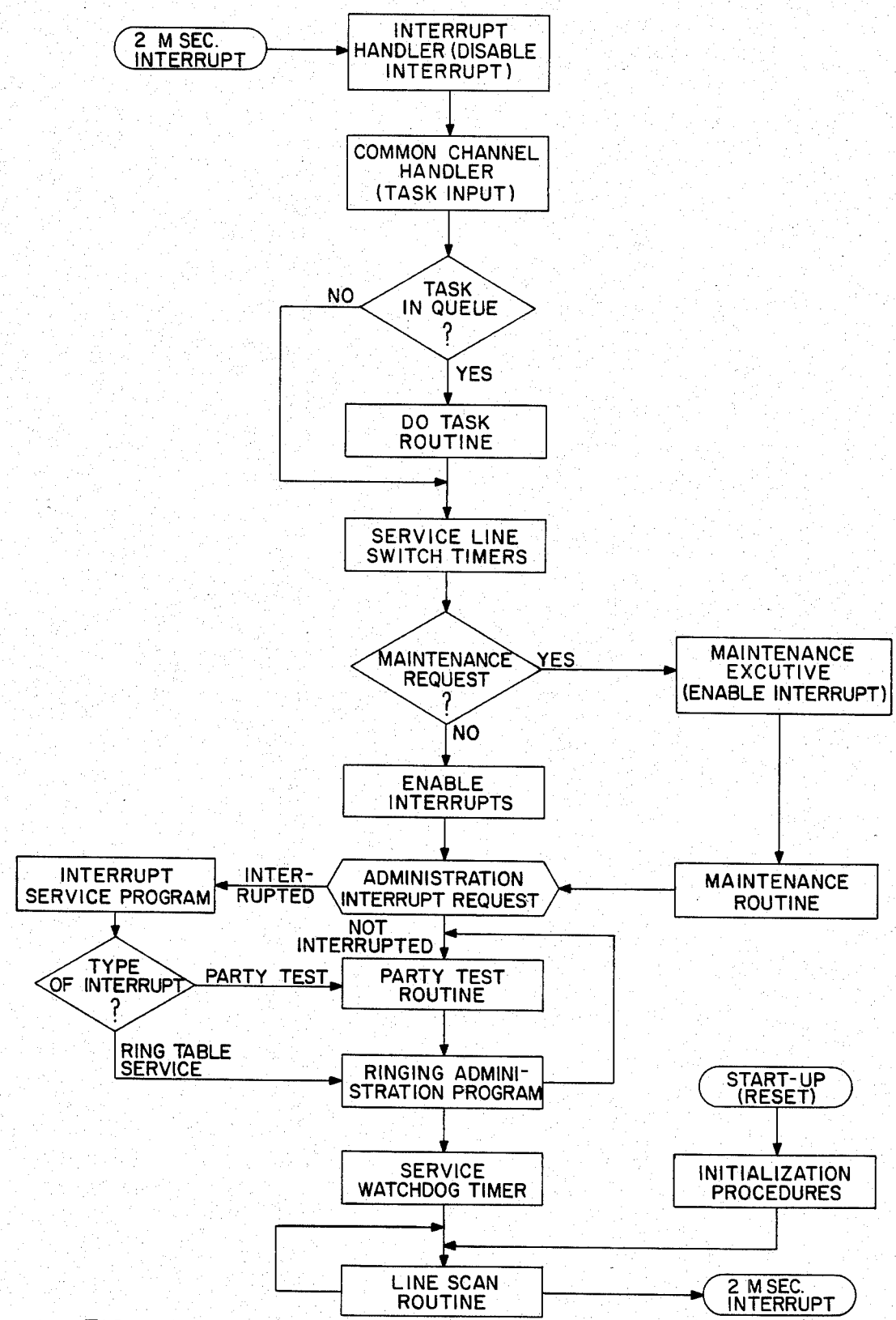

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 msec. interrupt timer and when a 2 msec. interrupt occurs, an interrupt handler program calls a common channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconnecting ringing, call disconnect maintenance, test, alarm and administrative functions. FIGS. 9G to 9N illustrate in greater detail the flow charts of various programs identified in FIG. 9F.

Figure 9G:
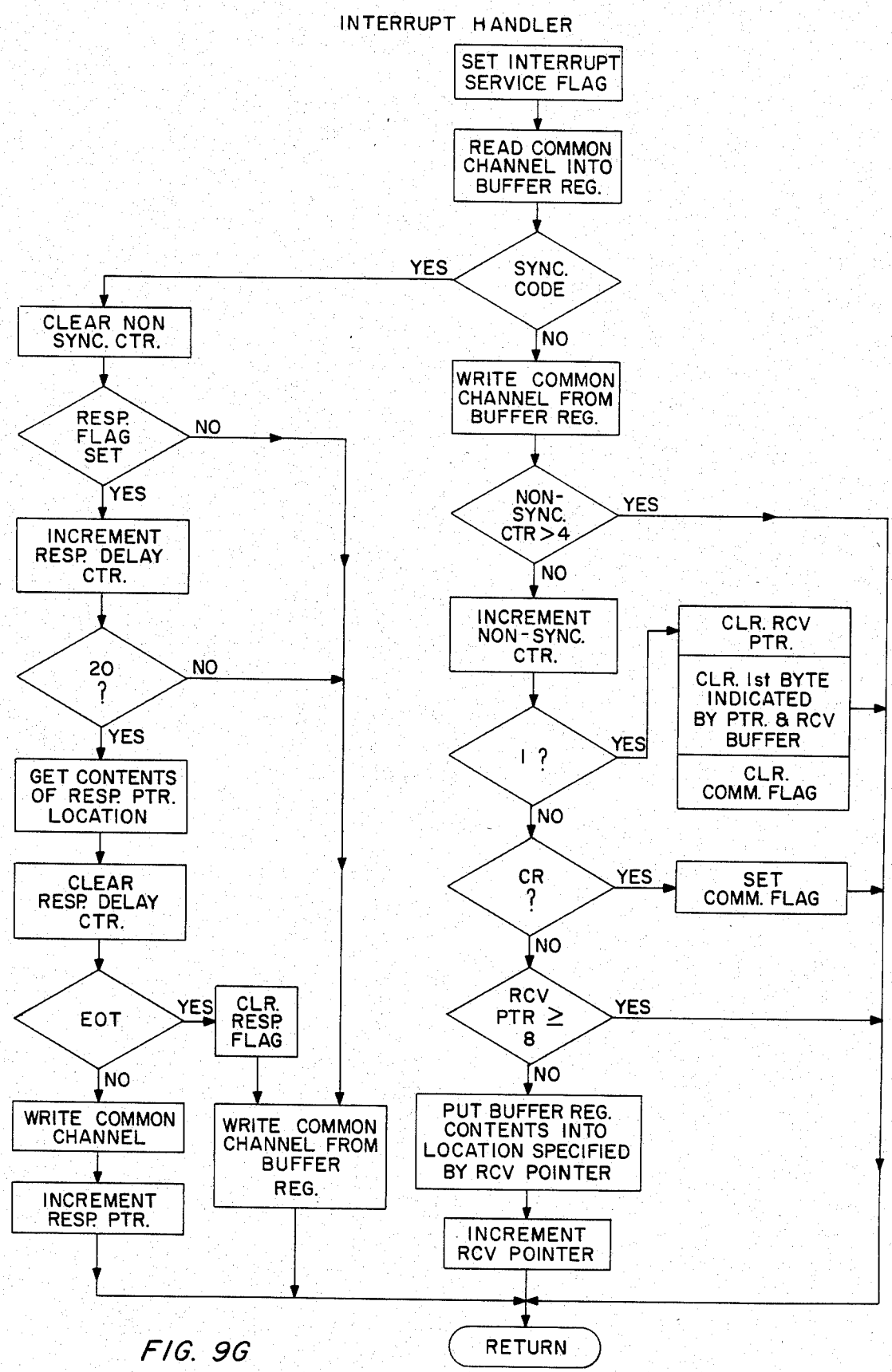
Figure 9H:
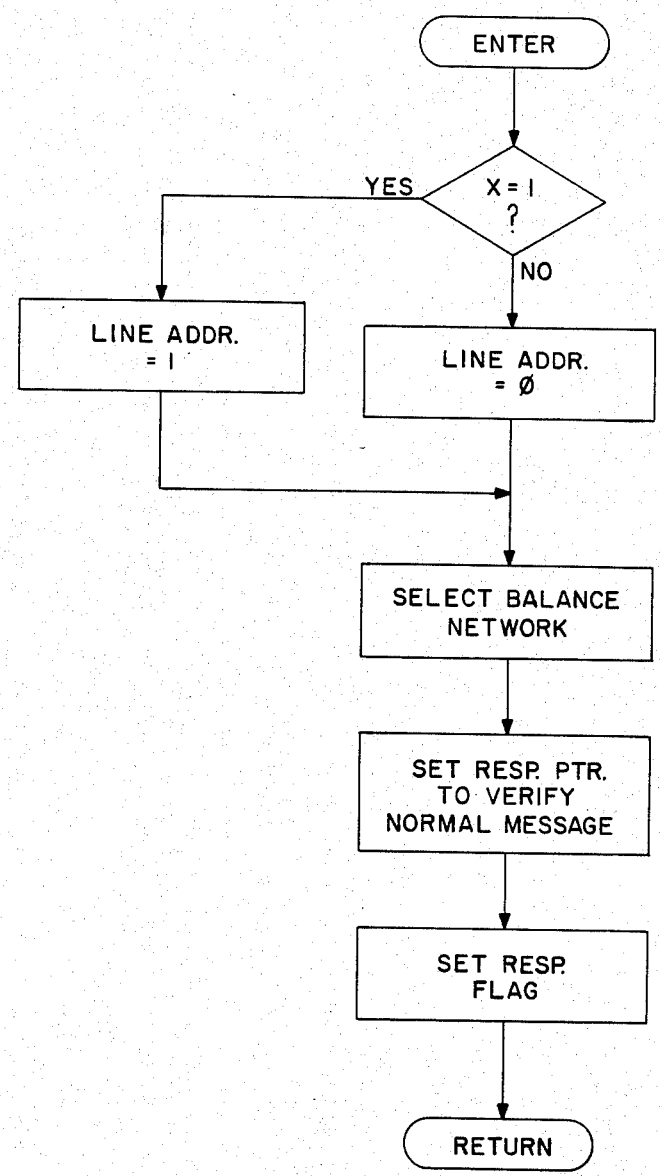
Figure 91:
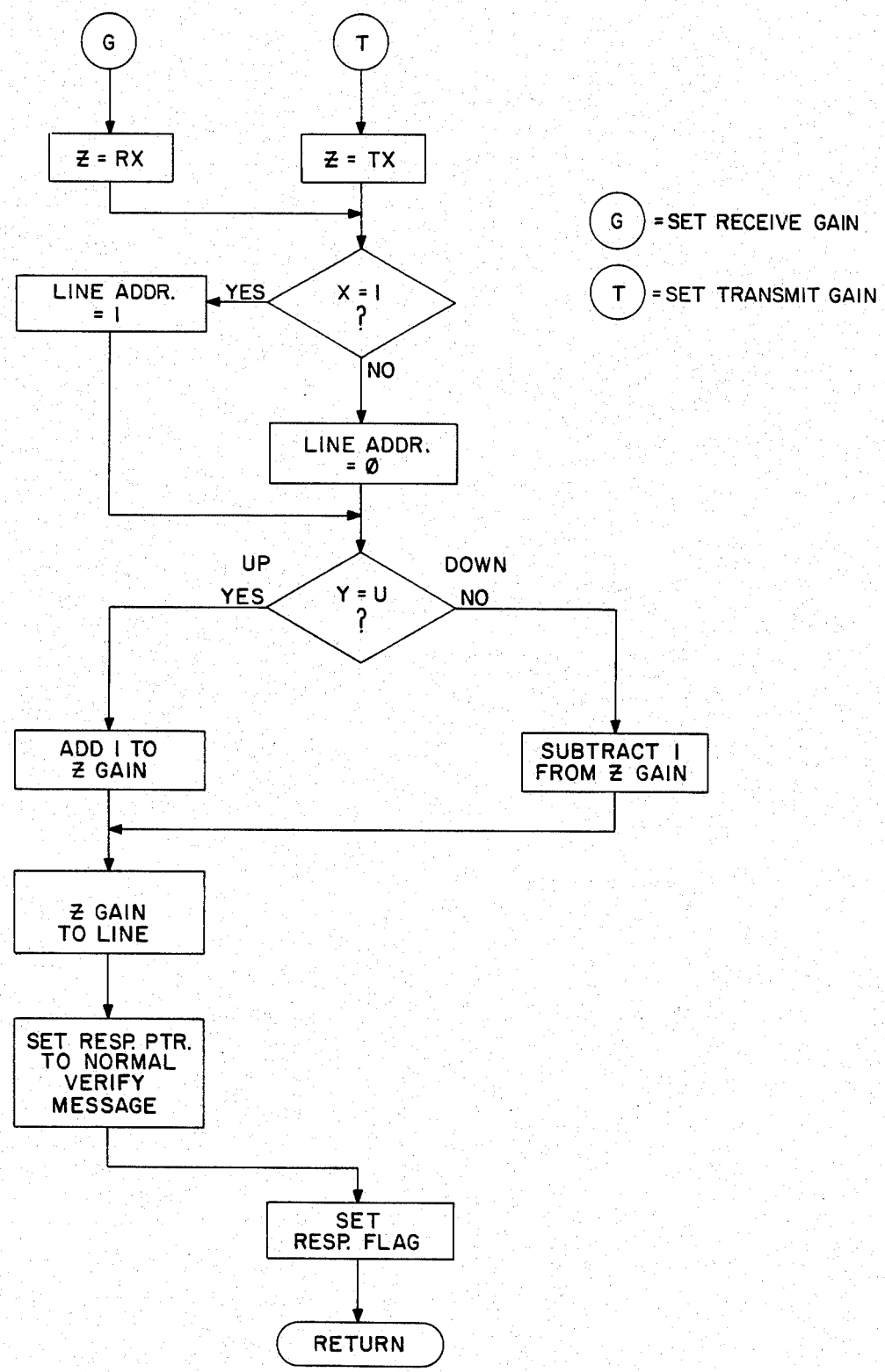
Figure 9J:
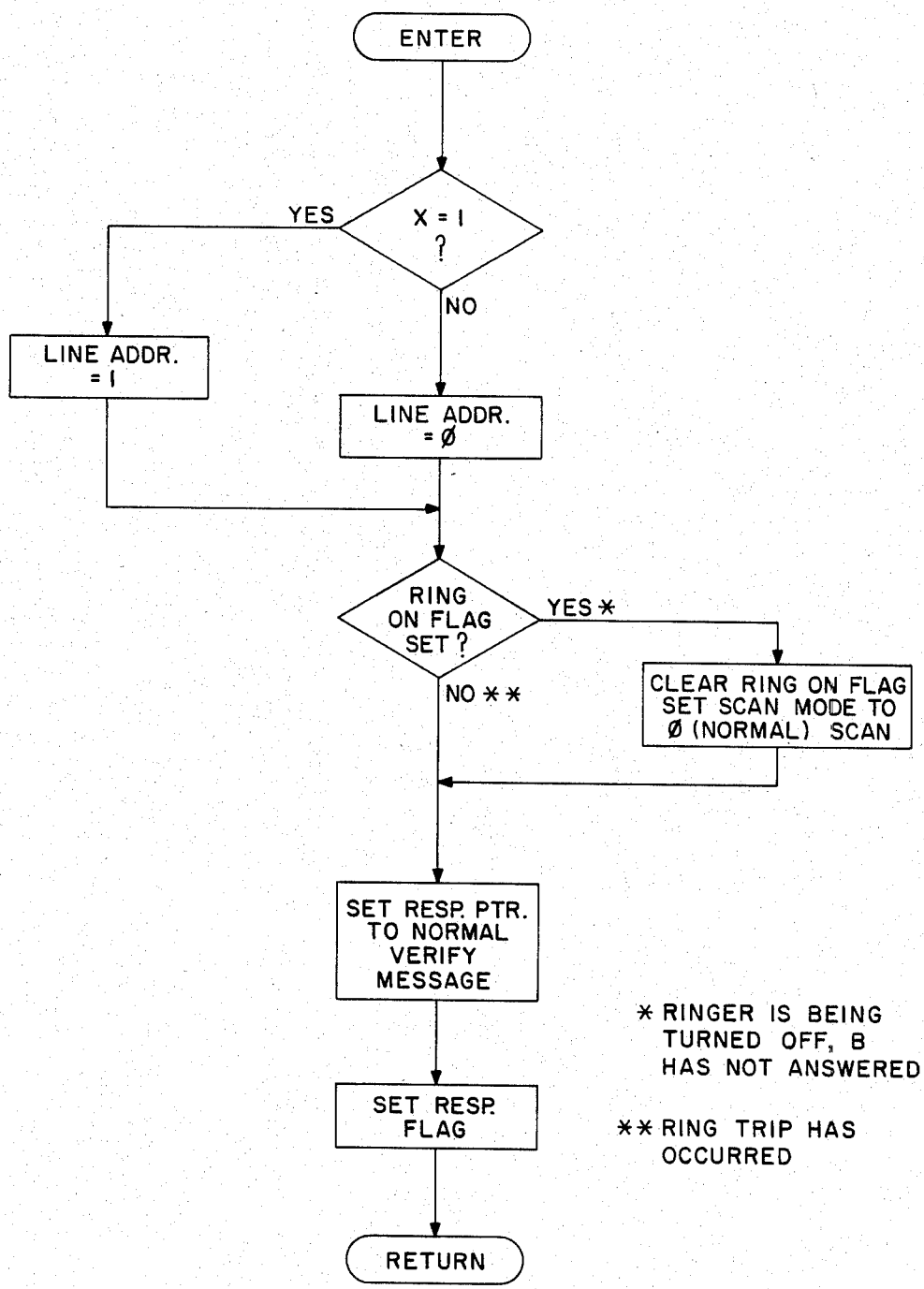
Figure 9K:
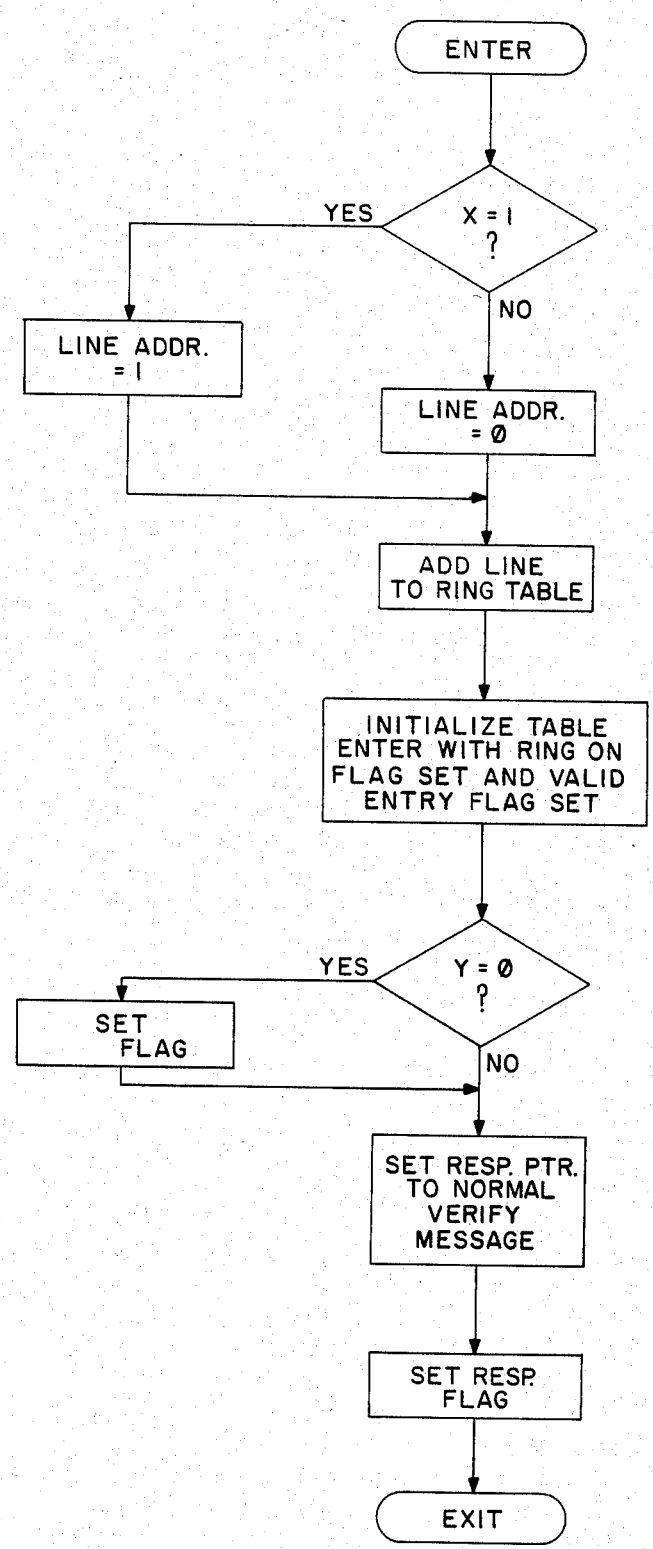
Figure 9L:
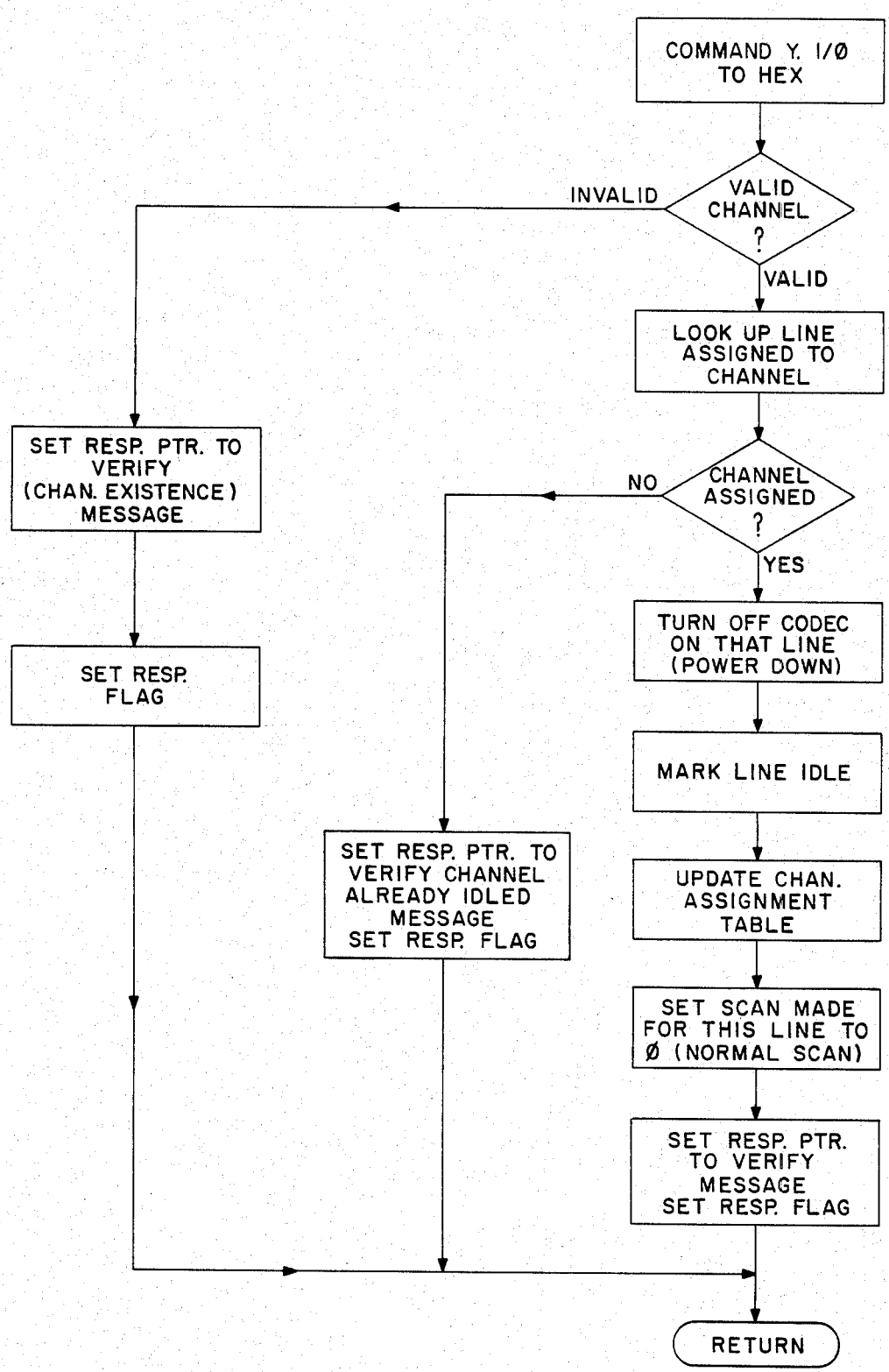

FIG. 9G illustrates the interrupt handler and common channel handle programs.

The following notes are appropriate to FIG. 9G.

EOT indicates end of test.

REV BUFF indicates receive buffer and is the first location of temporary storage for common channel commands.

RESP PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INT SERVFLAG indicates that a 2 millisec. interrupt has occurred.

RESP DLY CTR delays characters to 300 baud

Figure 9M:
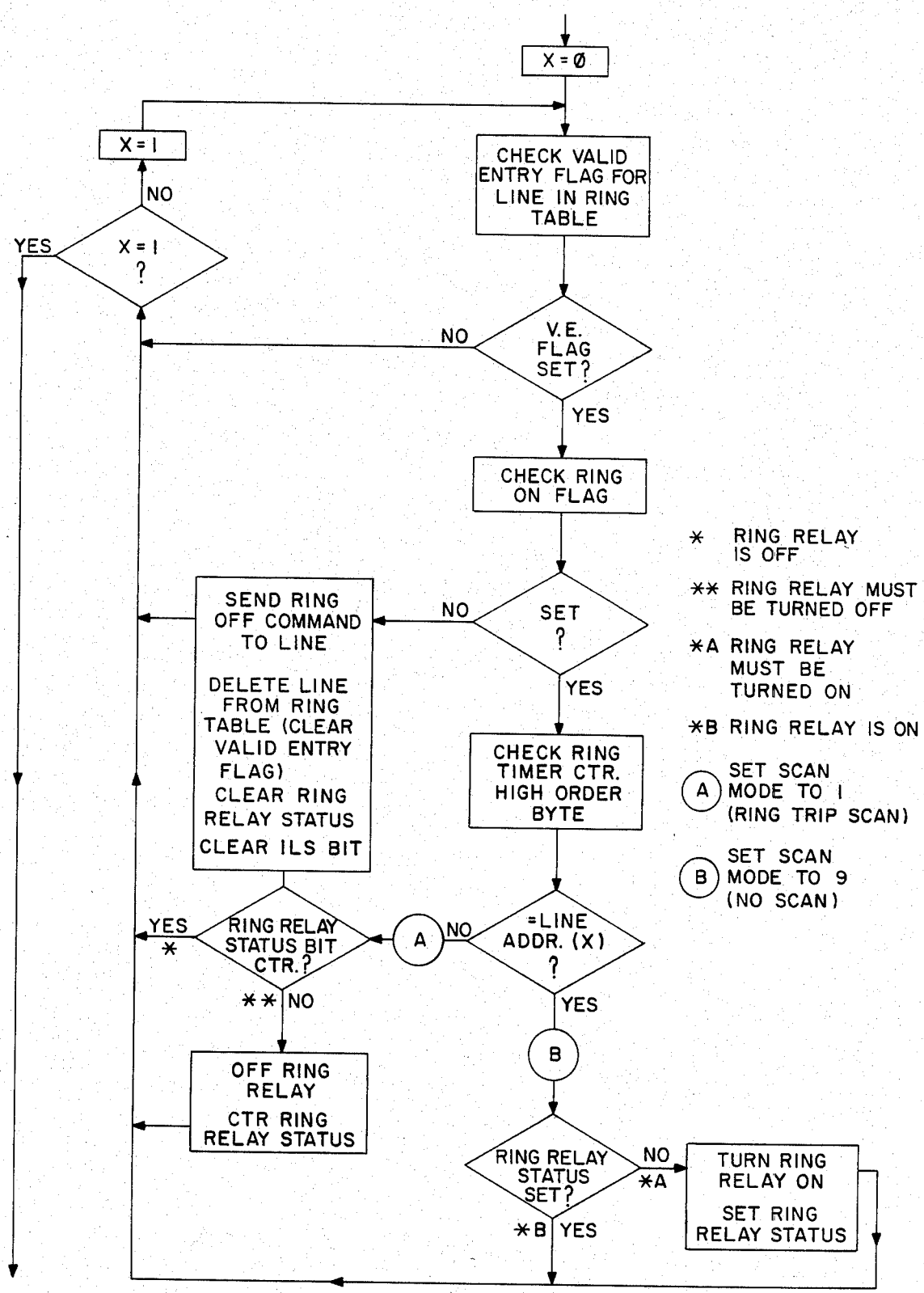
Figure 9N:
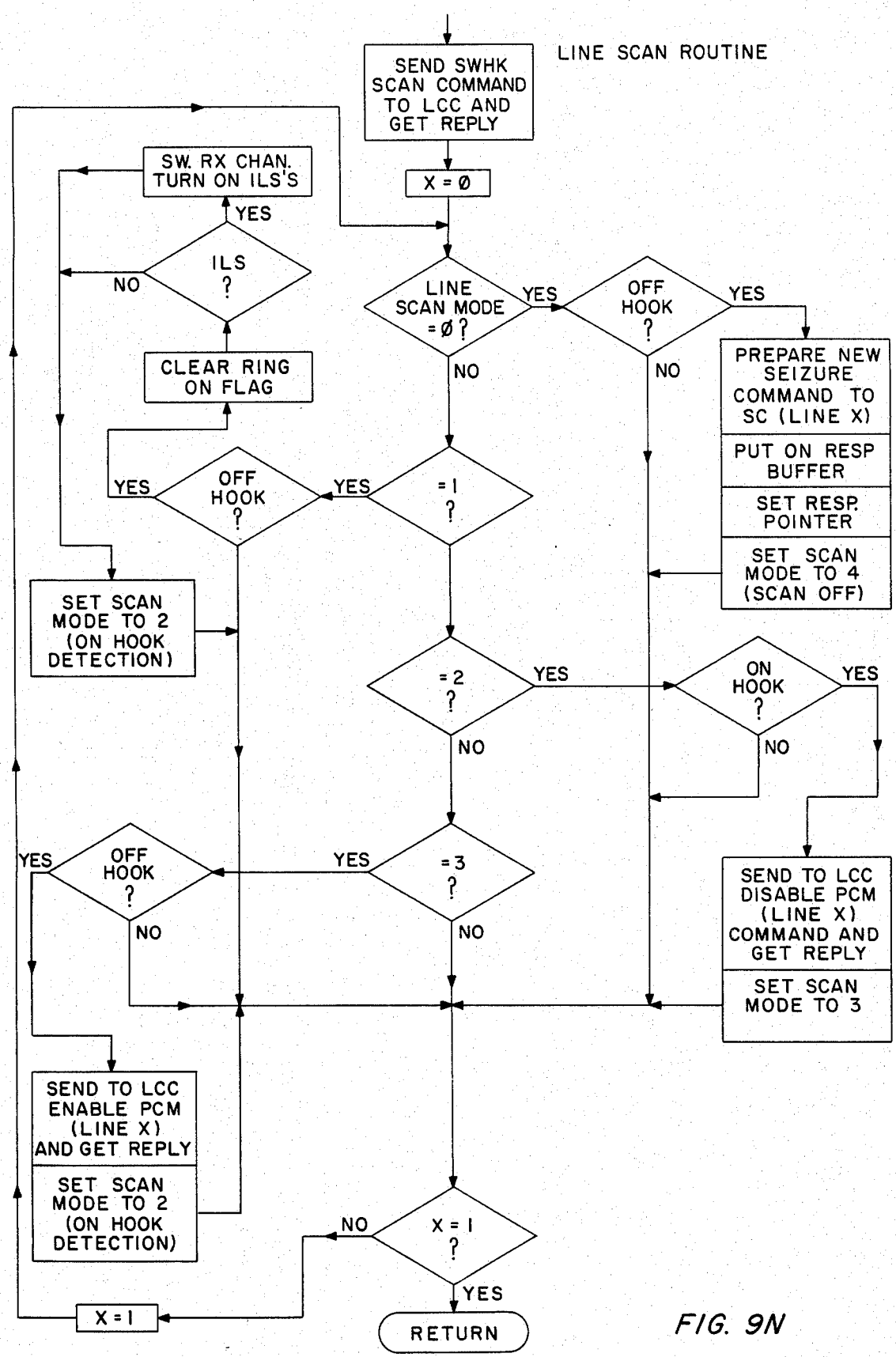

FIGS. 9H to 9L are flow charts for various task routines, FIG. 9M is a flow chart of the ringing administration program; FIG. 9N is a flow chart of the line scan routine.

6.0 BUFFER AND DISTRIBUTOR 9 (FIGS. 21, 22, 23)

Figure 21:
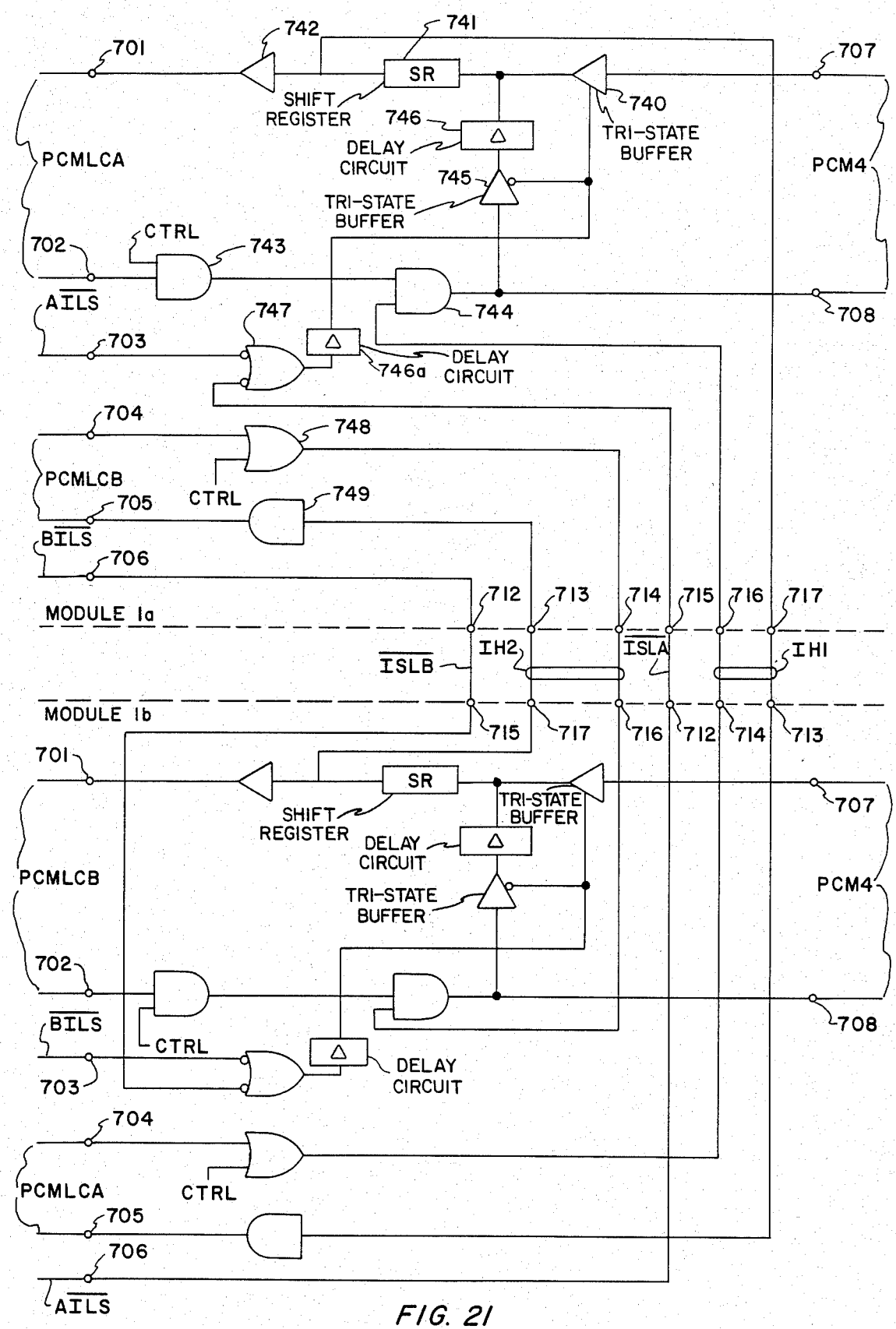
FIG. 21 illustrates in block diagram form one portion of the buffer and distributor 9 of FIGS. 2 and 2A.
Figure 22:
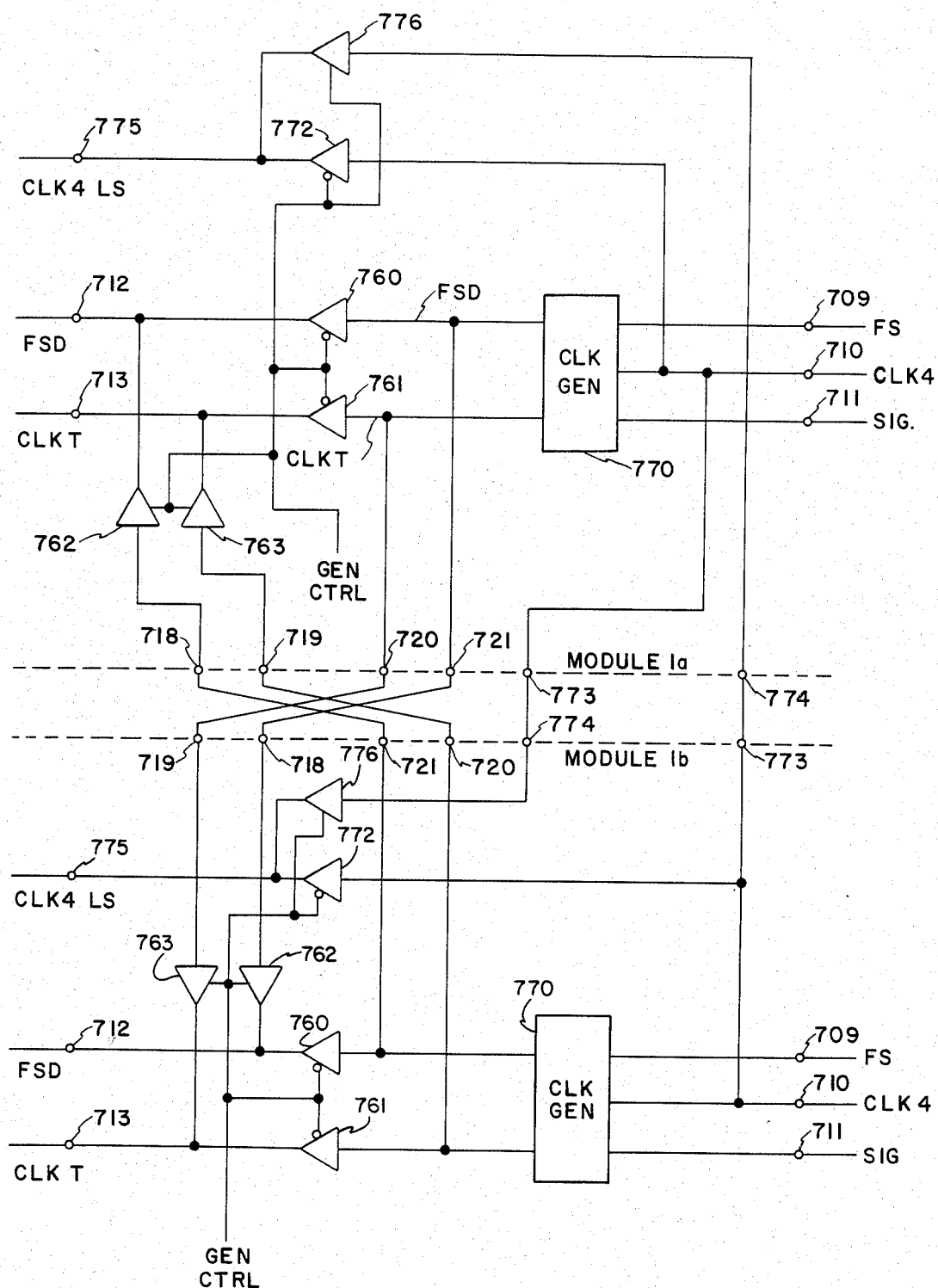
FIG. 22 illustrates in block diagram form another portion of the buffer and distributor 9 of FIGS. 2 and 2A.

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor circuits have identical designations. FIG. 21 illustrates the circuitry associated with the PCM buses PCM4, PCMLCA, PCMLCB and FIG. 22 illustrates the clock distribution circuit.

Figure 23:
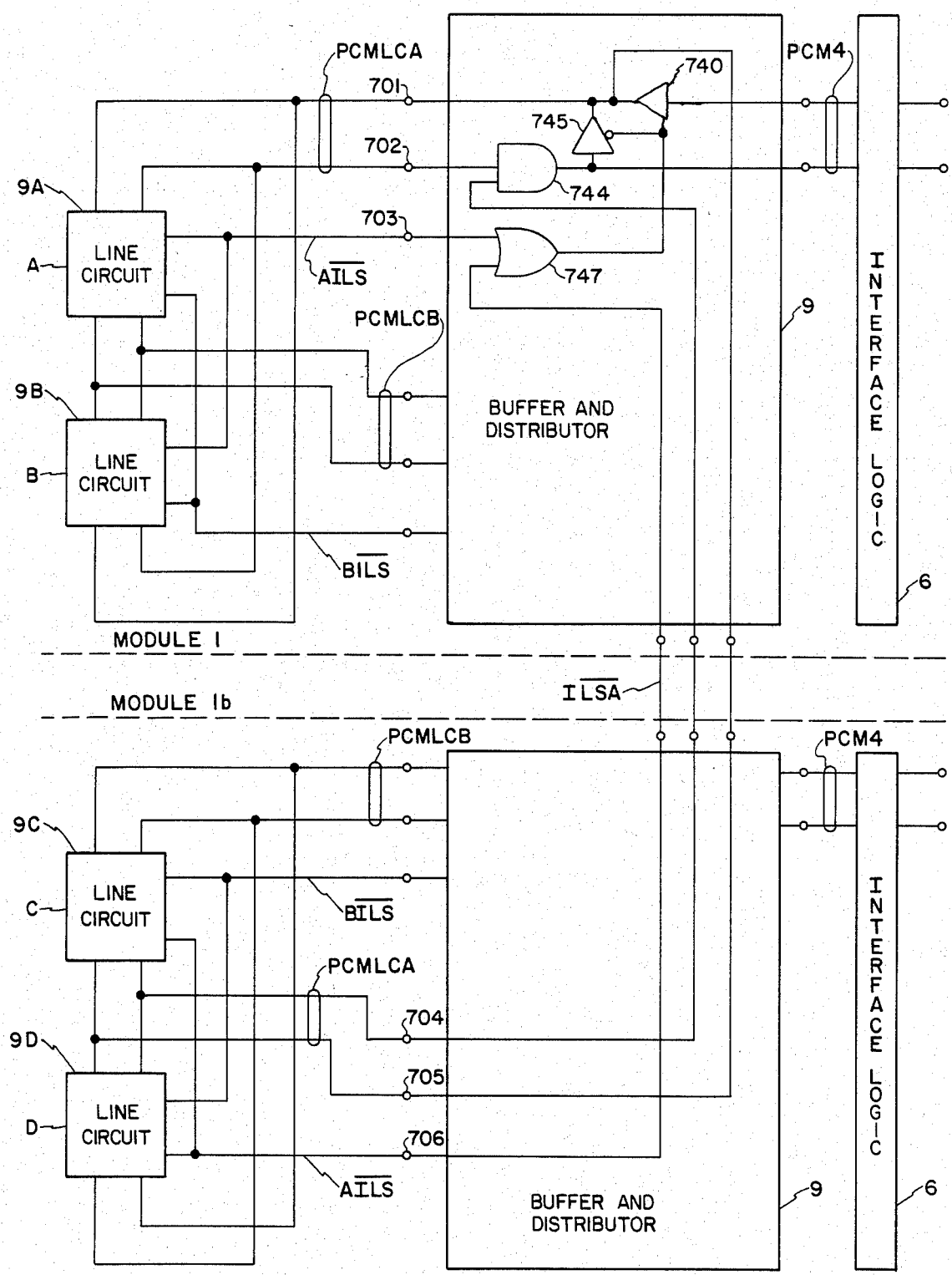
FIG. 23 is a block diagram illustrating the operation of buffer and distributor 9 of FIGS. 2 and 2A.

6.1 BUFFER (FIGS. 21 and 23)

Line switch module 1a of FIG. 21 has terminals 707 and 708 connected to PCM bus PCM4, terminals 701 and 702 connected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together, gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnected via intra-line switch highways IH1 and IH2 and leads ILSB and ILSA. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intraline switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{\text{AILS}}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to the receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCMLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line circuit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again, the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figure 24A:
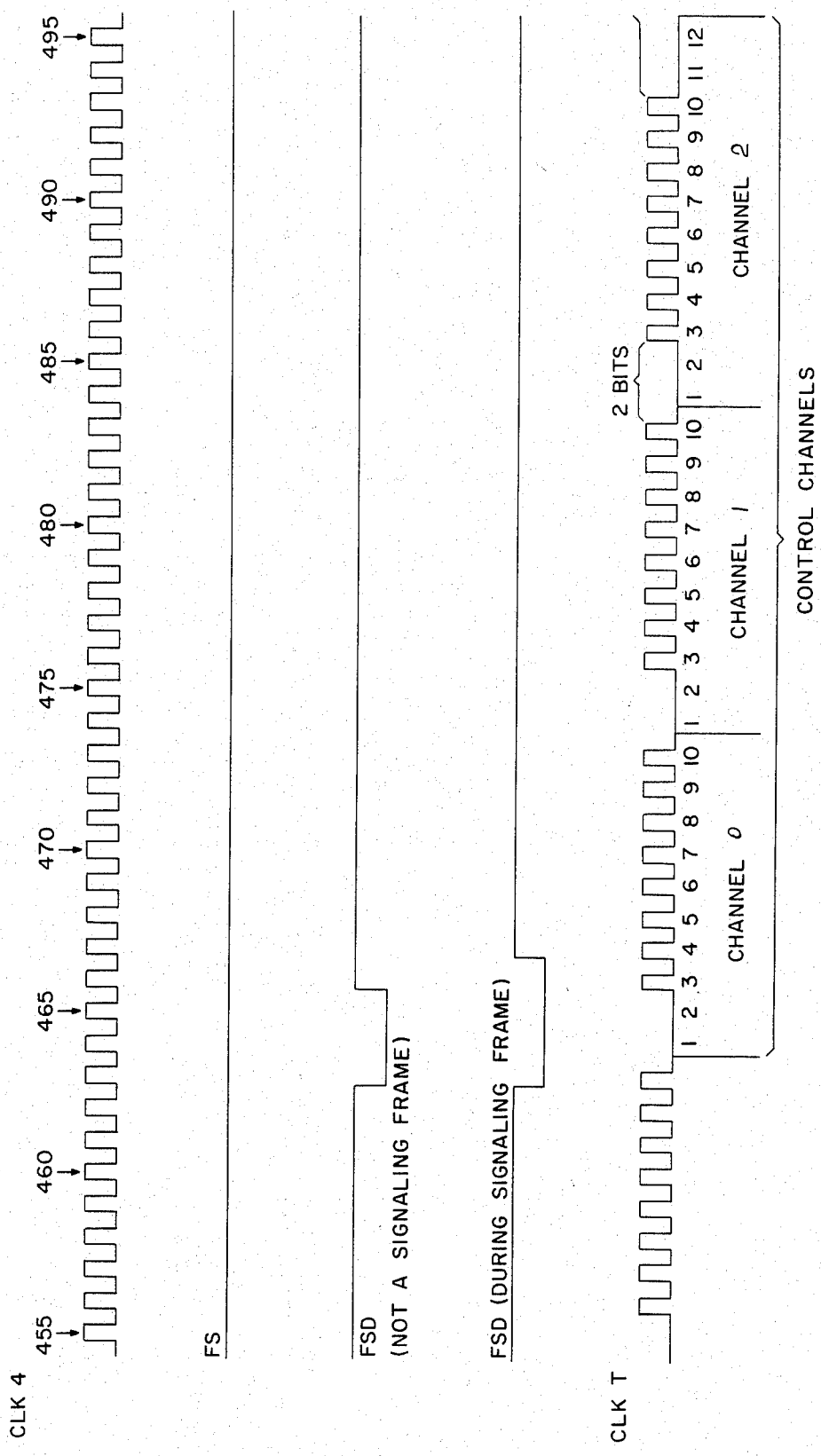

6.2 DISTRIBUTOR (FIGS. 22 and 24)

The clock distribution circuitry of the buffer and distributor circuits 9 for two line switch modules is shown in FIG. 22. EAch buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FSD and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commonly connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is likewise provided by interface logic 6 of FIG. 8 and indicates the occurrence of signaling frame, i.e., SIG is normally low and goes high the frame before a signaling frame. CLKT is a CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, the CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a, or 1b may be utilized as the source for 4.096 mHz clock signals on lead CLK4LS.

7.0 LINE CARD OR GROUP (FIG. 25)

Figure 25A:
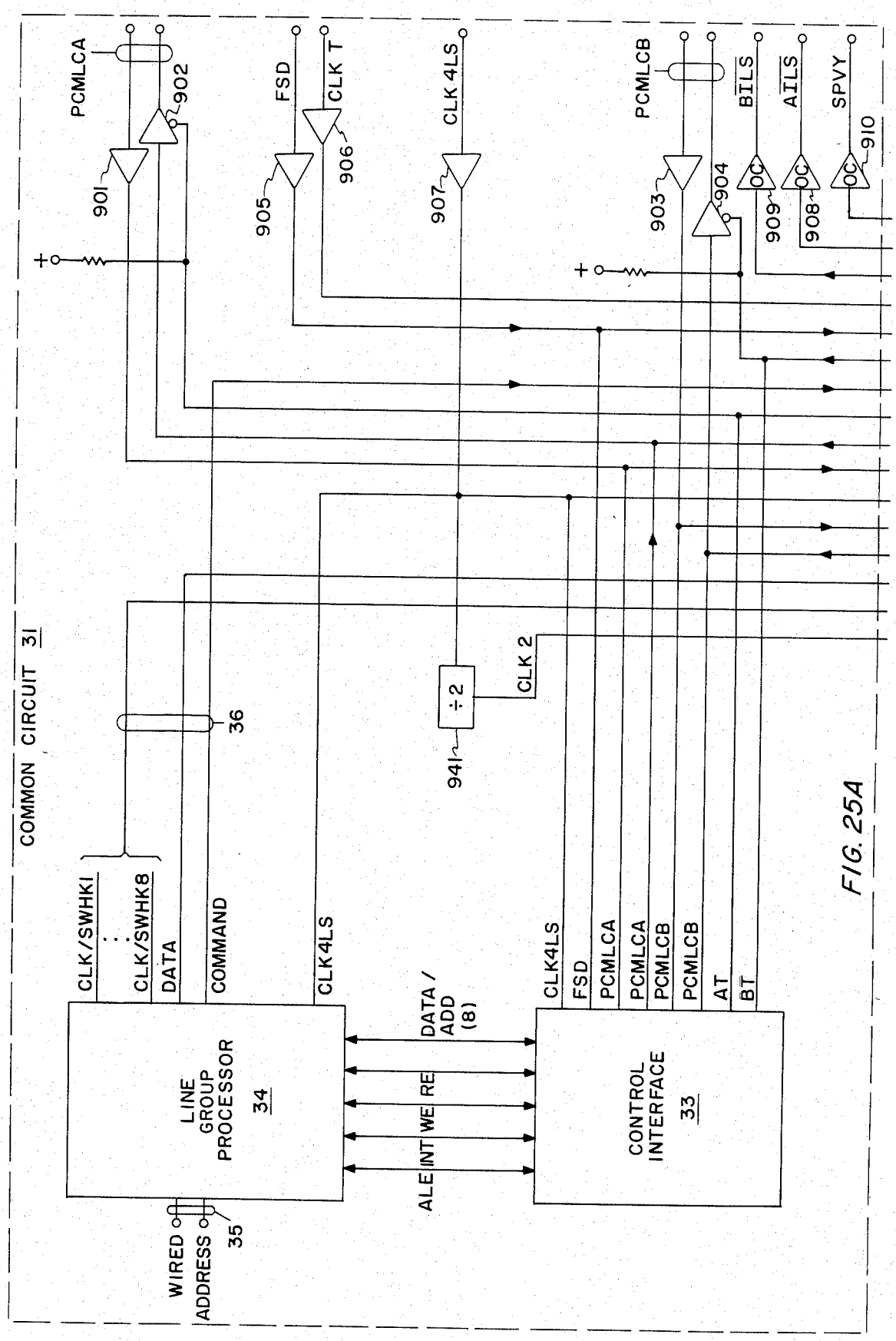
Figure 25B:
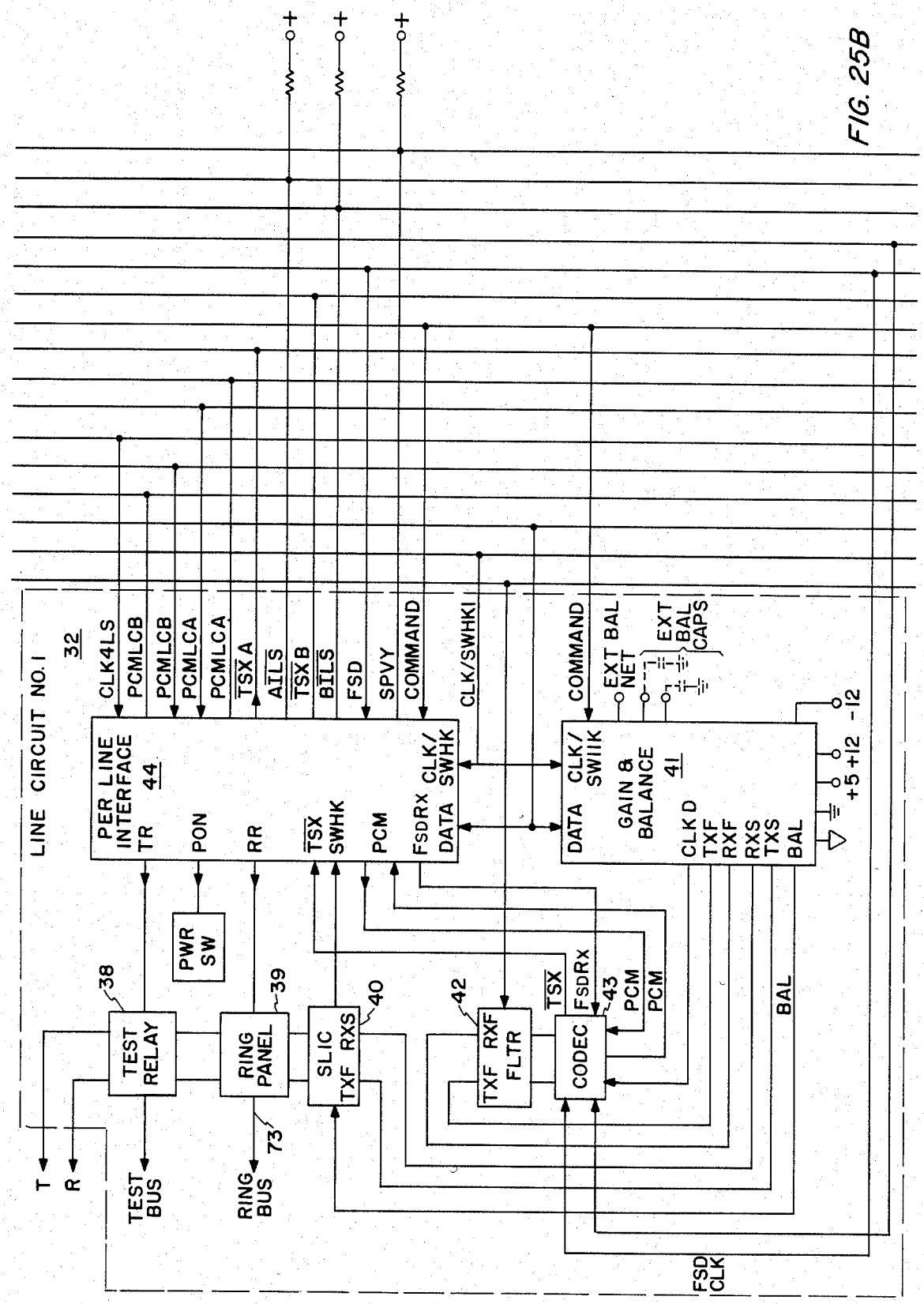

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is stored by the control interface 33. The line group address is supplied to the processor 34 by leads 35 to provide a unique address to the line card.

Other control data are communicated between the processor 34 and the PCM buses PCMLCA, PCMLCB via the control interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., where control information is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn(n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$, and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wire-ored" to gate 910.

The 4.096 mHz clock CLK4LS is applied to a divide by two circuit 941 which provides a 2.048 mHz clock signal CLK2 for use by the line circuits.

7.1 LINE CIRCUIT (FIGS. 25, 26, 27)

Each line circuit 32 includes conventional line circuit transmission components: test and ring relays 38 and 39, a subscriber line interface circuit 40, a filter circuit 42 and a CODEC 43. The CODEC 43 is of a known type which is operate in a so called "microprocessor controlled mode" of operation, wherein the channel assigned by a line switch or system controller to the associated line circuit is stored by the CODEC and is used to determine when the CODEC will become active. The CODEC may be defined as "active" when the CODEC is transmitting or receiving over PCM buses. One such CODEC is commercially available from the INTEL Corporation and is identified as type number 2910A.

Each line circuit 32 further includes a per line control interface 44 which interfaces between the common circuit 31 and the line circuit transmission components. Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1-3 are address bits for the per line control interface 44; bit 4 is unused; bit 5 is set according to whether the line card is in a system using 8 bit or 10 bit PCM words on its buses; bits 6, 7 and 8 are used to control external components such as power control, device test relay, and ring relay; bit 9 enables the line circuit; bit 10 is used to signify intraline switch calls; and bit 11 selects which of the two PCM buses PCMLCA or PCMLCB will be utilized by the line circuit.

Figures 27, 27B:
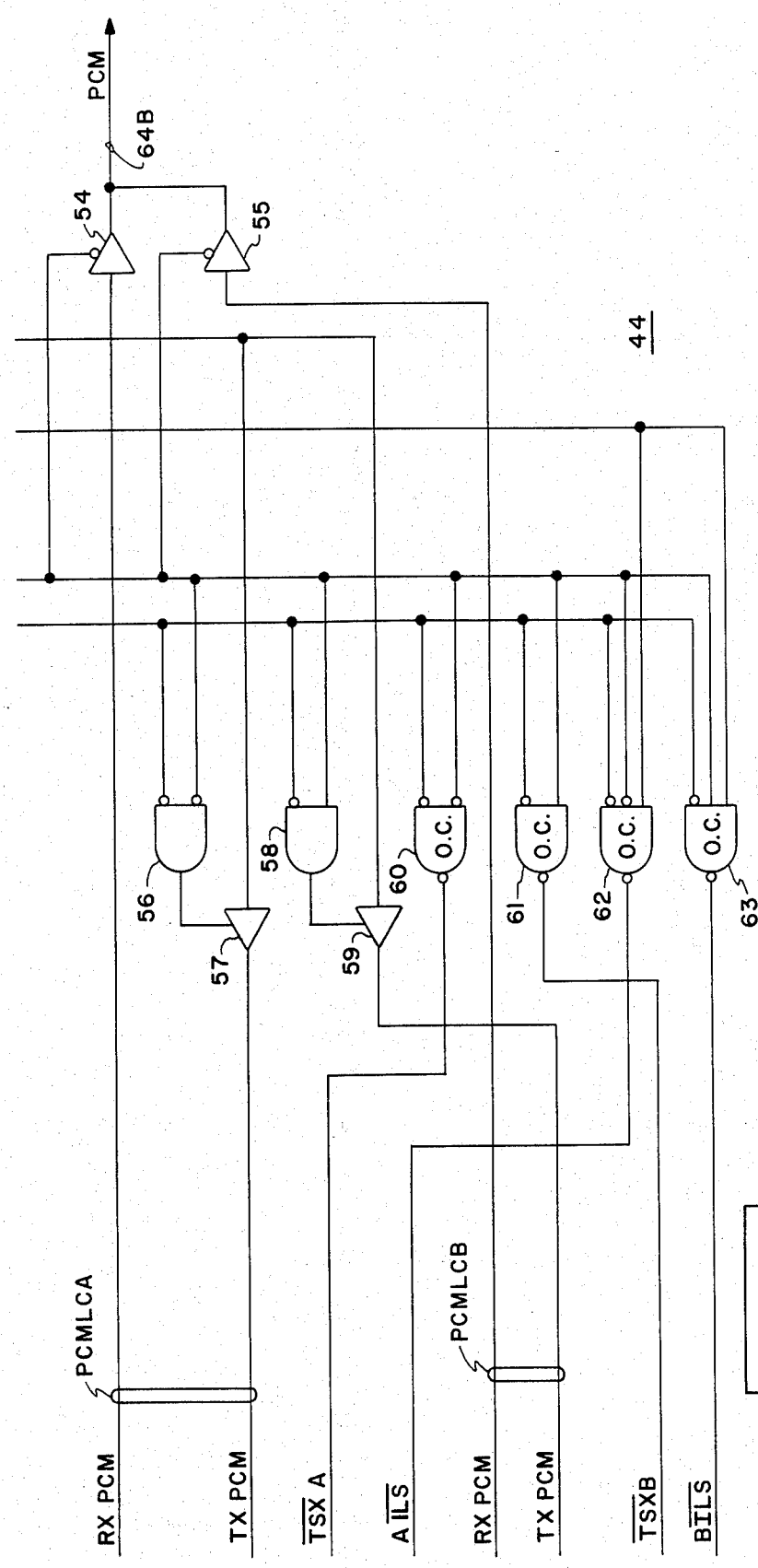
FIGS. 27A and 27B when arranged as shown in FIG. 27 illustrate in block diagram form the per line control interface 44 of FIG. 25.
Figure 27A:
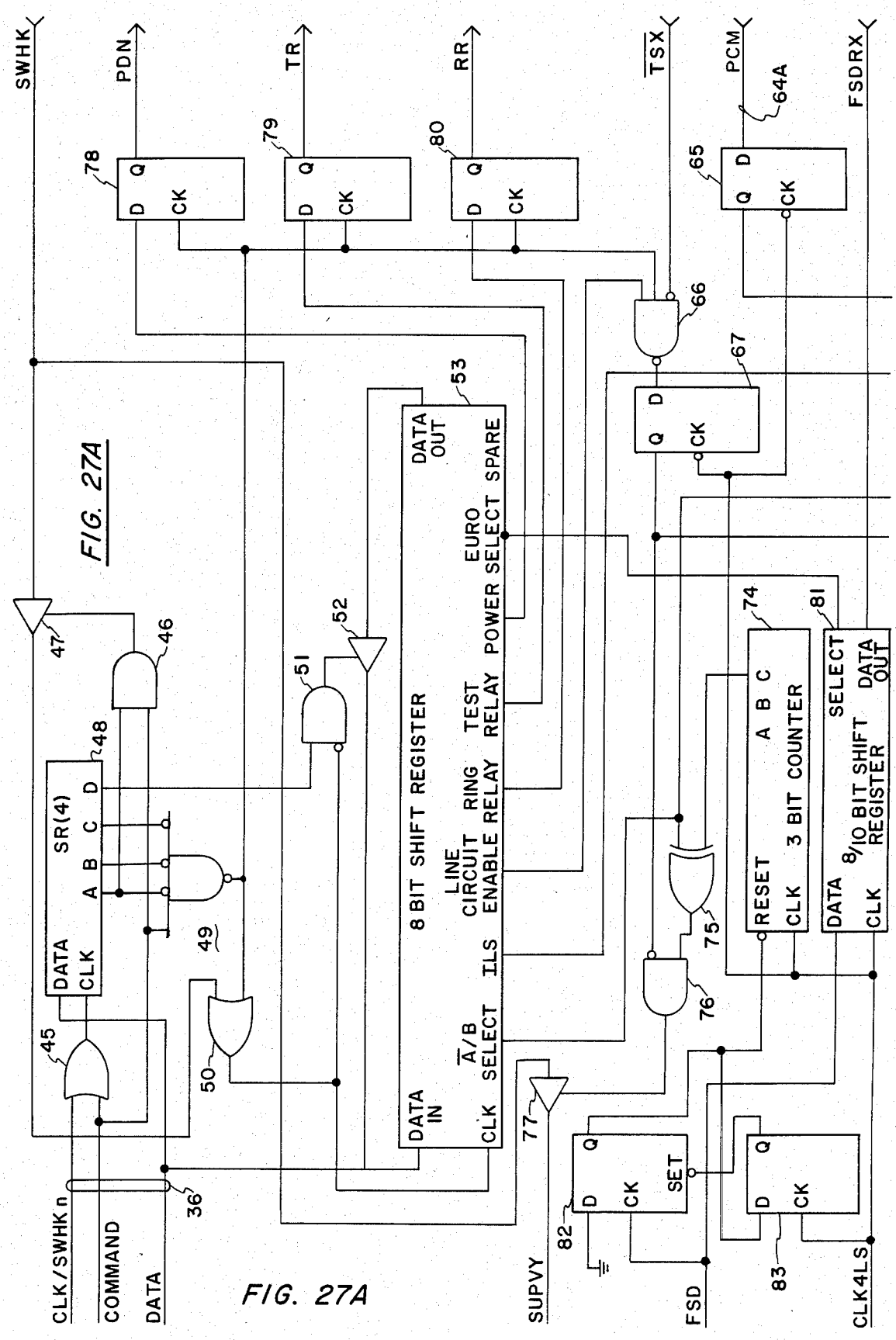

One of the per line interfaces 44 of FIG. 25 is shown in greater detail in FIG. 27. The CLK/SWAK$_n$ lead is a dual function lead. More specifically, one function of this lead is that of a normal clock lead to clock data into or out of the line interface circuits 44. The other function of the CLK/SWHK$_n$ lead is to return switch hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHK$_n$, which is connected to the SLIC 40 of FIG. 25 and indicates current switch hook status, to the line card processor 34 of FIG. 25 via CLK/SWHK$_n$ lead. When the COMMAND lead is low, gate 45 is enabled and control bits from the DATA lead of bus 36 are shifted into shift register 48. After the four control bits 0-3 are loaded in register 48, the COMMAND lead goes high disabling gate 45 thereby holding the control bits in register 48. Gates 49 and 50 form a decoder circuit to gate clock pulses from the CLK/SWHK$_n$ lead to shift register 53. Similarly, gates 51 and 52 determine whether data will be stored in or read from register 53. If data is to be stored in register 53, the next eight bits, i.e., bits 4-11 of the control word are shifted into the register 53 from the Data lead. The A/B select lead control gates 54, 55, 56, 58 to connect either bus PCMLCA, or PCMLCB to the coded PCM bus 64A, 64B. Flip-flop 65 provides buffer timing for the transmit PCM signal from bus 64A.

The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are controlled by the $\overline{A}$/B select bit to sheer the $\overline{TSX}$ signal to leads $\overline{TSXA}$ or $\overline{TSXB}$. The Q output of flip-flop 67 is also coupled to gates 62 and 63 which are controlled by the $\overline{A}$/B select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the $\overline{AB}$ signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The A/B select bit controls gate 75 to determine in which of the two parts of a channel the switch hook information is to be gated. Gates 76 and 77 gate the switch hook information from flip-flop 67 to supervisory lead SUPVY. The line circuit enable bit controls gating of the lead $\overline{TSX}$ at gate 66 for maintenance purposes, i.e. if it is determined that a CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 control connections to a test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e. bit 5 of FIG. 26, determines whether the channel delay corresponds to 8 or 10 bits.

7.2 GAIN/BALANCE (FIGS. 25, 28, 29, 30, 31)

Turning back to FIG. 25, the gain/balance control circuit 41 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30:
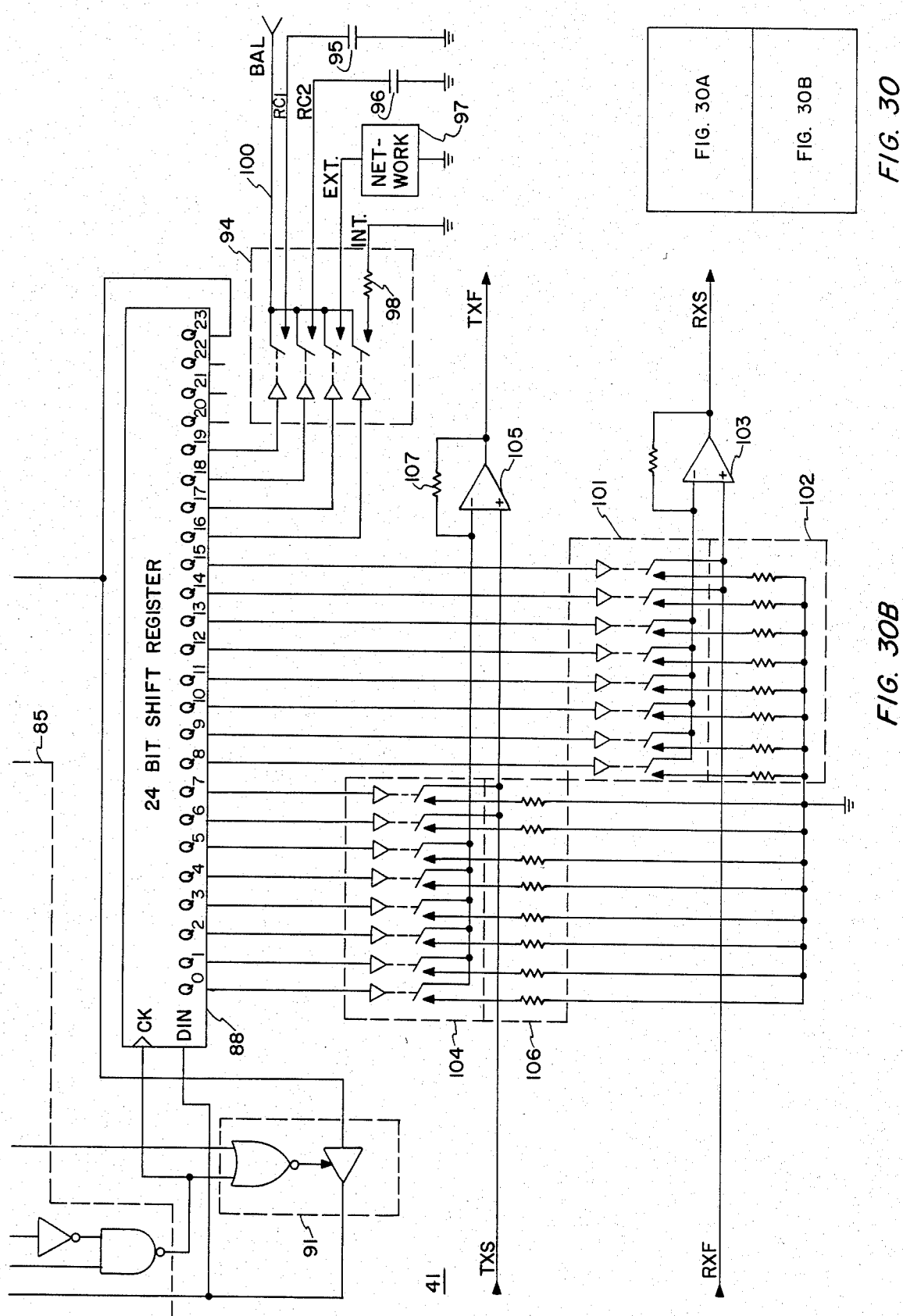
FIGS. 30A and 30B when arranged as shown in FIG. 30 show in block diagram form the gain/balance circuit 41 of FIG. 25B.
Figure 30A:
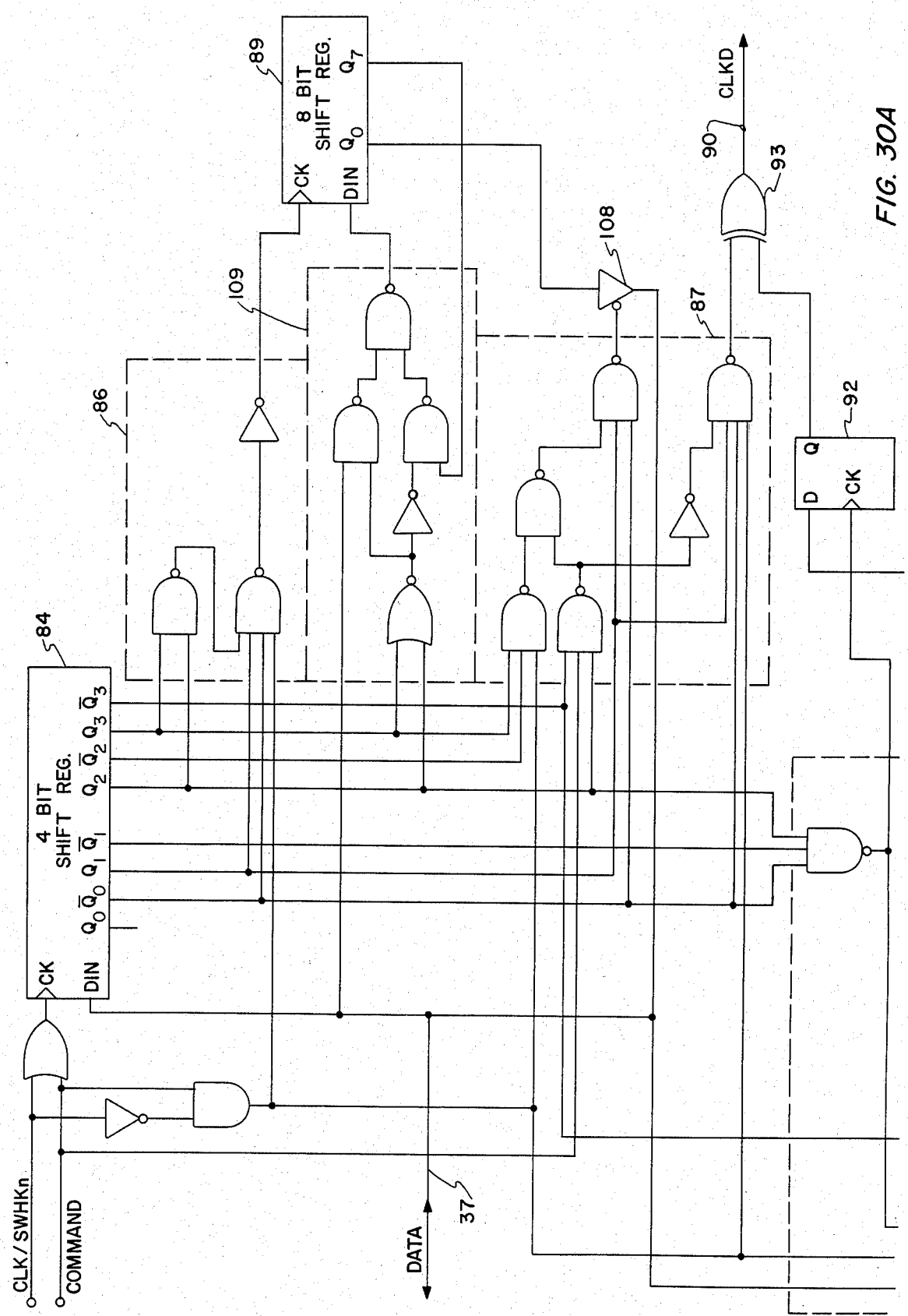

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above activate decoder 85, then the next 24 bits are then stored in register 88. The clock control bit stored in bit Q23 of register 89 controls the state of flip flop 92 which in turn is connected to EXCLUSIVE-OR gate 93 to determine whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect resistors 106 to one input of amplifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connected in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whether a portion of a control word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of register 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits recorded into the CODEC from register 89 back into register 89.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated by Bytes 1–4. Byte 1 may include one parity bit which is calculated over the entire word, and includes seven address bits. Byte 2 includes five function bits which control the function that line card processor 34 is to perform, and three bits to designate which one of the eight line circuits on a line card is to be affected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include response data in Bytes 3 and 4.

7.3 PROTOCOL INTERFACE CIRCUIT/CONTROL INTERFACE 33 (FIGS. 25, 32)

Figures 32, 32A:
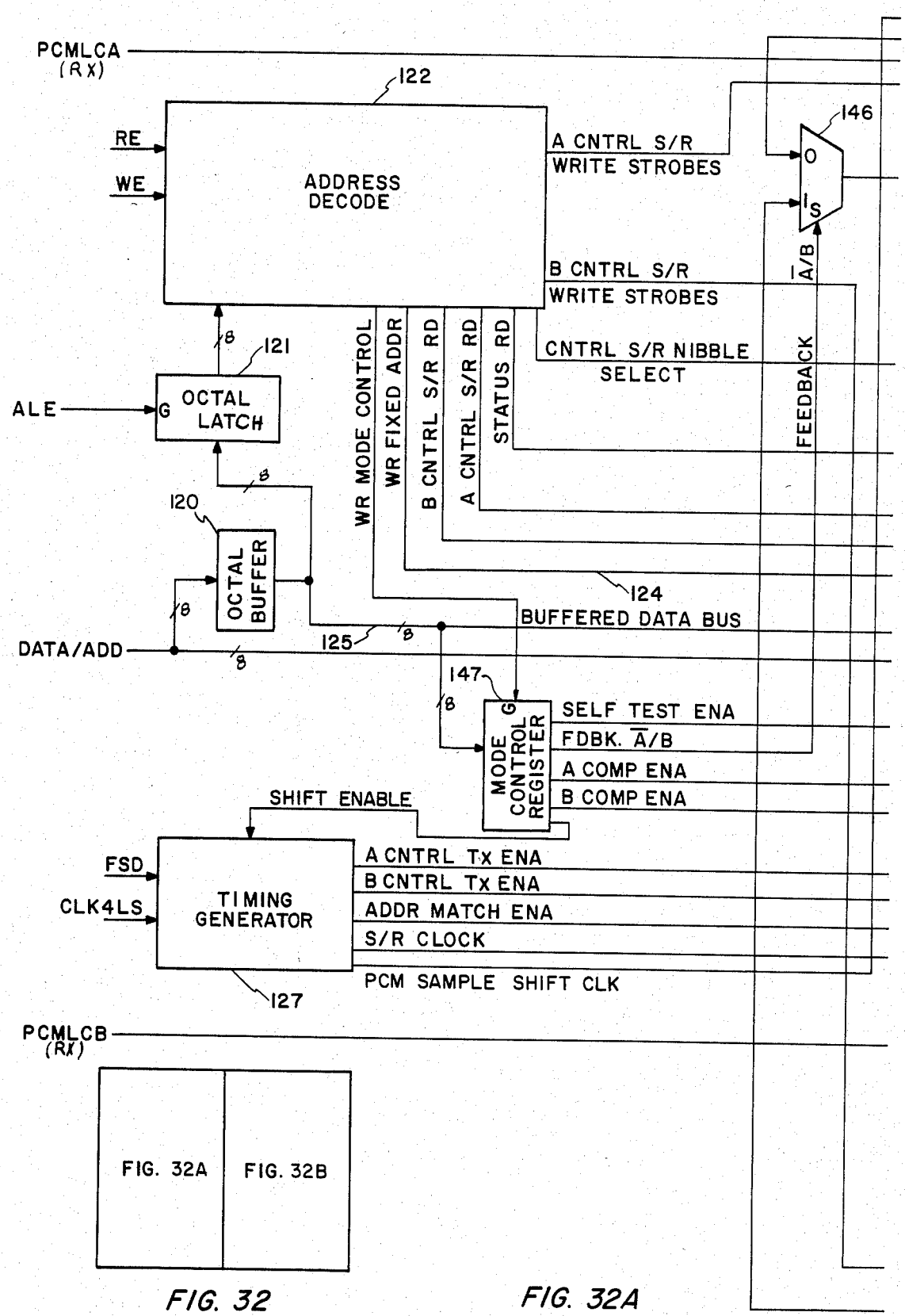
FIGS. 32A and 32B when arranged as shown in FIG. 32 illustrate in block diagram form the control interface 33 of FIG. 25A.
Figure 32B:
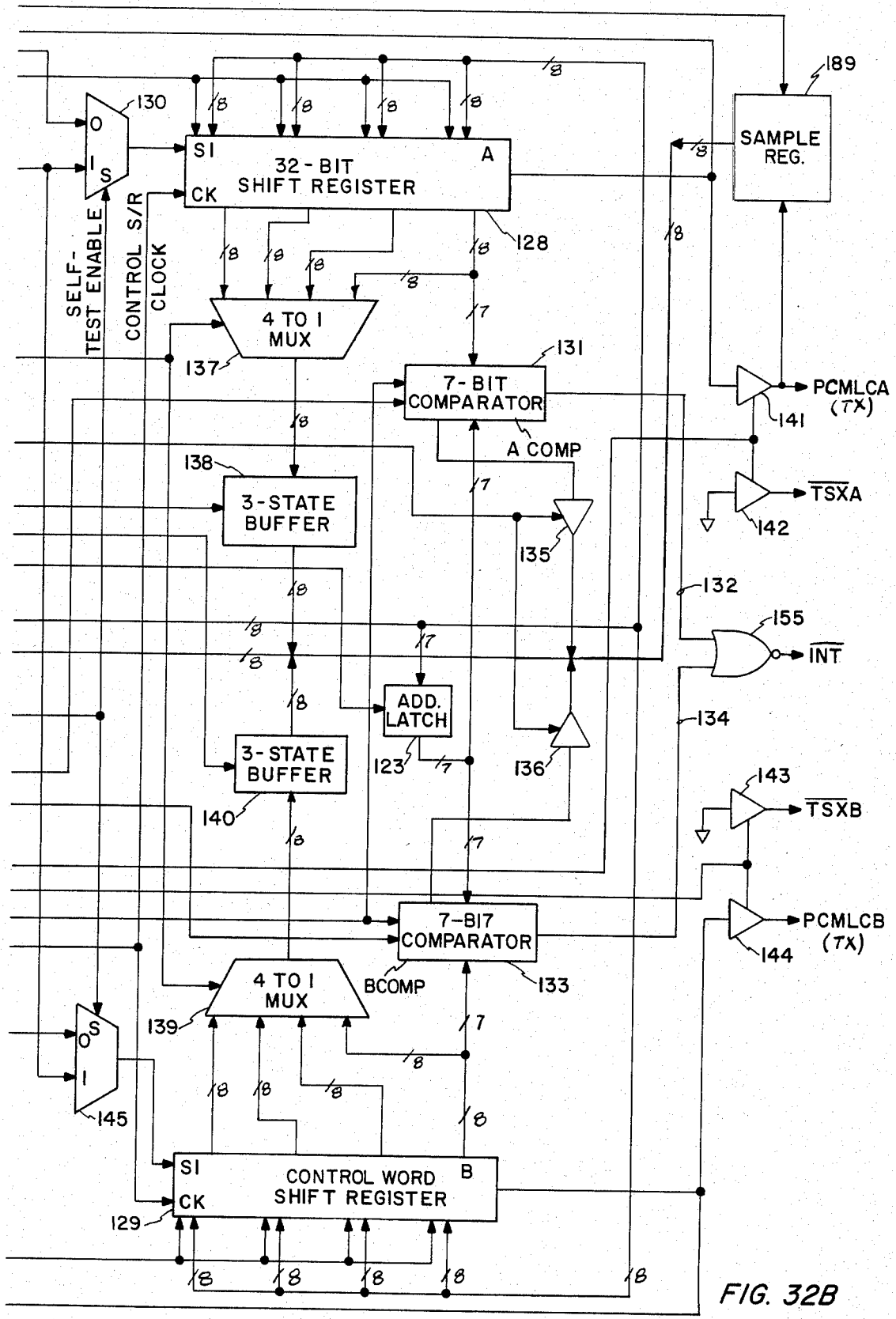

The control interface 33 of FIG. 25 comprises the protocol interface circuit PIC and as shown in detailed block diagram form in FIG. 32 is connected to buses PCMLCA and PCMLCB. For purposes of clarity, single lines are used to represent multi-line buses and the number of lines in a bus is indicated at various points along the bus.

Initially, the line group processor 34 of FIG..25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR MATCH ENA lead thereby enabling a comparator 131 which compares the address portion of the control word in register 128 with the line group address stored in latch 123 and generates a signal on lead 132 if the addresses are the same. Similarily control word received on bus PCMLCB are stored in register 129 via selector 145 and the address portion thereof is compared to the line circuit address by comparator 133 which generates a signal on lead 134 if those addresses are the same. Gate 155 logically "or's" leads 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an address over the DATA/ADD bus. The address is stored in latch 121 and decoded by decoder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is written into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{\text{TSXA}}$ and $\overline{\text{TSXB}}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The resistor 147 is also provided for maintenance purposes and permits the processor 34 to disable either or both of the comparators 131, 133 and to control selectors 130, 145 and 146.

7.4 SELF TEST (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 129 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK $\overline{A}/B$ line operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=Cl, byte 3=F8, byte 4=∅F. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 modulo 32) places after each 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=OF, byte 3=63 and byte 4=Cl. Any mismatch of the data in the A and B registers 128 and 129 with the expected data indicates a failure.

FIGS. 34 and 35 are a program listing in MCS-48 assembly language code implementing the self-test operation for a line group controller.

7.5 AUTOMATIC GAIN SETTING (FIGS. 25, 30, 32, 36, 37A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By choosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. The peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear units lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin ωt. If decision level 118 is represented by A' then $$A' = A \sin\left(\frac{\pi}{2} - Q\right) \quad (1)$$

where $(\pi/2)-Q$ represents the angular displacement from zero degree where the reference signal reaches level 118.

Solving equation (1) for Q yields $$Q = \frac{\pi}{2} - \sin^{-1}\frac{A'}{A} \quad (2)$$

The probability that any one PCM sample in a group of 125 successive samples will be above level 118 is $$P = \frac{4Q}{2\pi} = \frac{2Q}{\pi} \quad (3)$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \quad (4)$$

The number of PCM samples in a group of 125 successive samples which will be at level 118 for a 0 dBm signal is $$N = 125 \, P \quad (5)$$

For a 0 dBm signal
A=5664
A'=5599
and N may be calculated as 12.08.

Equations 1-5 may be used to determine the signal levels corresponding to the number of occurrences N of level 118 samples in a successive group of 125 PCM samples yielding the results shown in the table below:

TABLE

| N | A(dBm) | N | A(dBm) | N | A(dBm) |
|---|--------|---|--------|---|--------|
| 1 | −.0998 | 9 | −.0447 | 16 | +.0762 |
| 2 | −.0978 | 10 | −.032 | 17 | +.0992 |
| 3 | −.0944 | 11 | −.0173 | 18 | +.1236 |
| 4 | −.0896 | 12 | −.0014 | 19 | +.1494 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 |   |        |    |        |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multipled to all the test relays of a line group and may also be multiplied to all line groups in a line switch module. Alternatively, the serial test buses may be utilized within a line switch module, each test bus being multipled to one or more line groups. To set the TX gain of a line circuit, i.e., the gain of amplifier 105, the line switch controller will connect an analog milliwatt generator to the proper test bus.

Figure 36:
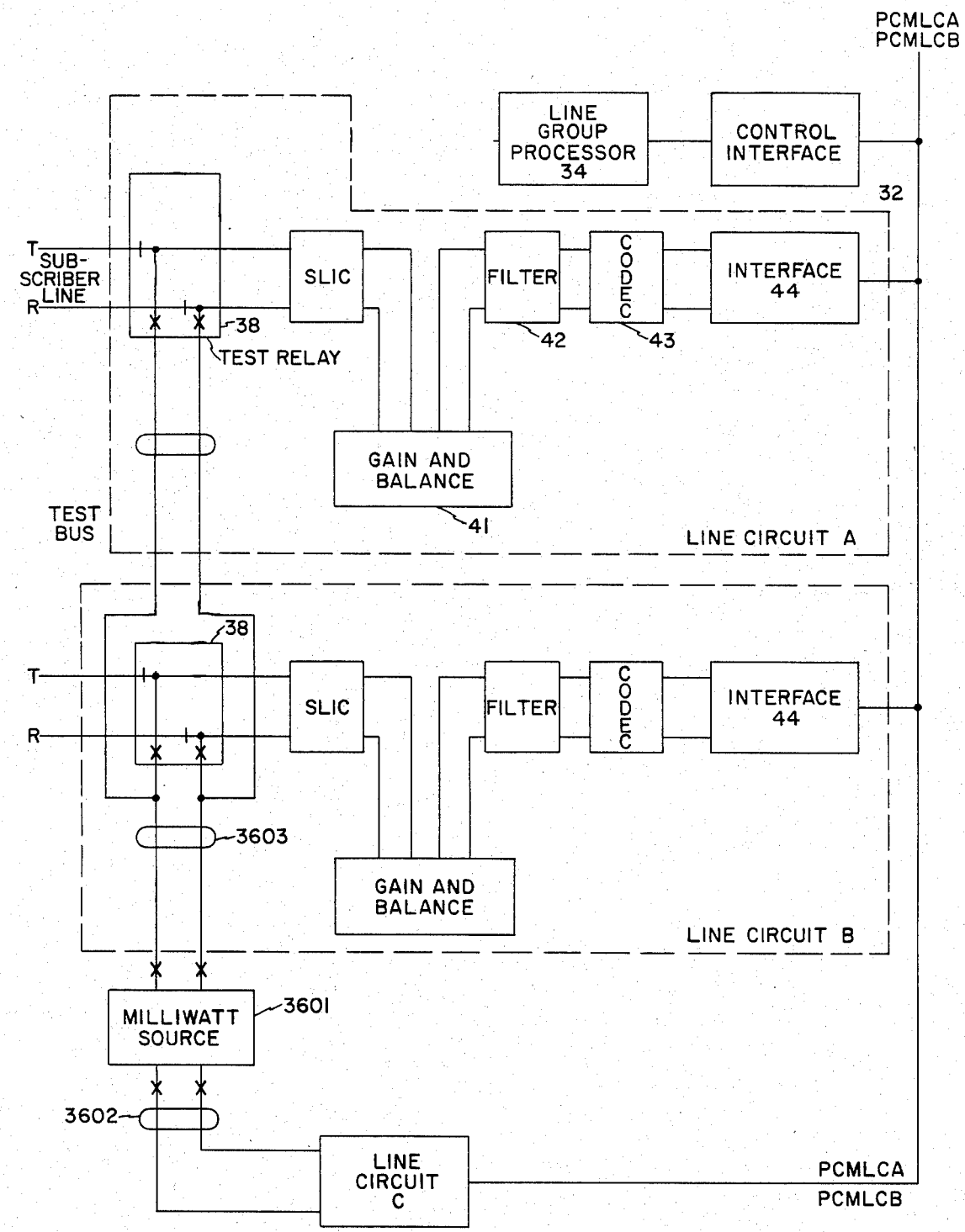
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementntally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of Odbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.25 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channel which is carrying the digital PCM tone signal from line circuit C.

The PCM output of line circuit A will be monitored by its line group processor 34 again utilizing the sample register 189 of the control interface 33.

The line group processor will incrementally change the gain of the receive amplifier in line circuit A until the output is again OdBm±0.1 dB. Thus the transmit gain of any circuit can be set to 0±1 db and the receive gain of any circuit can be set to 0.25 dB±0.1 dB.

Figure 37A:
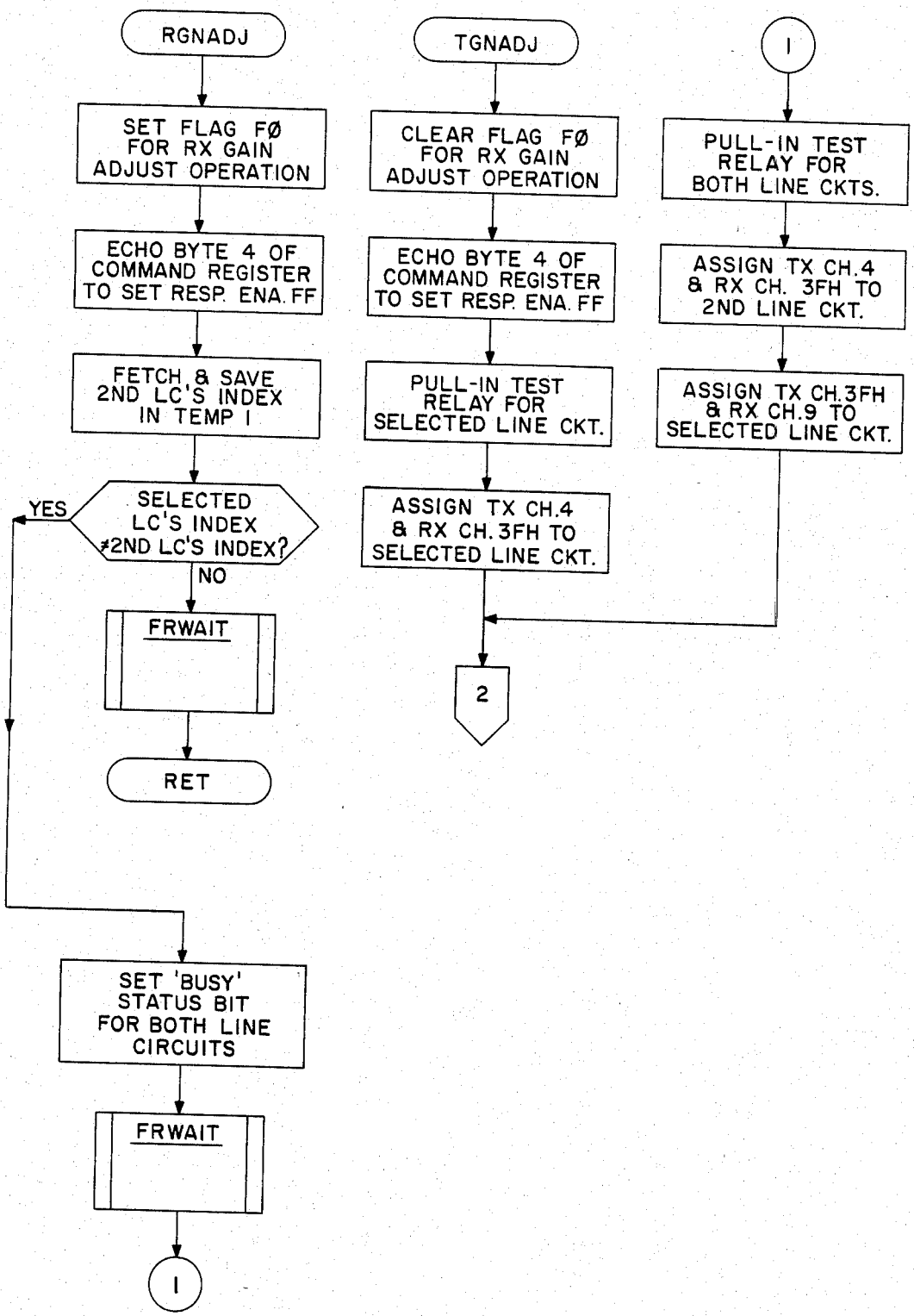
FIGS. 37A, 37B and 37C are flow charts of programs for automatic gain setting according to FIG. 36.
Figure 37B:
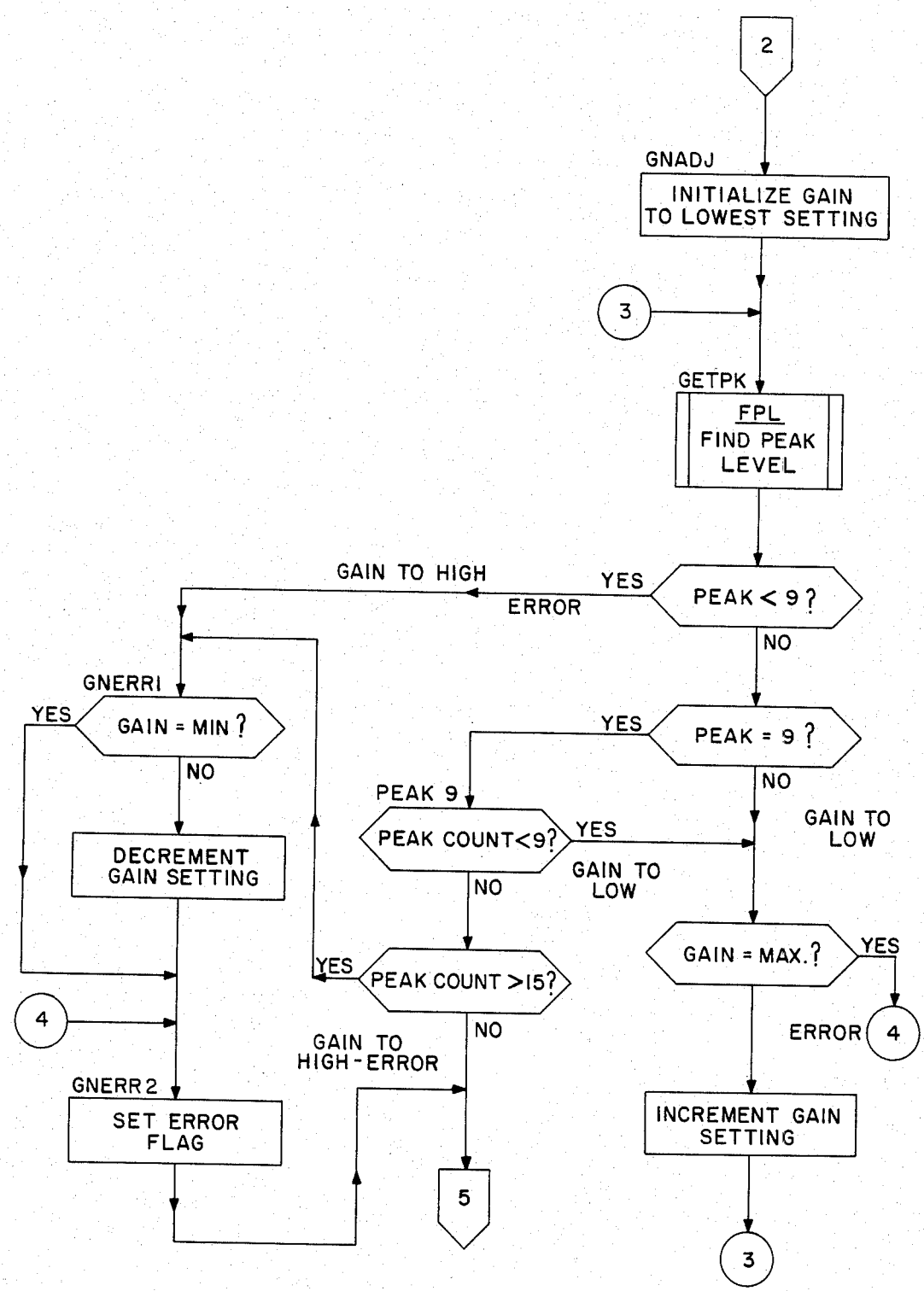
Figure 37C:
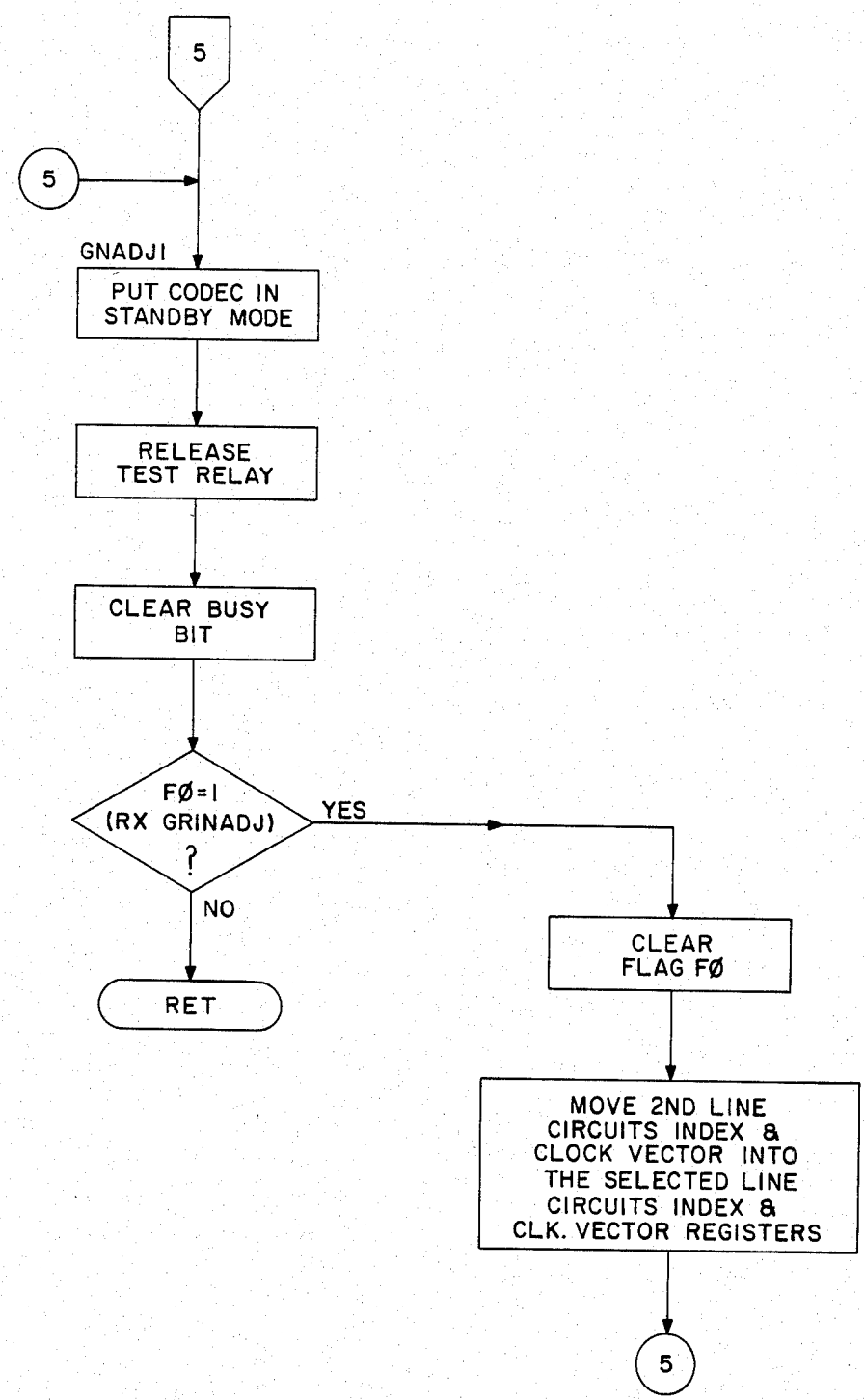

FIGS. 37A, B and C illustrates in flow chart form the program for setting the transmit and receive gain.

8.0 OTHER LINE CARD ARRANGEMENTS (FIGS. 25, 38, 39 and 40)

Figure 38:
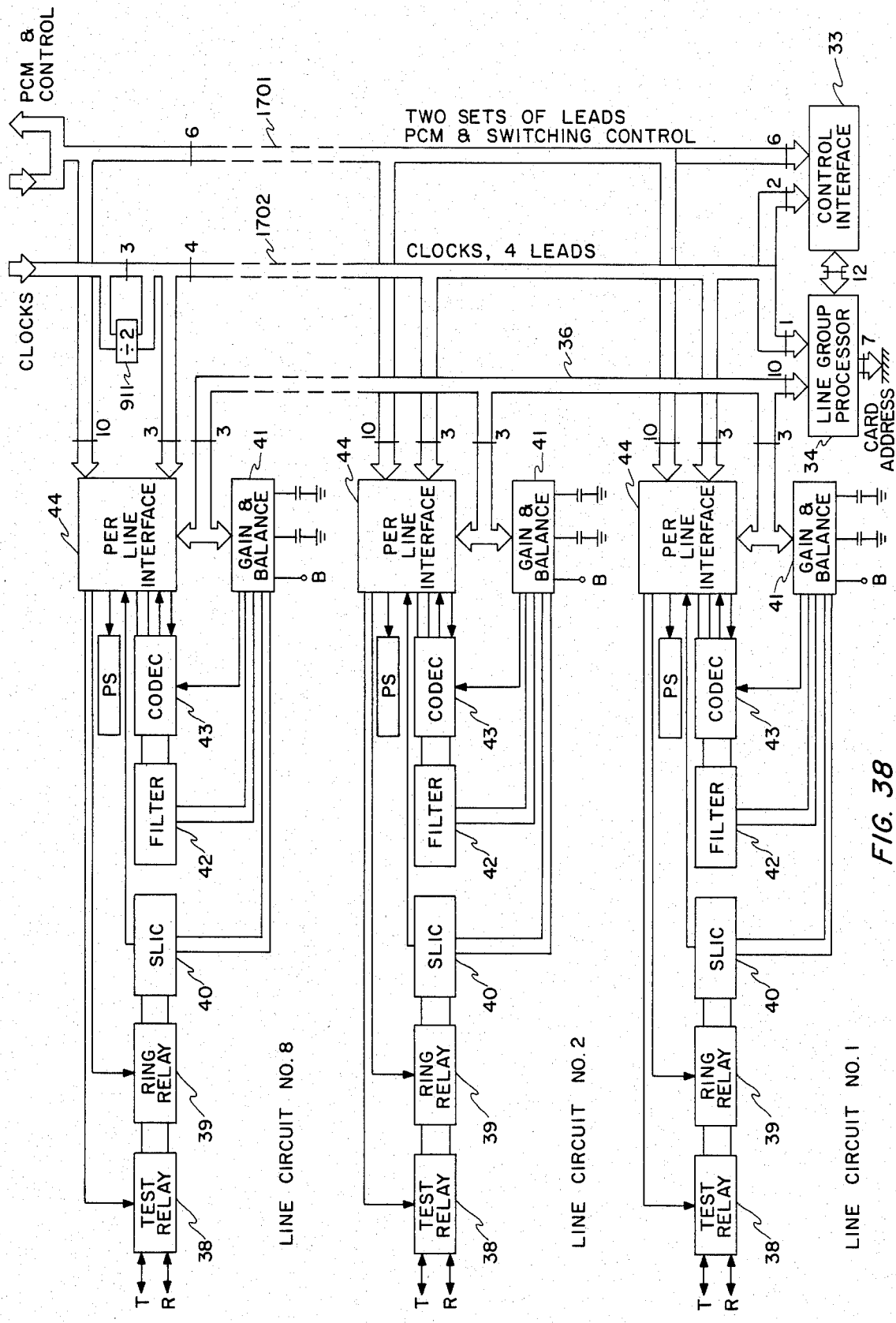
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{\text{AILS}}$, and $\overline{\text{BILS}}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
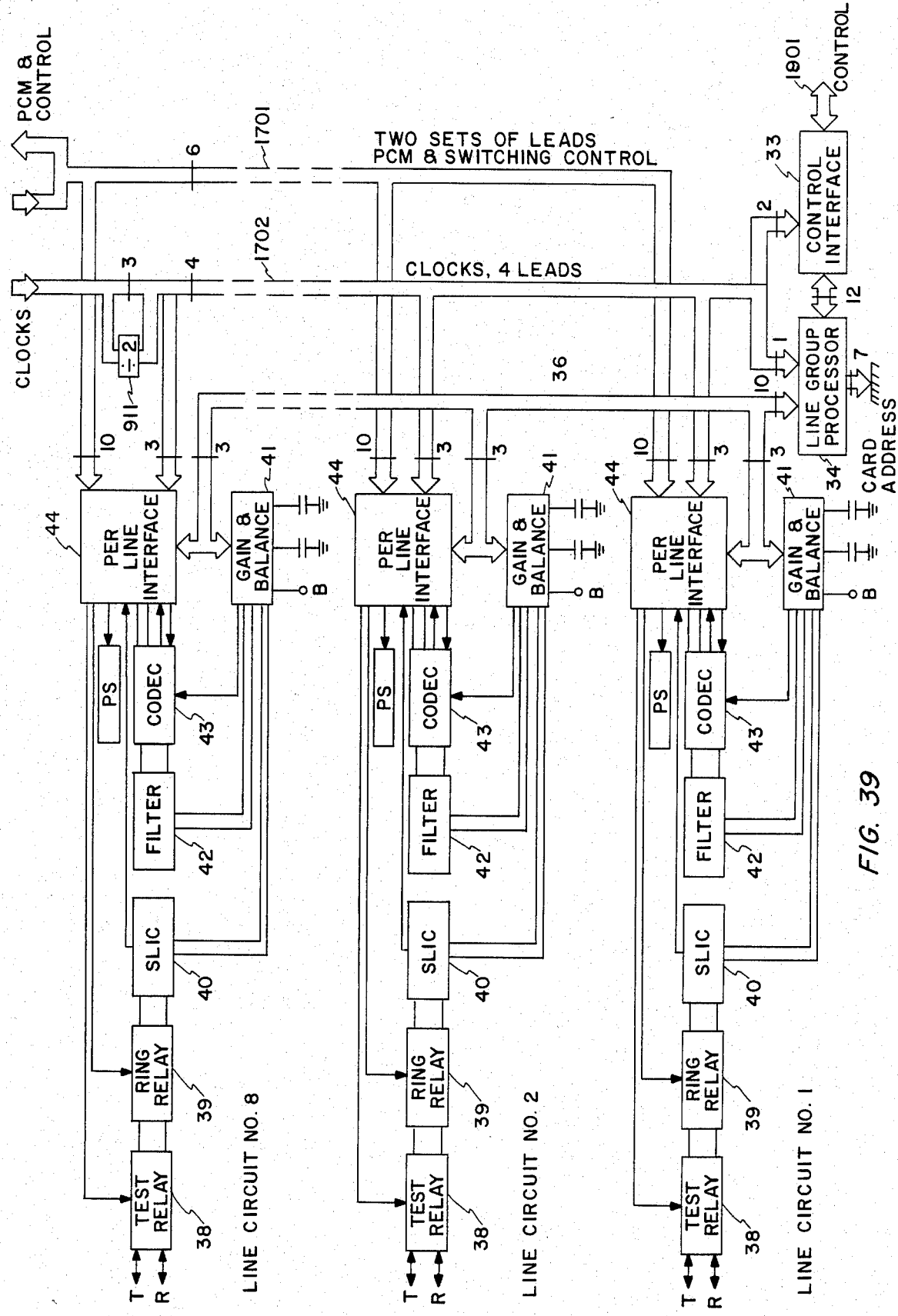
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
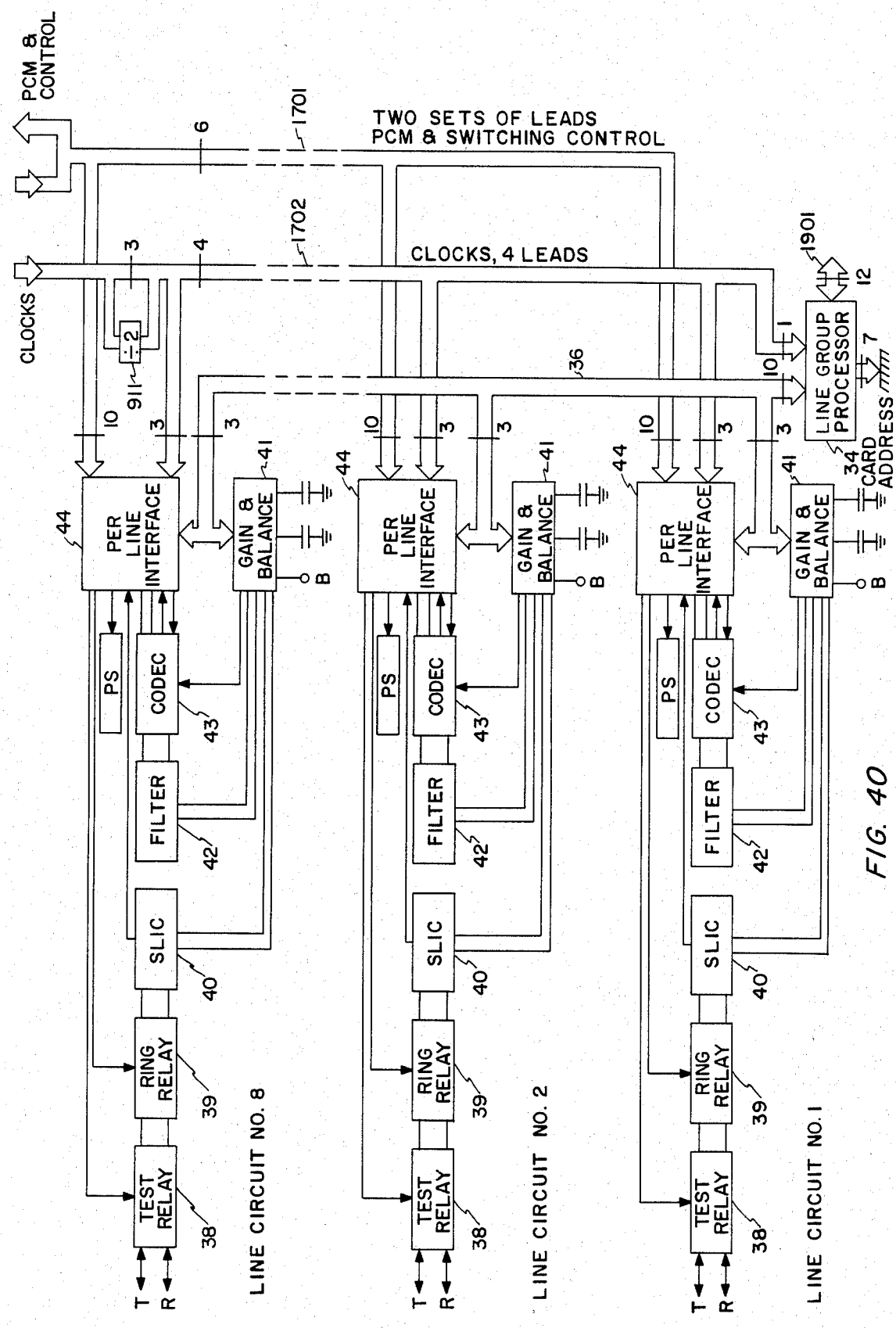
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
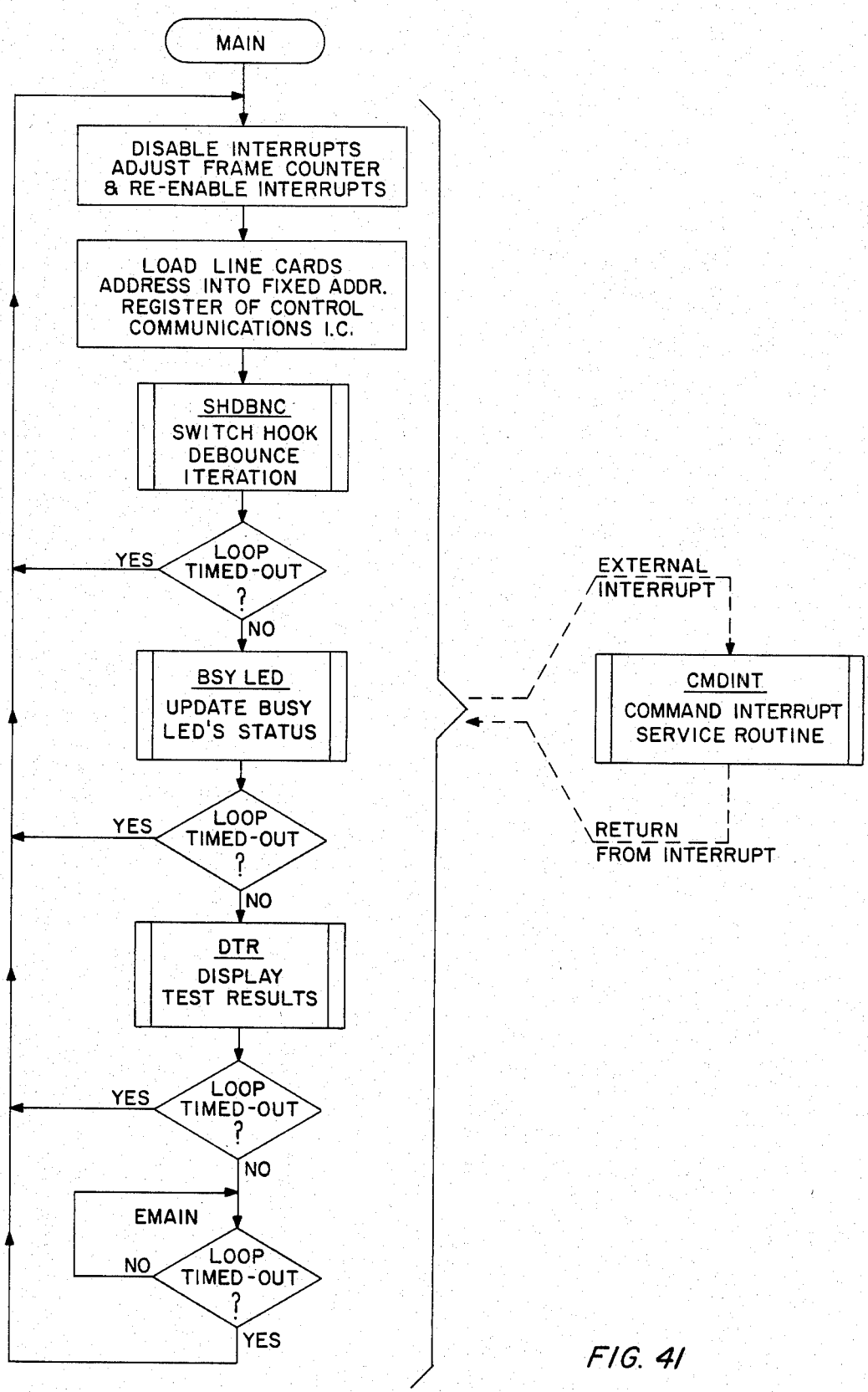
FIG. 41 is a flow chart of the software architecture of the line switch controller 7.
Figure 42B:
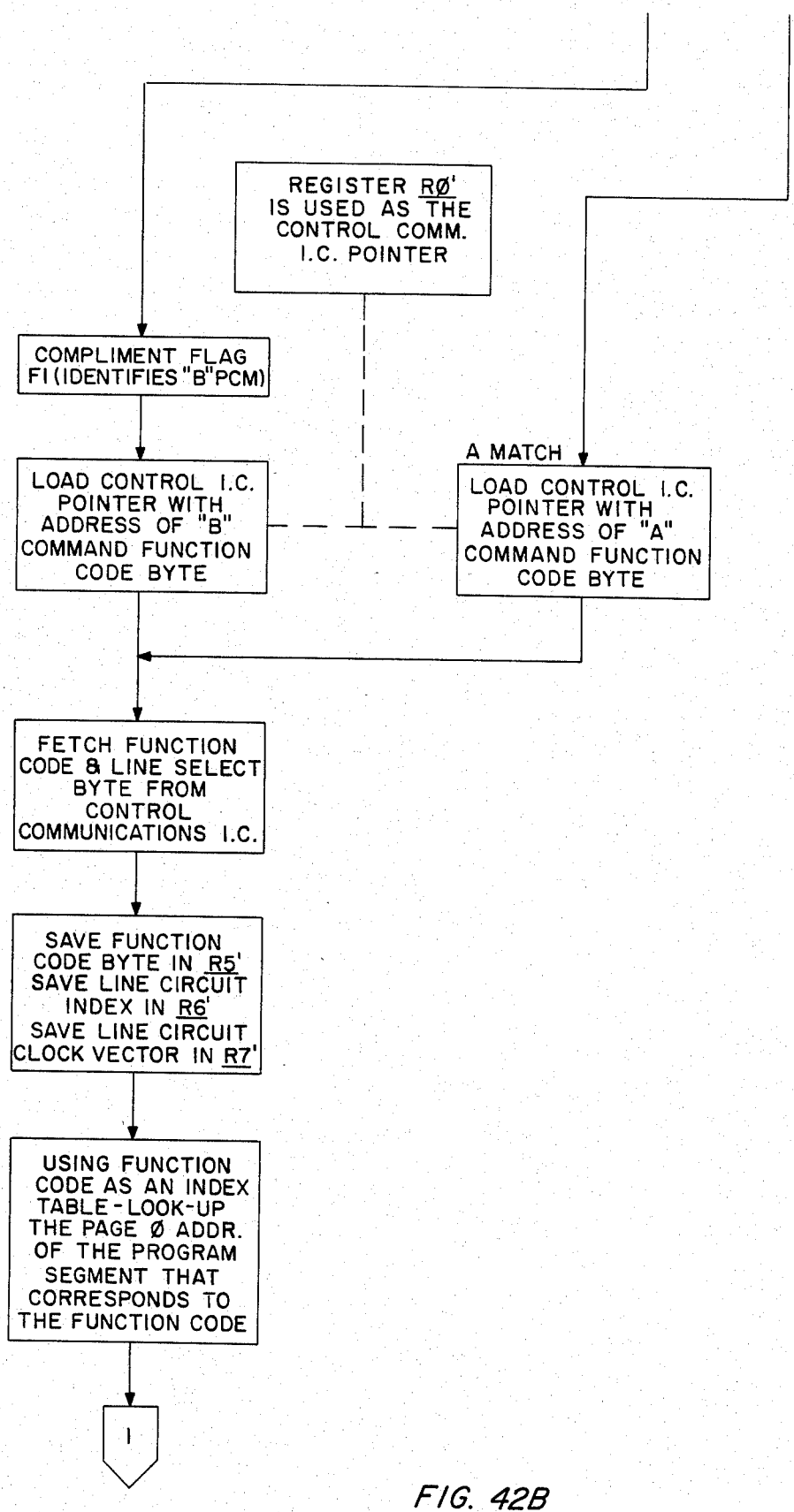
Figures 43, 43B:
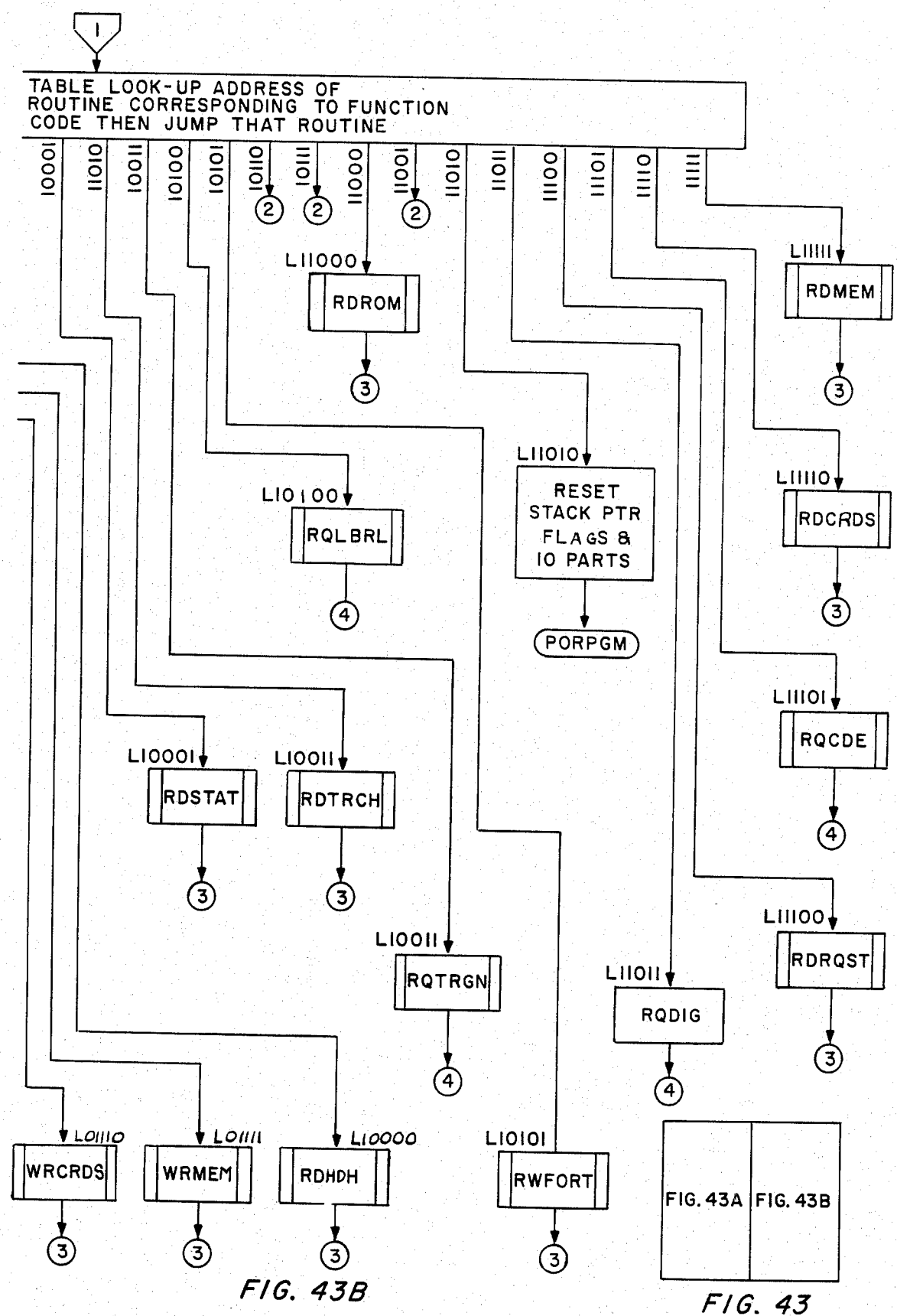
Figure 43A:
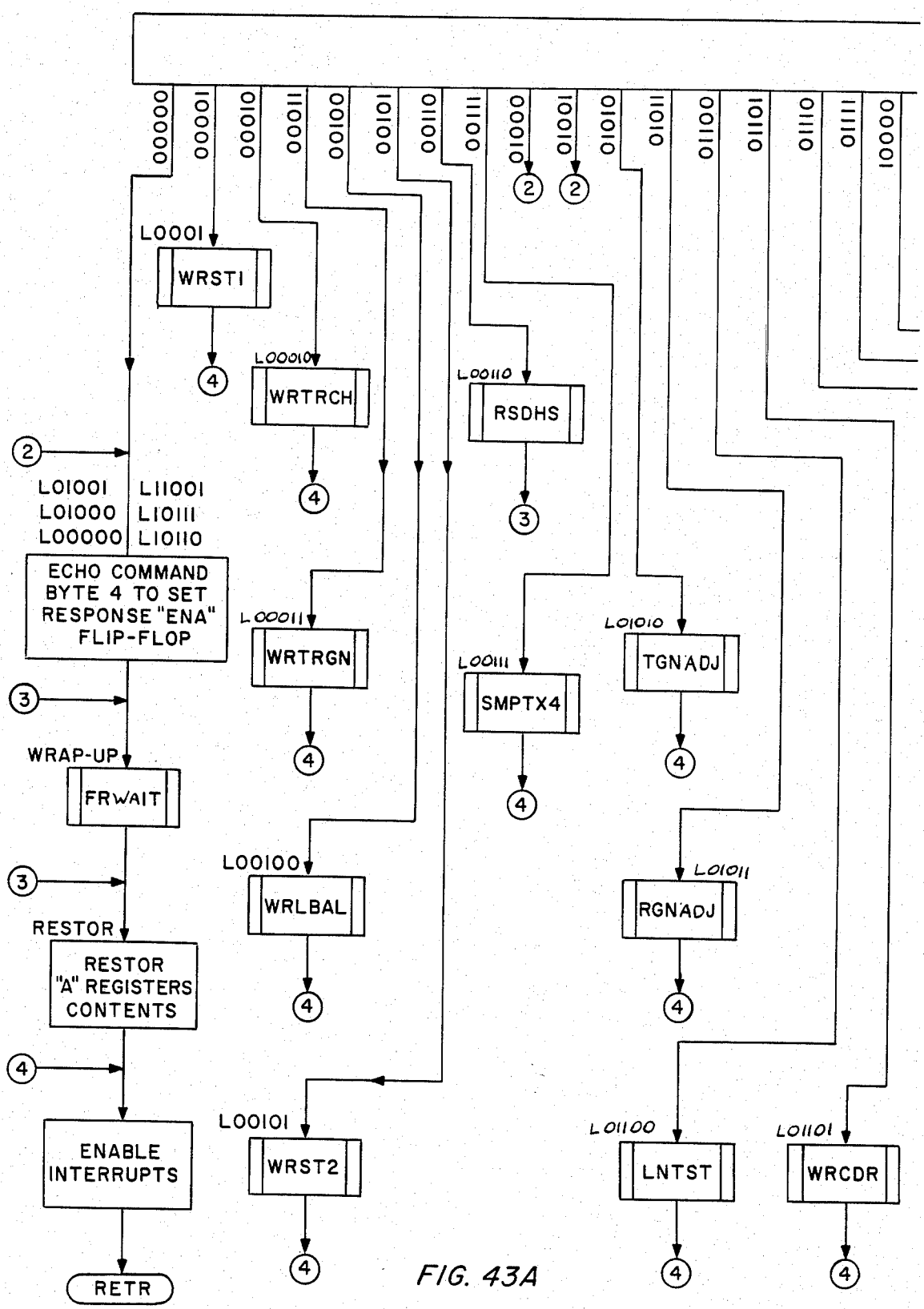

9.0 LINE GROUP PROCESSOR 34 (FIGS. 41, 42 and 43)

The line group processor 34 in the illustrative embodiment comprises an INTEL 8049 microprocessor which is described in the aforementioned INTEL reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

CALL SET-UP (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by tranmsitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of the line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 RINGING AND CALL CONNECT (FIGS. 1, 2, and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch controller 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate commands to the ring circuit 13 and line group processor 34. The line group processor 34 terminates the ring routine.

If the call is an intra-line switch call, the receive channels for A and B are switched upon commands from the line switch controller 7 to the line group processors 34.

9.2 CALL DISCONNECT (FIGS. 1, 2 and 25)

When A and B go on-hook, the system control 5 sends a common channel command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

APPENDIX

```
LOC   OBJ        LINE      SOURCE STATEMENT

1 ;       NAME          MASTER
                 2
                 3 ;
                 4 ;
                 5 ;
                 6
                 7 ;  MASTER -- SOFTWARE FOR THE ALS OCTAL LINE CARD CONTROLLER
                 8
                 9 $EJECT
```

```
              10
              11 ;     NAME         MEMMAP
              12
              13 ;
              14 ;
              15 ;
              16
0020          17 LNCRDS   EQU    20H     ; ADDR. OF 'LINE CARD STATUS BYTE'
              18
0021          19 HSW      EQU    21H     ; ADDR. OF 'HOOK SWITCH STATUS BYTE'
0022          20 DLTAHS   EQU    22H     ; ADDR. OF 'DELTA HOOK SWITCH STATUS BYTE'
0023          21 TMPDHS   EQU    23H     ; ADDR. OF 'TEMP. DLTA HOOK SWITCH'
0024          22 HSCNT    EQU    24H     ; ADDR. OF 'SWITCH HOOK DEBOUNCE ITERATION COUNTER'
              23
0025          24 RQFNCD   EQU    25H
0026          25 RQBYT1   EQU    26H
0027          26 RQBYT2   EQU    27H
              27
0028          28 RSPCNT   EQU    28H     ; ADDR. OF 'RESPONSE FRAME COUNT' BYTE
0029          29 ASAVE    EQU    29H     ; ADDR. OF 'A REG. SAVE AREA'
              30
002A          31 TESTR    EQU    2AH     ; ADDR. OF 'TEST RESULTS' BYTE
002B          32 TESTRC   EQU    2BH     ; ADDR. OF 'CDR TEST RESULTS'
002C          33 TESTRD   EQU    2CH     ; ADDR. OF 'DIGITAL I.C. TEST RESULTS'
002D          34 TESTRA   EQU    2DH     ; ADDR. OF 'ANALOG I.C. TEST RESULTS'
002E          35 GDCNT    EQU    2EH     ; ADDR. OF 'GOOD BOARD LED BLINK COUNTER'
002F          36 BLINKC   EQU    2FH     ; ADDR. OF 'LED BLINK COUNTER'
              37
0030          38 LCST1    EQU    30H     ; BASE ADDR. OF 'LINE CKT STATUS 1' BYTES
0038          39 LCST2    EQU    38H     ; BASE ADDR. OF 'LINE CKT STATUS 2' BYTES
0040          40 TXCH     EQU    40H     ; BASE ADDR. OF 'TX CHAN. ASSIGNMENTS'
0048          41 RXCH     EQU    48H     ; BASE ADDR. OF 'RX CHAN. ASSIGNMENTS'
0050          42 GNBAL    EQU    50H     ; BASE ADDR. OF GAIN & BALANCE SETTINGS
              43
0068          44 RELAYD   EQU    68H
0069          45 GNDEL    EQU    69H
006A          46 SHDCNT   EQU    6AH
006B          47 TEMP1    EQU    6BH
              48
              49 $EJECT
              50 ;***********************************************
              51 ; CONTROL COMMUNICATIONS I.C. INTERNAL REGISTERS
              52 ;***********************************************
0001          53 ACRB2    EQU    01H     ; 'A PCM' CONTROL SHIFT REG. BYTE 2 ADDRESS
0005          54 BCRB2    EQU    05H     ; 'B PCM' CONTROL SHIFT REG. BYTE 2 ADDRESS
0008          55 CFXADD   EQU    08H     ; ADDR. OF 'FIXED ADDRESS' REGISTER
000C          56 CSTS     EQU    0CH     ; ADDR. OF CONTROL COMM. I.C.'S STATUS REG.
000D          57 CMODE    EQU    0DH     ; ADDR. OF CONTROL COMM. I.C.'S MODE REG.
000E          58 CRP      EQU    0EH     ; ADDR. OF 'CONTROL REG. POINTER'
000F          59 ATCRP    EQU    0FH     ; ADDR. OF CONTROL S/R BYTE POINTED TO BY 'CRP'
              60
              61 ;***********************************************
              62 ; LINE CIRCUIT COMMAND CODES (4-BIT CODE----BITS 7-4)
              63 ;***********************************************
0000          64 WRDIG    EQU    00H     ; 'WRITE TO DIGITAL I.C. REG.' CODE (BITS 7-4)
```

```
0020        65 WRCDRC   EQU    20H      ; 'WRITE TO CODEC DATA REG.' CODE
0040        66 WRANA    EQU    40H      ; 'WRITE TO ANALOG I.C. REG.' CODE
0060        67 LDCODC   EQU    60H      ; 'LOAD CODEC' CODE
0080        68 RDDIG    EQU    80H      ; 'READ DIG. I.C. REG.' CODE
00A0        69 RDCDR    EQU    0A0H     ; 'READ CODEC DATA REG.' CODE
00C0        70 RDANA    EQU    0C0H     ; 'READ ANALOG I.C. REG.' CODE
            71
            72 ;*****************************************
            73 ;             ; INITIALIZATION VALUES
            74 ;*****************************************
0018        75 IDIG     EQU    18H
00FF        76 ICODEC   EQU    0FFH
0084        77 IANA1    EQU    84H
0000        78 IANA2    EQU    00H
0000        79 IANA3    EQU    00H
            80
            81 ;*****************************************
            82 ; ADDRESS OF LAST BYTE OF 8049'S DATA MEMORY
            83 ;*****************************************
007F        84 LSTBYT   EQU    7FH
            85
            86 ;*****************
            87 ; RESPONSE DELAY
            88 ;*****************
0008        89 RSPNCD   EQU    8       ; NUMBER OF FRAMES DELAY THAT RESPONSE
            90                         ;    FOLLOWS COMMAND.
            91
            92 $EJECT
            93
            94 ;       NAME      PORPGM
            95
            96 ;
            97 ;
            98 ;
            99
           100 ; PORPGM — POWER-ON RESET PROGRAM
           101
           102 ; ENTERED AFTER A POWER-ON OR MANUAL RESET
           103
0000       104        ORG    0
           105 RESET:
0000 C5    106        SEL    RB0     ; REG. BANK 0 IS USED EVERYWHERE EXCEPT IN
0001 6400  107        JMP    PORPGM  ;    INTERRUPT SERVICE ROUTINES.
           108
0300       109        ORG    300H
           110 PORPGM:
0300 15    111        DIS    I
           112 ; INITIALIZE ALL LINE CIRCUITS
0301 54A6  113        CALL   LINERS
           114
           115 ; IS SELF-TEST TO BE SKIPPED (P23=0)?
0303 0A    116        IN     A,P2
0304 7211  117        JB3    POR1
           118
           119 ; SKIPPING SELF-TEST——————CLEAR TEST RESULTS BYTES
```

```
0306 B820    120         MOV     R0,#TESTR+3
0308 B904    121         MOV     R1,#4
030A B000    122         MOV     @R0,#0
030C C3      123         DEC     R0
030D EA0A    124         DJNZ    R1,$-3
030F 6413    125         JMP     STRET   ; RETURN TO PORPGM
             126
             127 POR1:
             128 ; PERFORM SELF-TEST OF LINE CARD HARDWARE
0311 C400    129         JMP     SLFTST
             130 STRET:          ; SELF-TEST ROUTINE'S RETURN ADDRESS
             131
             132 ; INITIALIZE DATA RAM
0313 7445    133         CALL    RAMRS
             134
             135 ; ENABLE RECEPTION OF COMMANDS FROM ALS CONTROLLER
0315 748F    136         CALL    CNTLRS
0317 1404    137         CALL    CNTLEN
             138
             139 ; INITIALIZE FRAME COUNTER BEFORE ENTERING 'MAIN'
0319 2318    140         MOV     A,#18H
031B 65      141         STOP    TCNT
031C 62      142         MOV     T,A
             143 ; ENTER MAIN LOOP
             144
             145 ;*** END OF PORPGM ***
             146 $EJECT
             147
             148 ;       NAME            MAIN
             149
             150 ;
             151 ;
             152 ;
             153
             154 MAIN:
031D C5      155         SEL     RB0
             156
             157 ;##############################################################
031E 15      158         DIS     I       ; DISABLE INTERRUPT WHILE FRAME COUNTER
031F 65      159         STOP    TCNT    ;   IS STOPPED
0320 42      160         MOV     A,T     ; READ CURRENT COUNTER VALUE AND SUBTRACT
             161                         ;   16 (DECIMAL) IN ORDER TO RESET THE
             162                         ;   COUNTER FOR THE 2 MILLISEC MAIN LOOP
             163                         ;   DELAY. (EQUIV. TO ADDING 0F0H MOD 256)
0321 03F0    164         ADD     A,#0F0H ; (ADDING 0F0H IS EQUIV. TO SUBTRACTING 10H
             165                         ;   IN MODULO 256 ARITHMETIC)
0323 62      166         MOV     T,A     ; LOAD NEW VALUE INTO COUNTER
             167 ;##############################################################
             168
0324 05      169         EN      I       ; RE-ENABLE INTERRUPTS NOW THAT COUNTER HAS
             170                         ;   BEEN RESTARTED.
0325 45      171         STRT    CNT     ; RESTART COUNTER
             172
             173 ; RE-LOAD LINE CARD'S FIXED ADDRESS INTO CONTROL COMM. I.C.
0326 9480    174         CALL    LDFXAD
```

```
                    175
                    176 ; PERFORM S/H DEBOUNCE ITERATION
0328 749B           177        CALL    SHDBNC
032A 7439           178        CALL    LOOPCK ; CHECK FOR LOOP TIME-OUT
                    179
                    180 ; UPDATE LINE CARD 'BUSY INDICATION LED'
032C 7404           181        CALL    BSYLED
032E 7439           182        CALL    LOOPCK ; CHECK FOR LOOP TIME-OUT
                    183
                    184 ; SCAN TEST RESULTS REGISTERS FOR HARDWARE MALFUNCTION
                    185 ;   AND BLINK LED IF BOARD IS BAD
0330 9454           186        CALL    DTR    ; DISPLAY TEST RESULTS SUBROUTINE
0332 7439           187        CALL    LOOPCK ; CHECK FOR LOOP TIME-OUT
                    188
                    189 $EJECT
                    190
                    191
                    192 ;       OTHER MAIN LOOP SUBROUTINES WILL BE INSERTED HERE
                    193
                    194 ; END OF MAIN LOOP
                    195 ; WAIT UNTIL 2 MS HAS ELASPED BEFORE RESTARTING MAIN LOOP
                    196 EMAIN:
0334 45             197        STRT    CNT
0335 7439           198        CALL    LOOPCK ; CHECK FOR LOOP TIME-OUT
                    199
0337 6434           200        JMP     EMAIN
                    201
                    202 ; SUBROUTINE LOOPCK *****************************
                    203 LOOPCK:
0339 42             204        MOV     A,T    ; READ FRAME COUNT
033A 03E8           205        ADD     A,#0E8H ; HAS FRAME COUNT EXCEEDED 18H (LOOP TIME-OUT VALUE)?
033C F63F           206        JC      $+3    ; IF CARRY OCCURRED, THEN LOOP HAS TIMED-OUT.
033E 83             207        RET            ; LOOP HAS NOT TIMED OUT---PERFORM NEXT OPERATION
                    208
                    209 ; LOOP HAS TIMED OUT----RESET STACK POINTER & RESTART MAIN LOOP
033F C7             210        MOV     A,PSW
0340 53F8           211        ANL     A,#0F8H ; CLEAR 'SP' BITS
0342 D7             212        MOV     PSW,A
0343 641D           213        JMP     MAIN
                    214
                    215 ; END OFF SUBROUTINE LOOPCK ********************
                    216
                    217 ;*** END OF MAIN ***
                    218 $EJECT
                    219
                    220 ;        NAME          RAMRS
                    221
                    222 ;
                    223 ;
                    224 ;
                    225
                    226 ; RAMRS -- INITIALIZES CONTENTS OF DATA RAM
                    227
                    228 RAMRS:
                    229 ; INITIALIZE UNUSED PORTION OF RAM TO ZERO
```

```
0345 B87F      230         MOV     R0,#LSTBYT ; ADDR. OF LAST BYTE OF DATA RAM
0347 B918      231         MOV     R1,#18H ; (24 BYTES)
0349 B000      232         MOV     @R0,#0
034B C8        233         DEC     R0
034C E949      234         DJNZ    R1,$-3 ; REPEAT LAST 3 INSTRUCTIONS UNTIL R1=0
               235
               236 ; INITIALIZE GAIN & BALANCE SETTINGS BYTES
034E B908      237         MOV     R1,#8
               238
0350 2304      239 RAMRS3: MOV     A,#IANA1
0352 A0        240         MOV     @R0,A
0353 C8        241         DEC     R0
0354 2300      242         MOV     A,#IANA2
0356 A0        243         MOV     @R0,A
0357 C8        244         DEC     R0
0358 2300      245         MOV     A,#IANA3
035A A0        246         MOV     @R0,A
035B C8        247         DEC     R0
035C E950      248         DJNZ    R1,RAMRS3
               249
               250 ; INITIALIZE CHANNEL ASSIGNMENT BYTES
035E B910      251         MOV     R1,#10H
0360 B03F      252 RAMRS4: MOV     @R0,#3FH
0362 C8        253         DEC     R0
0363 E960      254         DJNZ    R1,RAMRS4  ; REPEAT LAST 3 INSTRUCTIONS UNTIL R1=0
               255
               256 ; INITIALIZE 'LC STATUS 2' BYTES TO 00000000B
0365 B908      257         MOV     R1,#8
               258
0367 B000      259 RAMRS5: MOV     @R0,#0
0369 C8        260         DEC     R0
036A E967      261         DJNZ    R1,RAMRS5
               262
               263 $EJECT
               264 ; INITIALIZE 'LC STATUS 1' BYTES TO 00110000B
036C B908      265         MOV     R1,#8
               266
036E B018      267 RAMRS6: MOV     @R0,#IDIG
0370 C8        268         DEC     R0
0371 E96E      269         DJNZ    R1,RAMRS6
               270
               271 ; INITIALIZE 'GOOD BOARD LED BLINK COUNTER'
0373 B82E      272         MOV     R0,#GDCNT
0375 B002      273         MOV     @R0,#2
0377 B82F      274         MOV     R0,#BLINKC
0379 B000      275         MOV     @R0,#0
               276
               277 ; RESET 'LNCRDS', 'HSW', 'DLTAHS',   , 'ASAVE' (20H-29H)
037B B829      278         MOV     R0,#29H
037D B90A      279         MOV     R1,#10
               280
037F B000      281 RAMRS7: MOV     @R0,#0
0381 C8        282         DEC     R0
0382 E97F      283         DJNZ    R1,RAMRS7
               284
```

```
                    340 ;   DEBOUNCING IS CURRENTLY IN PROGRESS.
039B B824           341         MOV     R0,#HSCNT
039D F0             342         MOV     A,@R0           ; READ 'HOOK STATUS COUNTER'
039E 96AF           343         JNZ     SHLOOP
                    344
                    345 ; TEST FOR ANY CHANGES OF S/H VALUES (COMPARED TO THE CURRENT
                    346 ;   STORED VALUES OF 'HOOK SWITCH STATUS')
03A0 B921           347         MOV     R1,#HSW
03A2 09             348         IN      A,P1            ; READ S/H VECTOR FROM PORT 1
03A3 D1             349         XRL     A,@R1           ; 'TMPDHS'=S/H VECTOR 'XOR' HOOK STATUS
03A4 B923           350         MOV     R1,#TMPDHS
03A6 A1             351         MOV     @R1,A           ; STORE  TMPDHS
03A7 96AA           352         JNZ     SHNEW
03A9 93             353         RETR
                    354
                    355 SHNEW:
                    356 ; AT LEAST ONE S/H LINE HAS CHANGED STATUS----START DEBOUNCING ITERATIONS
                    357 ; INITIALIZE ITERATION COUNTER
03AA B96A           358         MOV     R1,#SHDCNT
03AC F1             359         MOV     A,@R1
03AD A0             360         MOV     @R0,A
03AE 93             361         RETR
                    362
                    363 SHLOOP:
                    364 ; NORMAL S/H DEBOUNCE ITERATION SEQUENCE
03AF B921           365         MOV     R1,#HSW
03B1 09             366         IN      A,P1
03B2 D1             367         XRL     A,@R1   ; 'TMPDHS'=S/H VECTOR 'XOR' HOOK STATUS
                    368
                    369 ; 'AND' THE CURRENT VALUE OF 'TMPDHS' WITH THE LAST VALUE OF 'TMPDHS'
                    370 ;   IF THE RESULT IS ZERO THEN ABORT THE DEBOUNCING
03B3 B923           371         MOV     R1,#TMPDHS
03B5 51             372         ANL     A,@R1
03B6 A1             373         MOV     @R1,A
03B7 AA             374         MOV     R2,A    ; SAVE 'TMPDHS' VALUE IN R2
03B8 C6C0           375         JZ      ABORT
                    376
                    377 $EJECT
                    378 ; HAVE ALL ITERATIONS BEEN PERFORMED?
03BA F0             379         MOV     A,@R0
03BB 07             380         DEC     A       ; DECREMENT ITERATION COUNTER & TEST FOR ZERO
03BC A0             381         MOV     @R0,A
03BD C6C3           382         JZ      DONE
03BF 93             383         RETR
                    384
                    385 ABORT:
                    386 ; RESET S/H DEBOUNCE ITERATION COUNTER
03C0 B000           387         MOV     @R0,#0  ; RESET 'HSCNT' TO ZERO
03C2 93             388         RETR
                    389
                    390 DONE:
                    391 ; UPDATE CURRENT VALUES OF 'HOOK SWITCH STATUS' & 'DELTA HOOK STATUS'
03C3 FA             392         MOV     A,R2    ; FETCH 'TMPDHS' VALUE
03C4 B921           393         MOV     R1,#HSW
03C6 D1             394         XRL     A,@R1   ; UPDATE &
03C7 A1             395         MOV     @R1,A   ;   SAVE HOOKSW
```

```
                    285 ; INITIALIZE RELAY DEBOUNCE DELAY & GAIN SET DELAY BYTES
0384 B868           286         MOV     R0,#RELAYD
0386 B032           287         MOV     @R0,#50 ; 50 MILLISEC DEFAULT RELAY DEBOUNCE DELAY
0388 18             288         INC     R0
0389 B005           289         MOV     @R0,#5  ; 5 MILLISEC DEFAULT GAIN ADJ. DELAY
                    290
                    291 ; INITIALIZE S/H DEBOUNCE CYCLE ITERATION COUNT
038B 18             292         INC     R0
038C B014           293         MOV     @R0,#20 ; DEFAULTS TO 20 ITERATIONS
                    294
038E 83             295         RET
                    296
                    297 ;*** END OF RAMRS ***
                    298 $EJECT
                    299
                    300 ;       NAME            CNTLRS
                    301
                    302 ;
                    303 ;
                    304 ;
                    305
                    306
                    307 ; CNTLRS -- CONTROL PROTOCOL I.C. INITIALIZATION ROUTINE
                    308
                    309 ; INITIALIZES MODE REG., CRP, & FIXED ADDR.
                    310
                    311 CNTLRS:
                    312 ; INITIALIZE MODE REGISTER
038F B80D           313         MOV     R0,#CMODE ; ADDR. OF MODE REG.
0391 2303           314         MOV     A,#03H  ; 'B COMP ENA' & 'A COMP ENA' = 1
0393 90             315         MOVX    @R0,A
                    316
                    317 ; CLEAR CRP (CONTROL REGISTER POINTER)
0394 B80E           318         MOV     R0,#CRP ; ADDR. OF 'CNTRL REG. POINTER'
0396 27             319         CLR     A
0397 90             320         MOVX    @R0,A
                    321
                    322 ; LOAD FIXED ADDRESS
0398 9480           323         CALL    LDFXAD
                    324
039A 83             325         RET
                    326
                    327 ;*** END OF CNTLRS ***
                    328 $EJECT
                    329
                    330 ;       NAME            SHDBNC
                    331
                    332 ;
                    333 ;
                    334 ;
                    335
                    336 ; SHDBNC -- SWITCH-HOOK DEBOUNCE SUBROUTINE
                    337
                    338 SHDBNC:
                    339 ; READ CURRENT S/H DEBOUNCE ITERATION COUNTER TO SEE IF
```

```
03C8 B922      396        MOV    R1,#DLTAHS
03CA FA        397        MOV    A,R2
03CB 41        398        ORL    A,@R1   ; UPDATE &
03CC A1        399        MOV    @R1,A   ;   SAVE DLTAHS
03CD B928      400        MOV    R1,#LNCRDS
03CF F1        401        MOV    A,@R1
03D0 4301      402        ORL    A,#01H  ; SET "OR'D DELTA H/S" BIT OF 'LNCRDS'
03D2 A1        403        MOV    @R1,A
               404
03D3 93        405        RETR
               406
               407 ;*** END OF SHDENC ***
               408 $EJECT
               409
               410 ;       NAME           BSYLED
               411
               412 ;
               413 ;
               414 ;
               415
               416 ; BSYLED — LINE CARD 'BUSY INDICATE LED' UPDATE ROUTINE
               417
               418 BSYLED:
03D4 B838      419        MOV    R0,#LCST2 ; ADDR OF 'LC STATUS 2' BYTE
03D6 BA08      420        MOV    R2,#8
               421
               422 ; IF ANY OF THE LINE CIRCUITS ARE BUSY TURN-ON 'BUSY LED'
               423
               424 BLED1:
03D8 F0        425        MOV    A,@R0
03D9 F2E1      426        JB7    BLED2
03DB 18        427        INC    R0
03DC EAD8      428        DJNZ   R2,BLED1 ; IF COUNT#0, CHECK NEXT LINE CKT BUSY STATUS
               429
               430 ; NO LINES BUSY ----- TURN-OFF 'BUSY LED'
               431
03DE 9AEF      432        ANL    P2,#0EFH ; TURN-OFF 'BUSY INDICATE LED' (P24)
               433                        ;    & RETURN TO MAIN LOOP
03E0 93        434        RETR
               435
               436 BLED2:
               437
               438 ; AT LEAST ONE LINE IS BUSY ----- TURN-ON 'BUSY LED'
               439
03E1 8A10      440        ORL    P2,#10H ; TURN-ON 'BUSY INDICATE LED' (P24)
               441                        ;    & RETURN TO MAIN LOOP
               442
03E3 93        443        RETR
               444
               445 ;*** END OF BSYLED ***
               446 $EJECT
               447
               448 ;       NAME           RTNSH
               449
               450 ;
               451 ;
```

```
                452 ;
                453
                454
                455 ;     RTNSH -- RETURN SWITCH HOOK: SENDS RETURN S/H COMMAND
                456 ;                    TO ALL LINE CIRCUITS ON THE CARD.
                457
                458 RTNSH:
03E4 8A40       459         ORL     P2,#40H       ; SET 'DATA' LINE TO 1
03E6 9A7F       460         ANL     P2,#07FH      ; SET 'CMD ENA BAR' TO 0
03E8 9900       461         ANL     P1,#0         ; PULSE CLOCK LINES LOW
03EA 89FF       462         ORL     P1,#0FFH      ;      THEN HIGH
03EC 8A80       463         ORL     P2,#80H ; SET 'CMD ENA BAR' TO 1 TO RETURN S/H
                464 ;                                  ON CLK/SH(7:0)
                465
03EE 83         466         RET
                467
                468 ;*** END OF RTNSH ***
                469 $EJECT
                470
                471 ;     NAME          CLKVCT
                472
                473 ; CLKVCT -- CLOCK VECTOR LOOK-UP TABLE
                474
                475 CLKVCT:
03EF FE         476         DB      11111110B
03F0 FD         477         DB      11111101B
03F1 FB         478         DB      11111011B
03F2 F7         479         DB      11110111B
03F3 EF         480         DB      11101111B
03F4 DF         481         DB      11011111B
03F5 BF         482         DB      10111111B
03F6 7F         483         DB      01111111B
                484
                485
                486 ;*** END OF CLKVCT ***
                487 $EJECT
                488
                489 ;     NAME          TIMINT
                490
                491 ; TIMINT -- TIMER INTERRUPT SERVICE ROUTINE
                492
0007            493         ORG     7
                494 TIMINT:
0007 93         495         RETR
0008 00         496         NOP
                497
                498 ;*** END OF TIMINT ***
                499 $EJECT
                500
                501 ;     NAME          CMDINT
                502
                503 ;
                504 ;
                505 ;
                506
                507 ; CMDINT -- COMMAND INTERRUPT SERVICE ROUTINE
```

```
                508
0003            509         ORG     3
                510 CMDINT:
0003 D5         511         SEL     RB1
0004 45         512         STRT    CNT
0005 0409       513         JMP     ICONT   ; SKIP OVER 'TIMER INTERRUPT' VECTOR LOCATION (7-8)
                514
0009            515         ORG     9
                516 ICONT:
                517 ; SAVE 'A' REGISTER'S CONTENTS
0009 B929       518         MOV     R1,#ASAVE
000B A1         519         MOV     @R1,A   ; SAVE CONTENTS OF 'A' REG
                520
                521 ; DISABLE COMMANDS RECEPTION
000C B88D       522         MOV     R0,#CMODE
000E 2303       523         MOV     A,#03H
0010 90         524         MOVX    @R0,A   ; DISABLE COMMANDS RECEPTION CIRCUITRY
                525
                526 ; CALCULATE AND SAVE 2'S COMPLEMENT OF RESPONSE FRAME COUNT
0011 42         527         MOV     A,T
0012 0307       528         ADD     A,#(RSPNCD-1)
0014 37         529         CPL     A
0015 17         530         INC     A       ; 2'S COMP. IN A REG
0016 C9         531         DEC     R1      ; R1 NOW POINTS TO 'RESPONSE COUNT' SAVE AREA
0017 A1         532         MOV     @R1,A
                533
                534 ; CLEAR FLAG F1 (ASSUME COMMAND RECEIVED OVER "A" PCM HIGHWAY)
                535 ; (F1 = A BAR/B)
0018 A5         536         CLR     F1
                537
0019 C8         538         DEC     R0      ; R0 POINTS TO CNTRL STATUS BYTE
001A 80         539         MOVX    A,@R0   ; FETCH STATUS INFO
001B 1228       540         JB0     AMATCH
001D 3223       541         JB1     BMATCH
                542
                543 ; NEITHER ADDRESS COMPARATOR FLAG --
                544 ;     ***** CONTROL COMMUNICATONS I.C. HARDWARE ERROR *****
001F D4C7       545         CALL    CFAIL
0021 04AF       546         JMP     RESTOR
                547
                548 $EJECT
                549 BMATCH:
                550 ; SET FLAG F1 (IDENTIFY "B" PCM HIGHWAY AS SOURCE OF COMMAND)
0023 B5         551         CPL     F1
0024 B885       552         MOV     R0,#BCRB2 ; LOAD R0 WITH ADDR. OFF "B" COMMAND BYTE 2
0026 042A       553         JMP     $+4     ; SKIP OVER NEXT INSTRUCTION
                554
0028 B801       555 AMATCH: MOV     R0,#ACRB2 ; LOAD R0 WITH ADDR. OF "A" COMMAND BYTE 2
                556
                557 ; FETCH FUNCTION CODE & LINE SELECT BYTE FROM COMMAND REG
                558 ; AND SAVE IN R5
002A 80         559         MOVX    A,@R0   ; FETCH FUNCTION CODE BYTE
002B AD         560         MOV     R5,A    ;  & SAVE IN R5
                561
                562 ; SAVE LINE CIRCUIT INDEX IN R6
002C 5307       563         ANL     A,#07H  ; MASK OFF FUNCTIN BITS
```

```
002E AE         564           MOV     R6,A    ; & SAVE 'LINE CKT. INDEX' IN R6
                565
                566 ; CALCULATE LINE CIRCUIT'S CLOCK VECTOR AND SAVE IN R7.
                567 ;     ('CLOCK VECTOR' LOOK-UP TABLE RESIDES IN PROG. MEM. PAGE 3)
002F 03EF       568           ADD     A,#(LOW CLKVCT)
0031 E3         569           MOVP3   A,@A    ; TABLE LOOK-UP 'CLOCK VECTOR' &
0032 AF         570           MOV     R7,A    ; SAVE 'CLOCK VECTOR' IN R7
                571
                572 ; INCREMENT POINTER TO POINT AT COMMAND/RESPONSE DATA BYTE 1
0033 18         573           INC     R0
                574
                575
                576 ; DECODE 'FUNCTION CODE' BY USING 'FUNCTION CODE' AS AN INDEX TO
                577 ;   THE 'FUNCTION CODE' JUMP TABLE
                578
0034 FD         579           MOV     A,R5
0035 77         580           RR      A
0036 77         581           RR      A
0037 77         582           RR      A       ; FUNCTION CODE BITS IN LSB POSITIONS
0038 531F       583           ANL     A,#1FH  ; MASK OFF LINE CKT. SELECT BITS
003A 0384       584           ADD     A,#FNCODE ; ADD FUNCTION CODE JUMP TABLE BASE ADDR
003C B3         585           JMPP    @A      ; JUMP TO FUNCTION CODE'S SERVICE ROUTINE
                586
                587 ; ASSIGNMENT OF WORKING REGISTERS AT THIS POINT IS:
                588 ;     R0      POINTS TO BYTE 3 OF THE COMMAND/RESPONSE S/R
                589 ;     R1      GEN. PURPOSE POINTER
                590 ;     R2      GEN. PURPOSE
                591 ;     R3      GEN. PURPOSE
                592 ;     R4      GEN. PURPOSE
                593 ;     R5      CONTAINS COMMAND FUNCTION CODE
                594 ;     R6      CONTAINS LINE CKT. INDEX
                595 ;     R7      CONTAINS LINE CKT. 'CLOCK VECTOR'
                596 ;ZZZZZZZZZZZZZZZZZZZZZZZZZZZZZZZZZZZZZZZZZZZZZZZZZ
                597 $EJECT
003D 3400       598 L00001: CALL     WRST1   ; 'WRITE LINE CIRCUIT STATUS 1'
003F 04AF       599           JMP     RESTOR
                600
0041 343B       601 L00010: CALL     WRTRCH  ; 'WRITE TX & RX CHAN. ASSIGNMENTS'
0043 04AF       602           JMP     RESTOR
                603
0045 3486       604 L00011: CALL     WRTRGN  ; 'WRITE TX & RX GAIN SETTINGS'
0047 04AF       605           JMP     RESTOR
                606
0049 34AA       607 L00100: CALL     WRLBAL  ; 'WRITE LINE BALANCE SETTING BYTE'
004B 04AF       608           JMP     RESTOR
                609
004D 34B5       610 L00101: CALL     WRST2   ; 'WRITE LINE CIRCUIT STATUS 2'
004F 04AF       611           JMP     RESTOR
                612
0051 94AC       613 L00110: CALL     RSDHS   ; RESET 'DELTA HOOK STATUS' BIT
0053 04A0       614           JMP     WRAPUP
                615
0055 94B0       616 L00111: CALL     SMPTX4  ; SAMPLE TX CH. 4
0057 04AF       617           JMP     RESTOR
                618
0059 8442       619 L01010: CALL     TGNADJ  ; TX GAIN AUTOMATIC ADJUSTMENT
```

```
005B 04AF       620           JMP     RESTOR
                621
005D B400       622 L01011:   CALL    RGNADJ  ; RX GAIN AUTOMATIC ADJUSTMENT
005F 04AF       623           JMP     RESTOR
                624
0061 9495       625 L01100:   CALL    LNTST   ; TEST SPECIFIED LINE CKT.
0063 04AF       626           JMP     RESTOR
                627
0065 5400       628 L01101:   CALL    WRCDR   ; 'WRITE BYTE INTO CODEC CONTROL REG.'
0067 04AF       629           JMP     RESTOR
                630
0069 5418       631 L01110:   CALL    WRCRDS  ; 'UPDATE SPECIFIED BITS OF LINE CARD STATUS'
006B 04AD       632           JMP     WRAPUP
                633
006D 5406       634 L01111:   CALL    WRMEM   ; 'WRITE BYTE INTO DATA MEMORY'
006F 04AD       635           JMP     WRAPUP
                636
0071 542A       637 L10000:   CALL    RDHDHS  ; 'READ "HOOK STATUS" & "DELTA HOOK STATUS"'
0073 04AD       638           JMP     WRAPUP
                639
0075 34EE       640 L10001:   CALL    RDSTAT  ; 'READ LINE CIRCUIT STATUS BYTE'
0077 04AD       641           JMP     WRAPUP
                642
0079 5433       643 L10010:   CALL    RDTRCH  ; 'READ TX & RX CHANNEL ASSIGNMENTS'
007B 04AD       644           JMP     WRAPUP  ;  (AS STORED IN DATA MEMORY)
                645
007D 5441       646 L10011:   CALL    RQTRGN  ; 'REQUEST TX & RX GAIN SETTINGS DATA'
007F 04AF       647           JMP     RESTOR
                648
                649 $EJECT
0081 5458       650 L10100:   CALL    RQLBAL  ; 'REQUEST LINE BALANCE SETTING DATA'
0083 04AF       651           JMP     RESTOR
                652
0085 54E8       653 L10101:   CALL    RWPORT  ; READ/WRITE I/O PORTS 1 & 2
0087 04AD       654           JMP     WRAPUP
                655
0089 94CF       656 L11000:   CALL    RDROM   ; 'READ BYTE OF PROGRAM MEMORY'
008B 04AD       657           JMP     WRAPUP
                658
008D 27         659 L11010:   CLR     A       ; 'COMMAND RESET'---RESTARTS OLC CTR SOFTWARE
008E D7         660           MOV     PSW,A   ; RESET FLAGS & STACK POINTER
008F 65         661           STOP    TCNT
0090 E5         662           SEL     MB0
0091 37         663           CPL     A
0092 39         664           OUTL    P1,A
0093 3A         665           OUTL    P2,A
0094 0400       666           JMP     RESET
                667
0096 546E       668 L11011:   CALL    RQDIG   ; 'REQUEST DIGITAL PER-LINE CHIP CONTENTS'
0098 04AF       669           JMP     RESTOR
                670
009A 5488       671 L11100:   CALL    RDRQST  ; 'READ REQUESTED DATA'
009C 04AD       672           JMP     WRAPUP
                673
009E 548C       674 L11101:   CALL    RQCDR   ; 'REQUEST CODEC DATA REG.' ROUTINE
00A0 04AF       675           JMP     RESTOR
```

```
                  676
00A2 549E         677 L11110: CALL    RDCRDS  ; 'READ CARD STATUS' ROUTINE
00A4 04AD         678         JMP     WRAPUP
                  679
00A6 5400         680 L11111: CALL    RDMEM   ; 'READ BYTE OF DATA MEMORY' ROUTINE
00A8 04AD         681         JMP     WRAPUP
                  682 ;////////////////////////////////////////////////////
                  683 L00000:                 ; 'NO OPERATION COMMAND'
                  684
                  685 ; UNDEFINED FUNCTION CODES------TREATED AS NO-OPS
                  686 L01000:
                  687 L01001:
                  688 L10110:
                  689 L10111:
                  690 L11001:
00AA 18           691         INC     R0      ; FUNCTION CODE IS UNDEFINED----ECHO BYTE 4
00AB 80           692         MOVX    A,@R0   ; TO SET 'RESPONSE ENA' FLIP-FLOP
00AC 90           693         MOVX    @R0,A
                  694
                  695 $EJECT
                  696
                  697 WRAPUP:
                  698 ; WAIT FOR FRAME COUNT TO REACH RESPONSE FRAME COUNT-1
00AD 14E4         699         CALL    FRWAIT
                  700 RESTOR:
                  701 ; RESTORE 'A' REGISTER'S CONTENTS
00AF B929         702         MOV     R1,#ASAVE
00B1 F1           703         MOV     A,@R1   ; RESTORE 'A' REG. CONTENTS
                  704
                  705 ; RE-ENABLE INTERRUPTS
00B2 05           706         EN      I
                  707
                  708 ; RETURN TO INTERRUPTED ROUTINE AT THE POINT WHERE
                  709 ; INTERRUPTED AFTER RESTORING STATUS (CARRY FLAG, AUX. CARRY,
                  710 ; FLAG F0, REG. BANK SELECT)
00B3 93           711         RETR
                  712
                  713 ;*** END OF CMDINT ***
                  714 $EJECT
                  715
                  716 ;       NAME            FNCODE
                  717
                  718 ; FNCODE -- FUNCTION CODE SERVICE ROUTINE ADDRESS LOOK-UP TABLE
                  719
                  720 FNCODE:
00B4 AA           721         DB      L00000, L00001, L00010, L00011
00B5 3D
00B6 41
00B7 45
00B8 49           722         DB      L00100, L00101, L00110, L00111
00B9 4D
00BA 51
00BB 55
00BC AA           723         DB      L01000, L01001, L01010, L01011
00BD AA
00BE 59
```

```
00BF 50
00C0 61          724         DB      L01100, L01101, L01110, L01111
00C1 65
00C2 69
00C3 6D
00C4 71          725         DB      L10000, L10001, L10010, L10011
00C5 75
00C6 79
00C7 7D
00C8 81          726         DB      L10100, L10101, L10110, L10111
00C9 85
00CA AA
00CB AA
00CC 89          727         DB      L11000, L11001, L11010, L11011
00CD AA
00CE 8D
00CF 96
00D0 9A          728         DB      L11100, L11101, L11110, L11111
00D1 9E
00D2 A2
00D3 A6
                 729
                 730 ;*** END OF FNCODE ***
                 731 $EJECT
                 732
                 733 ;       NAME            CNTLEN
                 734
                 735 ;
                 736 ;
                 737 ;
                 738
                 739 ; CNTLEN — ENABLE CUSTOM CONTROL COMM. I.C. FOR COMMANDS RECEPTION
                 740
                 741 CNTLEN:
                 742 ; WAIT UNTIL 'CONTROL WINDOW' HAS PASSED
00D4 45          743         STRT    CNT     ; START FRAME COUNTER
00D5 42          744         MOV     A,T
00D6 37          745         CPL     A
00D7 07          746         DEC     A       ; 2'S COMPLEMENT OF STARTING FRAME COUNT
00D8 A9          747         MOV     R1,A
                 748
00D9 42          749 CNTLE1: MOV    A,T
00DA 69          750         ADD     A,R1
00DB 96D9        751         JNZ     CNTLE1  ; LOOP UNTIL STARTING FRAME BEGINS
                 752
                 753 ; ENABLE COMMANDS RECEPTION
00DD B90D        754         MOV     R1,#CMODE
00DF 81          755         MOVX    A,@R1
00E0 4304        756         ORL     A,#04H  ; SET 'CNTRL RX ENA'
00E2 91          757         MOVX    @R1,A
00E3 83          758         RET
                 759
                 760 FRWAIT:
                 761 ; CHECK TO SEE IF FRAME COUNT HAS REACHED OR EXCEEDED THE
                 762 ; RESPONSE FRAME COUNT.
00E4 B928        763         MOV     R1,#RSPCNT
```

```
00E6 F1        764         MOV     A,@R1   ; FETCH RESPONSE COUNT REFERENCE BYTE
00E7 A9        765         MOV     R1,A    ;   & PUT IN R1
00E8 42        766         MOV     A,T
00E9 69        767         ADD     A,R1
00EA F6EE      768         JC      TOOLAT
00EC 04D9      769         JMP     CNTLE1
               770
               771 TOOLAT:
               772 ; RESET 'RESPONSE ENABLE FLIP-FLOP' IN CONTROL COMM. I.C.
00EE B980      773         MOV     R1,#CMODE
00F0 81        774         MOVX    A,@R1
00F1 4308      775         ORL     A,#08H  ; PULSE 'RESP. ENA FLIP-FLOP RESET' HIGH
00F3 91        776         MOVX    @R1,A
00F4 53F7      777         ANL     A,#0F7H ;   THEN LOW AGAIN.
00F6 91        778         MOVX    @R1,A
00F7 0404      779         JMP     CNTLEN  ; RE-ENABLE COMMANDS RECEPTION
               780
               781 ;*** END OF CNTLEN ***
               782 $EJECT
               783
               784 ;       NAME            WRST1
               785
               786 ;
               787 ;
               788 ;
               789
               790 ; WRST1 -- WRITE LINE CIRCUIT STATUS 1 (SELECTED BITS)
               791 ;           COMMAND DATA BYTE 1 CONTAINS 'NEW STATUS DATA'
               792 ;           COMMAND DATA BYTE 2 CONTAINS 'CHANGE MASK'
               793
0100           794         ORG     100H
               795 WRST1:
0100 80        796         MOVX    A,@R0   ; FETCH NEW STATUS BYTE
0101 AA        797         MOV     R2,A    ;   AND SAVE IN R2
               798
0102 85        799         CLR     F0
0103 B206      800         JB5     $+3     ; SKIP NEXT INSTRUCTION IF 'PWR' BIT=1
0105 95        801         CPL     F0      ; SET F0 IF 'PWR' BIT = 0 (F0='PWR BAR')
               802
               803 ; F0 = 'PWR BAR'
0106 2330      804         MOV     A,#LCST1
0108 6E        805         ADD     A,R6    ; ADD 'LC INDEX' TO 'LINE CKT STAT' BASE ADDR.
0109 A9        806         MOV     R1,A
               807
010A 18        808         INC     R0
010B 80        809         MOVX    A,@R0   ; FETCH STATUS WRITE MASK
               810
010C B20F      811         JB5     $+3     ; SKIP NEXT INSTR. IF 'PWR MASK' = 1
010E 85        812         CLR     F0
               813
               814 ; F0 = ('PWR BAR' AND 'PWR MASK')
010F 2A        815         XCH     A,R2    ; EXCHANGE PLACES WITH 'NEW STATUS' BYTE
0110 5A        816         ANL     A,R2    ; CLR 'NEW STATUS' BYTE BIT POSITIONS NOT CHANGING
0111 2A        817         XCH     A,R2
0112 37        818         CPL     A       ; COMPLEMENT STATUS WRITE MASK
0113 51        819         ANL     A,@R1   ; CLEAR BIT POSITIONS WHICH ARE TO BE MODIFIED
```

```
0114 4A       820          ORL     A,R2       ; NEW STATUS BYTE
0115 A1       821          MOV     @R1,A
0116 C8       822          DEC     R0
0117 90       823          MOVX    @R0,A      ; PUT UPDATED STATUS BYTE IN RESPONSE REG.
0118 AA       824          MOV     R2,A       ;  & SAVE IN R2
              825
0119 18       826          INC     R0
011A 34F5     827          CALL    RDST2      ; PUT CURRENT 'STATUS 2' BYTE IN RESPONSE REG.
              828
              829 ; ENABLE RESPONSE TRANSMISSION
011C 14E4     830          CALL    FRWAIT
              831
              832 $EJECT
              833 ; CHECK TO SEE IF LINE CIRCUIT IS BEING POWERED-DOWN
011E 95       834          CPL     F0
011F B631     835          JF0     NOPDWN
              836
              837 PDWN:
              838 ; LINE CIRCUIT IS BEING POWERED-DOWN---PUT CODEC IN 'STAND-BY' MODE
0121 23FF     839          MOV     A,#0FFH
0123 942F     840          CALL    CODEC
0125 2340     841          MOV     A,#TXCH
0127 6E       842          ADD     A,R6
0128 A9       843          MOV     R1,A
0129 B13F     844          MOV     @R1,#3FH        ; RESET TX CHAN. ASSIGN. BYTE IN DATA MEM.
012B 2348     845          MOV     A,#RXCH
012D 6E       846          ADD     A,R6
012E A9       847          MOV     R1,A
012F B13F     848          MOV     @R1,#3FH        ; RESET RX CHAN. ASSIGN. BYTE IN DATA MEM.
              849
              850 NOPDWN:
              851 ; TRANSMIT MODIFIED STATUS TO DIGITAL PER-LINE CUSTOM I.C.
0131 2300     852 LDDIG:   MOV     A,#WRDIG
0133 9400     853          CALL    XMIT4
0135 FA       854          MOV     A,R2       ; UPDATED STATUS IN 'A' REG.
0136 9406     855          CALL    XMIT8      ; SEND MODIFIED STATUS TO LINE CKT.
              856
              857 ; RETURN S/H VECTOR ON PORT 1 INPUTS
0138 74E4     858          CALL    RTNSH
              859
013A 83       860          RET
              861
              862 ;*** END OF WRST1 ***
              863 $EJECT
              864
              865 ;      NAME            WRTRCH
              866
              867 ;
              868 ;
              869 ;
              870
              871 ; WRTRCH -- WRITE TX & RX CHANNEL ASSIGNMENTS INTO DATA MEMORY
              872 ;           AND TO THE CODEC.
              873
              874 WRTRCH:
```

```
                875 ; READ TX CHANNEL ASSIGNMENT AND STORE IN DATA MEMORY.
013B 2340       876       MOV    A,#TXCH
013D 6E         877       ADD    A,R6      ; ADD LC INDEX TO TX CHAN. BASE ADDR.
013E A9         878       MOV    R1,A
                879
013F 80         880       MOVX   A,@R0     ; FETCH NEW TX CHANNEL ASSIGNMENT
0140 A1         881       MOV    @R1,A     ; STORE NEW TX CHAN. ASSIGNMENT IN RAM
0141 533F       882       ANL    A,#3FH    ; MASK OFF 2 MSB'S
                883
                884 ; FORMAT TX CHANNEL ASSIGNMENT FOR CODEC
0143 85         885       CLR    F0
0144 95         886       CPL    F0        ; SET F0 (ASSUME ODD CHAN.)
0145 97         887       CLR    C
0146 67         888       RRC    A         ; ROTATE LSB INTO CARRY FLAG
0147 F64B       889       JC     WTRCH1    ; SKIP NEXT TWO INSTRUCTIONS IF ODD
                890
0149 85         891       CLR    F0        ; CLEAR F0 & DECREMENT ACCUMULATOR TWICE
014A 07         892       DEC    A         ;    IF EVEN TX CHAN.
                893
014B 07         894 WTRCH1: DEC  A
014C 4340       895       ORL    A,#40H    ; APPEND '01' PREFIX TO 'TX CHAN.'
014E AC         896       MOV    R4,A      ; & SAVE IN R4
                897
                898 ; READ RX CHANNEL ASSIGNMENT AND STORE IN DATA MEMORY.
014F 2348       899       MOV    A,#RXCH
0151 6E         900       ADD    A,R6
0152 A9         901       MOV    R1,A
0153 18         902       INC    R0        ; R0 NOW POINTS TO COMMAND REG. BYTE 4
                903
0154 80         904       MOVX   A,@R0     ; FETCH NEW RX CHAN. ASSIGNMENT
0155 90         905       MOVX   @R0,A     ; ECHO BYTE 4 TO SET RESPONSE ENA FF
0156 A1         906       MOV    @R1,A     ; STORE NEW RX CHAN. ASSIGNMENT IN RAM
0157 533F       907       ANL    A,#3FH    ; MASK OFF 2 MSB'S
                908
                909 ; FORMAT RX CHANNEL ASSIGNMENT FOR CODEC
0159 4380       910       ORL    A,#80H    ; PREFIX CHAN. WITH '10' CODEC FUNCTION BITS
015B AD         911       MOV    R5,A      ; & SAVE IN R5
                912
                913 $EJECT
                914 ; UPDATE LINE STATUS 'EVEN BAR/ODD', 'POWER', & 'LC ENA' BITS
015C 2330       915       MOV    A,#LCST1
015E 6E         916       ADD    A,R6
015F A8         917       MOV    R0,A
                918
0160 F0         919       MOV    A,@R0     ; FETCH 'LINE CIRCUIT STATUS' BYTE
0161 43A4       920       ORL    A,#0A4H   ; SET 'EVEN BAR/ODD', 'POWER', & 'LC ENA' BITS
0163 B667       921       JF0    $+4       ; SKIP NEXT INSTRUCTION IF ODD
                922
0165 537F       923       ANL    A,#7FH    ; CLEAR 'EVEN BAR/ODD' BIT IF EVEN
                924
0167 A0         925       MOV    @R0,A     ; STORE UPDATED 'LINE CKT STATUS' BYTE
                926
                927 ; SET LINE CIRCUIT'S 'BUSY' BIT
0168 2338       928       MOV    A,#LCST2
016A 6E         929       ADD    A,R6
016B A9         930       MOV    R1,A      ; ADD 'LC INDEX' TO 'HW STATUS' BASE ADDR.
```

```
016C F1        932          MOV      A,@R1
016D 4320      933          ORL      A,#20H    ; SET 'BUSY' BIT
016F A1        934          MOV      @R1,A
               935
               936 ; CLEAR 'DELTA HOOK STATUS' BIT FOR THIS LINE CKT.
0170 94AC      937          CALL     RSDHS
               938
               939 ; ENABLE RESPONSE TRANSMISSION, THEN CONTINUE WRITING CHANNEL
               940 ;   ASSIGNMENTS TO CODEC.
0172 14E4      941          CALL     FRWAIT
               942
               943 ; SEND NEW 'LC STATUS 2' DATA TO PER-LINE DIG. CUSTOM I.C.
0174 2300      944          MOV      A,#WRDIG
0176 9400      945          CALL     XMIT4     ; PUT DIGITAL CUSTOM I.C. IN WRITE MODE
0178 2330      946          MOV      A,#LCST1
017A 6E        947          ADD      A,R6
017B A9        948          MOV      R1,A
017C F1        949          MOV      A,@R1     ; FETCH 'LCST1' BYTE
017D 9406      950          CALL     XMIT8
               951
               952 ; SEND TX CHANNEL ASSIGNMENT TO CODEC
017F FC        953          MOV      A,R4
0180 942F      954          CALL     CODEC
               955
               956 ; SEND RX CHANNEL ASSIGNMENT TO CODEC
0182 FD        957          MOV      A,R5
0183 942F      958          CALL     CODEC
               959
0185 83        960          RET
               961
               962 ;*** END OFF WRTRCH ***
               963 $EJECT
               964
               965 ;        NAME          WRTRGN
               966
               967 ;
               968 ;
               969 ;
               970
               971 ; WRTRGN -- WRITE NEW TX & RX GAIN SETTINGS INTO SELECTED
               972 ;           LINE CKT'S CUSTOM ANALOG I.C.
               973
               974 WRTRGN:
               975 ; SET UP R1 AS THE DATA MEMORY POINTER FOR GAIN & BAL. SETTINGS
0186 54E1      976          CALL     RGNADD
0188 C9        977          DEC      R1        ; R1 POINTS TO TX GAIN SETTING BYTE
               978
               979 ; FETCH & SAVE NEW TX GAIN SETTING
0189 80        980          MOVX     A,@R0
018A A1        981          MOV      @R1,A
018B 18        982          INC      R0
               983
               984 ; FETCH & SAVE NEW RX GAIN SETTING
018C 19        985          INC      R1        ; R1 POINTS TO RX GAIN SETTING BYTE
```

```
018D 80          986           MOVX     A,@R0
018E 90          987           MOVX     @R0,A     ; ECHO BYTE 4 TO SET 'RESPONSE ENA' FF
018F A1          988           MOV      @R1,A
                 989
                 990 ; ENABLE RESPONSE TRANSMISSION, THEN CONTINUE WRITING GAIN SETTINGS.
0190 14E4        991           CALL     FRWAIT
                 992
                 993 ; WRITE GAIN & BALANCE SETTINGS INTO ANALOG CUSTOM I.C.
0192 2340        994 LDGAIN:   MOV      A,#WRANA
0194 9400        995           CALL     XMIT4
                 996
0196 54E1        997           CALL     RGNADD
0198 19          998           INC      R1        ; R1 POINTS TO CURRENT LINE BAL. BYTE
0199 F1          999           MOV      A,@R1
019A 9406        1000          CALL     XMIT8     ; RE-WRITE CURRENT LINE BAL. INTO I.C.
                 1001
019C 54E1        1002          CALL     RGNADD    ; R1 POINTS TO RX GAIN BYTE
019E F1          1003          MOV      A,@R1
019F 9406        1004          CALL     XMIT8     ; WRITE NEW RX GAIN SETTING
                 1005
01A1 54E1        1006          CALL     RGNADD
01A3 C9          1007          DEC      R1        ; R1 POINTS TO TX GAIN BYTE
01A4 F1          1008          MOV      A,@R1
01A5 9406        1009          CALL     XMIT8     ; WRITE NEW TX GAIN SETTING
                 1010
                 1011 ; RETURN S/H VECTOR ON PORT 1 INPUTS
01A7 74E4        1012          CALL     RTNSH
                 1013
01A9 83          1014          RET
                 1015 ;*** END OF WRTRGN ***
                 1016 $EJECT
                 1017
                 1018 ;        NAME             WRLBAL
                 1019
                 1020 ;
                 1021 ;
                 1022 ;
                 1023
                 1024 ; WRLBAL -- WRITE NEW LINE BALANCE SETTING INTO THE SELECTED
                 1025 ;          LINE CKT'S CUSTOM ANALOG I.C.
                 1026
                 1027 WRLBAL:
                 1028 ; SET UP R1 TO POINT TO LINE BAL. DATA MEMORY BYTE
01AA 54E1        1029          CALL     RGNADD
01AC 19          1030          INC      R1        ; R1 POINTS TO LINE BAL. BYTE
                 1031
                 1032 ; READ & ECHO NEW LINE BALANCE SETTING
01AD 18          1033          INC      R0        ; R0 POINTS TO BYTE 4 OF COMMAND REG.
01AE 80          1034          MOVX     A,@R0
01AF 90          1035          MOVX     @R0,A
01B0 A1          1036          MOV      @R1,A     ; SAVE NEW LINE BAL. SETTING IN RAM
                 1037
                 1038 ; ENABLE RESPONSE TRANSMISSION, THEN CONTINUE WRITING LINE BALANCE
01B1 14E4        1039          CALL     FRWAIT
                 1040
                 1041 ; WRITE NEW LINE BALANCE SETTING INTO BYTE 1 OF ANALOG I.C.'S
```

```
                    1042 ;    24-BIT CONTROL REGISTER
01B3 2492           1043           JMP      LDGAIN  ; (LDGAIN IS LOCATED IN WRTRGN)
                    1044
                    1045 ;*** END OF WRLBAL ***
                    1046 $EJECT
                    1047
                    1048 ;        NAME              WRST2
                    1049
                    1050 ;
                    1051 ;
                    1052 ;
                    1053
                    1054 ; WRST2 -- WRITE STATUS 2 TO THE SELECTED LINE CKT.
                    1055
                    1056 ; BIT POSITION ASSIGNMENTS
                    1057 ;         BIT 7 = 'BUSY'   (LINE BUSY)
                    1058 ;         BIT 6 = 'LK'     (LOCKOUT)
                    1059 ;         BIT 5 = 'RV'     (REVERTIVE CALL)
                    1060 ;         BIT 4 = N/A      (NOT ASSIGNED)
                    1061 ;         BIT 3 = N/A
                    1062 ;         BIT 2 = N/A
                    1063 ;         BIT 1 = N/A
                    1064 ;         BIT 0 = N/A
                    1065
                    1066 ;        COMMAND WORD DATA BYTE 1 = 'NEW STATUS DATA'
                    1067 ;        COMMAND WORD DATA BYTE 2 = 'CHANGE MASK'
                    1068
                    1069 ;        ONLY THE BITS INDICATED BY '1' IN THE 'CHANGE MASK' ARE
                    1070 ;        TO BE AFFECTED BY THIS COMMAND.
                    1071
                    1072 ;        LINE CIRCUIT IS POWERED-DOWN IF 'BUSY' STATUS IS CLEARED.
                    1073
                    1074 WRST2:
01B5 80             1075           MOVX     A,@R0    ; FETCH NEW STATUS BYTE
01B6 AA             1076           MOV      R2,A     ;  & SAVE IN R2
                    1077
01B7 85             1078           CLR      F0
01B8 F2BB           1079           JB7      $+3      ; SET FLAG F0 TO 'BUSY BAR'
01BA 95             1080           CPL      F0
                    1081
                    1082 ; F0 = 'BUSY BAR'
01BB 2338           1083           MOV      A,#LCST2
01BD 6E             1084           ADD      A,R6
01BE A9             1085           MOV      R1,A     ; R1 NOW POINTS TO 'LC STATUS 2' BYTE
                    1086
01BF 18             1087           INC      R0
01C0 80             1088           MOVX     A,@R0    ; FETCH 'LINE STATUS 2' WRITE MASK
                    1089
01C1 F2C4           1090           JB7      $+3
01C3 85             1091           CLR      F0       ; CLEAR F0 IF 'BUSY MASK' = 0
                    1092
                    1093 $EJECT
                    1094 ; F0 = ('BUSY BAR' AND 'BUSY MASK')
01C4 2A             1095           XCH      A,R2     ; EXCHANGE PLACES WITH 'NEW STATUS' BYTE
01C5 5A             1096           ANL      A,R2     ; CLEAR BIT POSITIONS WHICH ARE NOT BEING CHANGED
01C6 2A             1097           XCH      A,R2
```

```
01C7 37       1098          CPL    A          ; COMPLEMENT WRITE MASK
01C8 51       1099          ANL    A,@R1      ; CLEAR BIT POSITIONS WHICH ARE TO BE CHANGED
01C9 4A       1100          ORL    A,R2       ; NEW STATUS BYTE
01CA A1       1101          MOV    @R1,A
              1102
01CB C8       1103          DEC    R0
01CC 34EE     1104          CALL   RDSTAT
              1105
              1106 ; WAIT FOR RESPONSE FRAME
01CE 14E4     1107          CALL   FRWAIT
              1108
01D0 B6D3     1109          JF0    PDWN2
              1110
01D2 83       1111 NOPD2:   RET
              1112
01D3 23FF     1113 PDWN2:   MOV    A,#0FFH
01D5 942F     1114          CALL   CODEC      ; PUT CODEC IN STANDBY MODE
01D7 2340     1115          MOV    A,#TXCH
01D9 6E       1116          ADD    A,R6
01DA A9       1117          MOV    R1,A
01DB B13F     1118          MOV    @R1,#3FH   ; RESET TX CHAN. BYTE
01DD 2348     1119          MOV    A,#RXCH
01DF 6E       1120          ADD    A,R6
01E0 A9       1121          MOV    R1,A
01E1 B13F     1122          MOV    @R1,#3FH   ; RESET RX CHAN. BYTE
01E3 2330     1123          MOV    A,#LCST1
01E5 6E       1124          ADD    A,R6
01E6 A9       1125          MOV    R1,A
01E7 2318     1126          MOV    A,#IDIG
01E9 A1       1127          MOV    @R1,A      ; RESET 'LC STATUS 1' BYTE
01EA AA       1128          MOV    R2,A       ;           AND
01EB 3431     1129          CALL   LDDIG      ; DIGITAL PER-LINE CUSTOM I.C.
              1130
01ED 83       1131          RET
              1132
              1133 ;*** END OF WRST2 ***
              1134 $EJECT
              1135
              1136 ;        NAME            RDSTAT
              1137
              1138 ;
              1139 ;
              1140 ;
              1141
              1142 ; RDSTAT -- READ LINE CIRCUIT STATUS WORD
              1143
              1144 RDSTAT:
01EE 2330     1145          MOV    A,#LCST1   ; ADDR OF 'LC STATUS 1'
01F0 6E       1146          ADD    A,R6       ; ADD LINE CIRCUIT INDEX
01F1 A9       1147          MOV    R1,A       ; TO LINE CKT. INDEX AND PUT IN R1
              1148
01F2 F1       1149          MOV    A,@R1      ; FETCH 'LC STATUS 1' BYTE
01F3 90       1150          MOVX   @R0,A
01F4 18       1151          INC    R0
              1152
              1153
```

```
                    1154 ; RDHWS -- READ 'HW STATUS'
                    1155
                    1156 RDST2:
01F5 2338           1157         MOV     A,#LCST2
01F7 6E             1158         ADD     A,R6
01F8 A9             1159         MOV     R1,A
                    1160
01F9 F1             1161         MOV     A,@R1   ; FETCH 'LC STATUS 2' BYTE
01FA 90             1162         MOVX    @R0,A   ; PUT 'LC STATUS 2' IN RESPONSE REG.
                    1163
01FB 83             1164         RET
                    1165
                    1166 ;*** END OF RDSTAT ***
                    1167 $EJECT
                    1168
                    1169 ;       NAME            RDMEM
                    1170
                    1171 ;
                    1172 ;       :
                    1173 ;
                    1174
                    1175 ; RDMEM -- READ ONE BYTE OF DATA MEMORY
                    1176
                    1177 ;    R0 POINTS TO ADDRESS BYTE (BYTE 3)
                    1178
0200                1179         ORG     200H
                    1180 RDMEM:
0200 80             1181         MOVX    A,@R0   ; FETCH ADDRESS
0201 18             1182         INC     R0
0202 A9             1183         MOV     R1,A
0203 F1             1184         MOV     A,@R1   ; DATA IN 'A' REG
0204 90             1185         MOVX    @R0,A   ; WRITE DATA INTO CONTROL REG. BYTE 3
                    1186
0205 83             1187         RET
                    1188
                    1189 ;*** END OF RDMEM ***
                    1190 $EJECT
                    1191
                    1192 ;       NAME            WRMEM
                    1193
                    1194 ;
                    1195 ;
                    1196 ;
                    1197
                    1198 ; WRMEM -- WRITE ONE BYTE INTO DATA MEMORY
                    1199
                    1200 ;    R0 POINTS TO ADDRESS BYTE (BYTE 3)
                    1201 ;    BYTE 4 CONTAINS DATA TO BE WRITTEN INTO DATA MEMORY
                    1202
                    1203 WRMEM:
0206 80             1204         MOVX    A,@R0   ; FETCH ADDRESS
0207 18             1205         INC     R0
0208 A9             1206         MOV     R1,A
0209 80             1207         MOVX    A,@R0   ; FETCH DATA
020A A1             1208         MOV     @R1,A   ;  AND WRITE INTO DATA MEMORY
020B 90             1209         MOVX    @R0,A   ; SET RESPONSE ENABLE FLIP-FLOP BY
```

```
                    1210                    ; WRITING INTO CONTROL REG. BYTE 4
020C 83             1211        RET
                    1212
                    1213 ;*** END OF WRMEM ***
                    1214 $EJECT
                    1215
                    1216 ;      NAME            WRCDR
                    1217
                    1218 ;
                    1219 ;
                    1220 ;
                    1221
                    1222 ; WRCDR -- WRITE CONTROL DATA INTO CODEC
                    1223
                    1224 WRCDR:
                    1225 ; FETCH CODEC CONTROL BYTE FROM COMMAND REG. BYTE 3
020D 80             1226        MOVX    A,@R0
020E AC             1227        MOV     R4,A
                    1228
                    1229 ; ECHO COMMAND REG. BYTE 4 TO SET 'RESPONSE ENABLE' FLIP-FLOP
020F 18             1230        INC     R0
0210 80             1231        MOVX    A,@R0
0211 90             1232        MOVX    @R0,A
                    1233
                    1234 ; WAIT FOR RESPONSE FRAME
0212 14E4           1235        CALL    FRWAIT
                    1236
                    1237 ; SEND CONTROL BYTE TO CODEC
0214 FC             1238        MOV     A,R4
0215 942F           1239        CALL    CODEC
                    1240
0217 83             1241        RET
                    1242
                    1243 ;*** END OF WRCDR ***
                    1244 $EJECT
                    1245
                    1246 ;      NAME            WRCRDS
                    1247
                    1248 ;
                    1249 ;
                    1250 ;
                    1251
                    1252 ; WRCRDS -- WRITE NEW DATA INTO LINE CARD STATUS BYTE FROM
                    1253 ;           LINE SWITCH CONTROLLER. THE FIRST COMMAND
                    1254 ;           WORD DATA BYTE CONTAINS THE NEW DATA; THE
                    1255 ;           SECOND COMMAND DATA BYTE CONTAINS THE CHANGE
                    1256 ;           MASK IN WHICH A '1' INDICATES THAT THAT BIT
                    1257 ;           POSITION(S) IN THE CURRENTLY STORED LINE CARD
                    1258 ;           STATUS BYTE IS(ARE) TO BE UPDATED TO THE VALUES
                    1259 ;           IN THE FIRST COMMAND DATA BYTE.
                    1260
                    1261 ;           NOTE THAT IF ALL BITS OF THE 'CHANGE MASK' ARE
                    1262 ;           '0' THEN THE COMMAND IS EQUIVALENT TO A READ
                    1263 ;           OF THE CURRENT LINE CARD STATUS BYTE.
                    1264
                    1265 WRCRDS:
```

```
0218 80        1266           MOVX    A,@R0   ; FETCH NEW DATA WORD &
0219 AB        1267           MOV     R3,A    ;   SAVE IN R3
021A 18        1268           INC     R0
021B 80        1269           MOVX    A,@R0   ; FETCH DATA CHANGE MASK
021C AA        1270           MOV     R2,A    ;   & SAVE IN R2
021D 5B        1271           ANL     A,R3    ; 'AND' MASK WITH NEW DATA BYTE &
021E AB        1272           MOV     R3,A    ;   SAVE 'MASKED NEW DATA BITS' IN R3
               1273
021F B920      1274           MOV     R1,#LNCRDS
0221 FA        1275           MOV     A,R2
0222 37        1276           CPL     A       ; COMPLEMENT 'CHANGE MASK' (ONE'S IN BIT
               1277                           ;   POSITIONS NOT TO BE UPDATED)
0223 51        1278           ANL     A,@R1   ; ZERO BIT POSITIONS OF CURRENT CARD STATUS
               1279                           ;   BYTE WHICH ARE NOT TO CHANGE
0224 4B        1280           ORL     A,R3    ; UPDATED LINE CARD STATUS BYTE
0225 A1        1281           MOV     @R1,A
               1282
               1283 ; LOAD 'CARD STATUS' & 'S/H VECTOR' INTO RESPONSE REGISTER
0226 C8        1284           DEC     R0
0227 549E      1285           CALL    RDCRDS
               1286
0229 83        1287           RET
               1288
               1289 ;*** END OF WRCRDS ***
               1290 $EJECT
               1291
               1292 ;       NAME            RDHDHS
               1293
               1294 ;
               1295 ;
               1296 ;
               1297
               1298 ; RDHDHS — READ 'HOOK STATUS VECTOR' & 'DELTA HOOK STATUS VECTOR'
               1299 ;         THEN RESET 'DELTA HOOK STATUS VECTOR' & "OR'D DLTA HS"
               1300
               1301 RDHDHS:
022A B921      1302           MOV     R1,#HSW ; ADDR. OF 'HOOK SWITCH STATUS VECTOR'
022C F1        1303           MOV     A,@R1
022D 90        1304           MOVX    @R0,A   ; WRITE 'HOOK STATUS VECTOR' INTO BYTE 3
022E 18        1305           INC     R0
022F 19        1306           INC     R1
0230 F1        1307           MOV     A,@R1
0231 90        1308           MOVX    @R0,A   ; WRITE 'DELTA HS VECTOR' INTO BYTE 4
               1309
0232 83        1310           RET
               1311
               1312 ;*** END OF RDHDHS ***
               1313 $EJECT
               1314
               1315 ;       NAME            RDTRCH
               1316
               1317 ;
               1318 ;
               1319 ;
               1320
               1321 ; RDTRCH — READ MOST RECENT TX & RX CHANNEL ASSIGNMENTS
```

```
                    1322 ;            FOR THE SPECIFIED LINE CIRCUIT.
                    1323
                    1324 RDTRCH:
0233 2340           1325          MOV     A,#TXCH
0235 6E             1326          ADD     A,R6      ; ADD LC INDEX TO TX CHAN. BASE ADDR.
0236 A9             1327          MOV     R1,A      ;   AND MOVE INTO POINTER REG. R1
                    1328
0237 F1             1329          MOV     A,@R1     ; FETCH STORED TX CHANNEL ASSIGNMENT
0238 90             1330          MOVX    @R0,A     ;   AND MOVE TX CHAN. INTO CNTRL. S/R BYTE 3
0239 18             1331          INC     R0
                    1332
023A 2348           1333          MOV     A,#RXCH
023C 6E             1334          ADD     A,R6      ; ADD LC INDEX TO RX CHAN. BASE ADDR.
023D A9             1335          MOV     R1,A
                    1336
023E F1             1337          MOV     A,@R1     ; FETCH STORED RX CHANNEL ASSIGNMENT
023F 90             1338          MOVX    @R0,A     ;   AND MOVE RX CHAN. INTO CNTRL S/R BYTE 4
                    1339                            ;   (WHICH ALSO SETS RESPONSE ENA FLIP-FLOP)
                    1340
0240 83             1341          RET
                    1342
                    1343 ;*** END OF RDTRCH ***
                    1344 $EJECT
                    1345
                    1346 ;         NAME          RQTRGN
                    1347
                    1348 ;
                    1349 ;
                    1350 ;
                    1351
                    1352 ; RQTRGN -- REQUEST CURRENT TX & RX GAIN SETTINGS FOR THE
                    1353 ;            SELECTED LINE CIRCUIT.
                    1354
                    1355 RQTRGN:
0241 9440           1356          CALL    RQST      ; 'REQUEST' COMMAND PRELIMINARY TASKS
                    1357
0243 2308           1358          MOV     A,#RDANA
0245 9400           1359          CALL    XMIT4
                    1360
                    1361 ; ENABLE RESPONSE TRANSMISSION, THEN FETCH REQUESTED DATA.
0247 14E4           1362          CALL    FRWAIT
                    1363
                    1364 ; SKIP OVER LINE BALANCE BYTE IN ANALOG PER-LINE I.C.
0249 54C7           1365          CALL    CKBRST
                    1366
                    1367 ; FETCH RX GAIN SETTING
024B 941C           1368          CALL    RCV8
024D B927           1369          MOV     R1,#RQBYT2
024F A1             1370          MOV     @R1,A     ; 'RQBYT2' = RX GAIN SETTING
                    1371
                    1372 ; FETCH TX GAIN SETTING
0250 941C           1373          CALL    RCV8
0252 B926           1374          MOV     R1,#RQBYT1
0254 A1             1375          MOV     @R1,A     ; 'RQBYT1' = TX GAIN SETTING
                    1376
                    1377 ; RETURN S/H VECTOR ON PORT 1 INPUTS
```

```
0255 74E4      1378          CALL    RTNSH
               1379
0257 83        1380          RET
               1381
               1382 ;*** END OFF RQTRGN ***
               1383 $EJECT
               1384
               1385 ;         NAME            RQLBAL
               1386
               1387 ;
               1388 ;
               1389 ;
               1390
               1391 ; RQLBAL -- REQUEST CURRENT LINE BALANCE SETTING
               1392
               1393 RQLBAL:
               1394 ; 'REQUEST' COMMAND PRELIMINARY OPERATIONS
0258 9440      1395          CALL    RQST
               1396
025A 23C0      1397          MOV     A,#RDANA ; SET ANALOG CHIP FOR READ MODE
025C 9400      1398          CALL    XMIT4
               1399
               1400 ; ENABLE RESPONSE TRANSMISSION, THEN CONTINUE TO FETCH REQUESTED DATA
025E 14E4      1401          CALL    FRWAIT
               1402
               1403 ; FETCH LINE BALANCE SETTING BYTE FROM ANALOG PER-LINE I.C.
0260 941C      1404          CALL    RCV8
0262 B926      1405          MOV     R1,#RQBYT1
0264 A1        1406          MOV     @R1,A   ; 'RQBYT1' = 'LINE BALANCE BYTE'
               1407
0265 19        1408          INC     R1
0266 A1        1409          MOV     @R1,A   ; 'RQBYT2' = 'RQBYT1'
               1410
               1411 ; SKIP OVER RX & TX GAIN SETTINGS
0267 54C7      1412          CALL    CKBRST
0269 54C7      1413          CALL    CKBRST
               1414
               1415 ; RETURN S/H VECTOR ON PORT 1 INPUTS
026B 74E4      1416          CALL    RTNSH
               1417
026D 83        1418          RET
               1419
               1420 ;*** END OF RQLBAL ***
               1421 $EJECT
               1422
               1423 ;         NAME            RQDIG
               1424
               1425 ;
               1426 ;
               1427 ;
               1428
               1429 ; RQDIG -- REQUEST DIGITAL PER-LINE CUSTOM I.C.'S CONTENTS
               1430
               1431 RQDIG:
               1432 ; 'REQUEST' COMMAND PRELIMINARY OPERATIONS
026E 9440      1433          CALL    RQST
```

```
                    1434
                    1435 ;   SEND 'READ DIGITAL I.C.' COMMAND TO LINE CIRCUITS
0270 2388           1436           MOV     A,#RDDIG
0272 9400           1437           CALL    XMIT4
                    1438
                    1439 ;   ENABLE RESPONSE TRANSMISSION, THEN CONTINUE TO FETCH REQUESTED DATA
0274 14E4           1440           CALL    FRWAIT
                    1441
                    1442 ;   FETCH CONTENTS OF DIGITAL PER-LINE I.C.
0276 941C           1443           CALL    RCV8
0278 B926           1444           MOV     R1,#RQBYT1
027A A1             1445           MOV     @R1,A   ; 'RQBYT1' = DIGITAL I.C.'S CONTENTS
                    1446
027B 19             1447           INC     R1
027C A1             1448           MOV     @R1,A   ; 'RQBYT2' = 'RQBYT1'
                    1449
                    1450 ;   RETURN S/H VECTOR ON PORT 1 INPUTS
027D 74E4           1451           CALL    RTNSH
                    1452
027F 83             1453           RET
                    1454
                    1455 ;*** END OF RQDIG ***
                    1456 $EJECT
                    1457
                    1458 ;         NAME            RDRQST
                    1459
                    1460 ;
                    1461 ;
                    1462 ;
                    1463
                    1464 ;   RDRQST -- READ DATA CURRENTLY IN THE 'REQUESTED DATA'
                    1465 ;            LOCATIONS OF DATA MEMORY.  ONE BYTE RETURNED
                    1466 ;            WILL BE THE FUNCTION CODE BYTE WHICH LAST
                    1467 ;            REQUESTED DATA AND THE REMAINING TWO BYTES
                    1468 ;            ARE THE ACTUAL REQUESTED DATA BYTES.
                    1469
                    1470 RDRQST:
0280 C8             1471           DEC     R0
0281 B925           1472           MOV     R1,#RQFNCD  ; LOCATION WHERE 'RQST FUNCTION CODE'
                    1473                               ; IS STORED.
0283 BA03           1474           MOV     R2,#3       ; 3 BYTES TO BE MOVED
0285 F1             1475 RQNEXT:   MOV     A,@R1
0286 90             1476           MOVX    @R0,A
0287 18             1477           INC     R0
0288 19             1478           INC     R1
0289 EA85           1479           DJNZ    R2,RQNEXT
                    1480
028B 83             1481           RET
                    1482
                    1483 ;*** END OF RDRQST ***
                    1484 $EJECT
                    1485
                    1486 ;         NAME            RQCDR
                    1487
                    1488 ;
                    1489 ;
```

```
1490 ;
1491
1492 ;   RQCDR -- REQUEST CODEC DATA REGISTER CONTENTS
1493
1494
1495 RQCDR:
1496 ;   'REQUEST' COMMAND PRELIMINARY OPERATIONS
028C 9440     1497          CALL    RQST
1498
1499 ;   SEND 'READ CODEC DATA REG.' COMMAND TO PER-LINE I.C.'S
028E 23A0     1500          MOV     A,#RDCDR
0290 9400     1501          CALL    XMIT4
1502
1503 ;   ENABLE RESPONSE TRANSMISSION, THEN CONTINUE TO FETCH REQUESTED DATA
0292 14E4     1504          CALL    FRWAIT
1505
1506 ;   FETCH CODEC DATA REGISTER CONTENTS
0294 941C     1507          CALL    RCV8
0296 B926     1508          MOV     R1,#RQBYT1  ; RQBYT1='CODEC DATA REG.' CONTENTS
0298 A1       1509          MOV     @R1,A
0299 19       1510          INC     R1
029A A1       1511          MOV     @R1,A       ; 'RQBYT2' = 'RQBYT1'
1512
1513 ;   RETURN S/H VECTOR ON PORT 1 INPUTS
029B 74E4     1514          CALL    RTNSH
1515
029D 83       1516          RET
1517
1518 ;*** END OF RQCDR ***
1519 $EJECT
1520
1521 ;        NAME             RDCRDS
1522
1523 ;
1524 ;
1525 ;
1526
1527 ;   RDCRDS -- READ LINE CARD STATUS
1528
1529 RDCRDS:
1530 ;   FETCH CURRENT LINE CARD STATUS BYTE FROM DATA MEMORY
1531 ;   AND MOVE INTO RESPONSE REG. BYTE 3
1532
029E B920     1533          MOV     R1,#LNCRDS
02A0 F1       1534          MOV     A,@R1
02A1 90       1535          MOVX    @R0,A
1536
1537 ;   PUT S/H VECTOR INTO RESPONSE REG. BYTE 4
1538
02A2 18       1539          INC     R0
02A3 09       1540          IN      A,P1        ; READ S/H VECTOR
02A4 90       1541          MOVX    @R0,A
1542
02A5 83       1543          RET
1544
1545 ;*** END OF RDCRDS ***
1546 $EJECT
```

```
          1547
          1548 ;     NAME           LINERS
          1549
          1550 ;
          1551 ;
          1552 ;
          1553
          1554 ; LINE -- RESET ALL LINE CIRCUITS ON LINE CARD
          1555
          1556 ; DIGITAL PER-LINE CUSTOM I.C.'S INITIALIZATION VALUES
          1557 ;BIT 7  EVEN BAR/ODD=  0 (EVEN 4 MHZ CHAN.)
          1558 ;BIT 6  EURO SEL=      0 (NON-EUROPEAN FORMAT)
          1559 ;BIT 5  POWER=         0 (LINE CKT. POWERED DOWN)
          1560 ;BIT 4  TR=            1 (TEST RELAY OPEN)
          1561 ;BIT 3  RR=            1 (RING RELAY OPEN)
          1562 ;BIT 2  LC EN=         0 (LINE CKT'S PCM DRIVERS IN HI-Z STATE)
          1563 ;BIT 1  ILS=           0 (ILS NOT SELECTED)
          1564 ;BIT 0  A BAR/B SEL=   0 (DEFAULTS TO 'A' PCM)
          1565
          1566 ; CODEC IS PUT IN 'STANDBY' MODE
          1567
          1568 ; ANALOG PER-LINE CUSTOM I.C.'S INITIALIZATION VALUES
          1569 ;     'CLKC +BAR/-'   IS SET TO 1
          1570 ;     'LINE BAL'      IS SET TO 'STD BAL SETTING' (4H)
          1571 ;     'RX GAIN'       IS SET TO 'STD RX GN SETTING' (20H)
          1572 ;     'TX GAIN'       IS SET TO 'STD TX GAIN SETTING' (20H)
          1573
          1574 LINERS:
          1575 ; WRITE TO DIGITAL PER-LINE CHIPS
02A6 BF00 1576       MOV   R7,#0    ; CLOCK VECTOR FOR ALL LINE CKTS
02A8 2300 1577       MOV   A,#WRDIG ; 'WRITE TO DIGITAL CHIP' CODE
02AA 9400 1578       CALL  XMIT4
02AC 2318 1579       MOV   A,#IDIG  ; INIT DIG. CHIP CONTENTS TO 00011000B
02AE 9406 1580       CALL  XMIT8
          1581
          1582 ; WRITE TO CODECS
02B0 23FF 1583       MOV   A,#ICODEC
02B2 942F 1584       CALL  CODEC    ; PUT CODECS IN 'STANDBY' MODE
          1585
          1586 ; WRITE TO ANALOG PER-LINE CHIP
02B4 2340 1587       MOV   A,#WRANA ; 'WRITE TO ANALOG CHIP' CODE
02B6 9400 1588       CALL  XMIT4
02B8 2304 1589       MOV   A,#IANA1 ; INITIAL 'CLKC' & 'LINE BAL' SETTINGS
02BA 9406 1590       CALL  XMIT8
02BC 2300 1591       MOV   A,#IANA2 ; INITIAL 'RX GAIN SETTING'
02BE 9406 1592       CALL  XMIT8
02C0 2300 1593       MOV   A,#IANA3 ; INITIAL 'TX GAIN SETTING'
02C2 9406 1594       CALL  XMIT8
          1595
          1596 ; RETURN S/H ON PORT 1
02C4 74E4 1597       CALL  RTNSH
02C6 83   1598       RET
          1599 ;*** END OF LINERS ***
          1600 $EJECT
          1601
          1602 ;     NAME           CKBRST
```

```
1603
1604 ;
1605 ;
1606 ;
1607
1608
1609 ;   CKBRST -- PULSES CLOCK LINE 8 TIMES AT MAX. RATE
1610
1611 ;   R7 CONTAINS CLOCK VECTOR UPON ENTRY
1612 ;
1613
1614 CKBRST:
02C7 FF            1615          MOV     A,R7     ; MOVE CLOCK VECTOR INTO A
02C8 39            1616          OUTL    P1,A
02C9 89FF          1617          ORL     P1,#0FFH
02CB 39            1618          OUTL    P1,A
02CC 89FF          1619          ORL     P1,#0FFH
02CE 39            1620          OUTL    P1,A
02CF 89FF          1621          ORL     P1,#0FFH
02D1 39            1622          OUTL    P1,A
02D2 89FF          1623          ORL     P1,#0FFH
02D4 39            1624          OUTL    P1,A
02D5 89FF          1625          ORL     P1,#0FFH
02D7 39            1626          OUTL    P1,A
02D8 89FF          1627          ORL     P1,#0FFH
02DA 39            1628          OUTL    P1,A
02DB 89FF          1629          ORL     P1,#0FFH
02DD 39            1630          OUTL    P1,A
02DE 89FF          1631          ORL     P1,#0FFH
                   1632
02E0 83            1633          RET
                   1634
                   1635 ;*** END OF CKBRST ***
                   1636 $EJECT
                   1637
                   1638 ;       NAME            RGNADD
                   1639
                   1640 ;
                   1641 ;
                   1642 ;
                   1643
                   1644 ;   RGNADD -- LOADS REG. R1 WITH THE ADDRESS OF THE RX GAIN SETTING
                   1645 ;              BYTE FOR THE SELECTED LINE CKT.
                   1646
                   1647 RGNADD:
02E1 FE            1648          MOV     A,R6
02E2 E7            1649          RL      A
02E3 6E            1650          ADD     A,R6         ; 3 * 'LC INDEX'
02E4 0351          1651          ADD     A,#(GNBAL+1) ; ADD BASE ADDR. OF RX GAIN SETTING BYTE
02E6 A9            1652          MOV     R1,A
                   1653
02E7 83            1654          RET
                   1655
                   1656 ;*** END OF RGNADD ***
                   1657 $EJECT
                   1658
```

```
                    1659 ;       NAME          RWPORT
                    1660
                    1661 ;
                    1662 ;
                    1663 ;
                    1664
                    1665 ; RWPORT -- READ/WRITE DATA FROM/TO I/O PORTS 1 & 2
                    1666
                    1667 ; BIT 1 OF FUNCTION CODE BYTE (COMMAND BYTE 2) = R/W BAR PORT 1
                    1668 ;  " 2 "     "    "    "  (   "    "   ") = R/W BAR PORT 2
                    1669
                    1670 RWPORT:
                    1671 ; TEST IF READ OR WRITE OPERATION ON PORT 1
02E8 FD             1672        MOV      A,R5     ; FETCH FUNCTION CODE BYTE
02E9 32ED           1673        JB1      $+4      ; SKIP NEXT TWO INSTRUCTIONS IF READ COMMAND
02EB 80             1674        MOVX     A,@R0    ; FETCH NEW PORT 1 DATA
02EC 39             1675        OUTL     P1,A     ; & WRITE INTO PORT 1
02ED 09             1676        IN       A,P1     ; READ PORT 1
02EE 90             1677        MOVX     @R0,A    ; & RETURN IN RESPONSE BYTE 3
                    1678
                    1679 ; TEST IF READ OR WRITE OPERATION ON PORT 2
02EF 18             1680        INC      R0
02F0 FD             1681        MOV      A,R5
02F1 12F5           1682        JB0      $+4      ; SKIP NEXT TWO INSTRUCTIONS IF READ COMMAND
02F3 80             1683        MOVX     A,@R0    ; FETCH NEW PORT 2 DATA
02F4 3A             1684        OUTL     P2,A     ; & WRITE INTO PORT 2
02F5 0A             1685        IN       A,P2     ; READ PORT 2
02F6 90             1686        MOVX     @R0,A    ; & RETURN IN RESPONSE BYTE 4
                    1687
02F7 83             1688        RET
                    1689
                    1690 ;*** END OF RWPORT ***
                    1691 $EJECT
                    1692
                    1693 ;       NAME          XMIT
                    1694
                    1695 ;
                    1696 ;
                    1697 ;
                    1698
                    1699 ;       XMIT -- TRANSMIT DATA TO LINE CIRCUIT
                    1700
                    1701 ;       ASSUMED CONTENTS OF REGISTERS UPON ENTRY:
                    1702 ;              R7      CLOCK VECTOR(I.E. BIT CORRESPONDING
                    1703 ;                         TO SELECTED LINE CKT IS A LOGIC
                    1704 ;                         '0', ALL OTHER BITS MUST BE '1')
                    1705 ;              A       DATA TO SENT TO LINE CKT. (MSB 1ST)
                    1706 ;              R1      BIT COUNTER: NUMBER OF BITS TO BE SENT
                    1707 ;                         (NORMALLY 1-8)
                    1708
                    1709 ;              R3      HOLDS INTERMEDIATE RESULTS
                    1710 ;              P26     DATA LINE TO LINE CIRCUITS
                    1711 ;              P27     'CMD ENA BAR' LINE TO LINE CIRCUITS
                    1712 ;              P1      PORT 1 IS THE CLOCK/SH VECTOR INTERFACE
                    1713 ;                         TO THE LINE CIRCUITS(BIT 0 GOES
                    1714 ;                         TO LC #1, BIT 1 TO LC #2, ETC.)
```

```
                1715
                1716
0400            1717        ORG     400H
                1718 XMIT4:
0400 B904       1719        MOV     R1,#4
0402 9A7F       1720        ANL     P2,#7FH ; 'CMD ENA BAR' = 0
0404 8408       1721        JMP     XMIT
                1722
0406 B908       1723 XMIT8: MOV     R1,#8
                1724
                1725 XMIT:
0408 AB         1726        MOV     R3,A
0409 F20F       1727        JB7     XMIT1   ; IS '0' OR '1' TO BE SENT NEXT?
040B 9ABF       1728 XMIT0: ANL     P2,#0BFH      ; SET DATA LINE TO 0
040D 8411       1729        JMP     CKPSL
                1730
040F 8A40       1731 XMIT1: ORL     P2,#40H ; SET DATA LINE TO 1
0411 FF         1732 CKPSL: MOV     A,R7    ; LOAD CLOCK VECTOR INTO A
0412 39         1733        OUTL    P1,A    ;    PULSE CLOCK LINE LOW
0413 89FF       1734        ORL     P1,#0FFH;       THEN HIGH
                1735
0415 FB         1736        MOV     A,R3    ; HAVE ALL BITS BEEN TRANSMITTED?
0416 E7         1737        RL      A
0417 E908       1738        DJNZ    R1,XMIT
                1739
0419 8AC0       1740        ORL     P2,#0C0H      ; SET 'CMD ENA BAR' AND 'DATA' TO 1
041B 83         1741        RET
                1742
                1743 ;*** END OF XMIT ***
                1744 $EJECT
                1745
                1746 ;       NAME            RCV
                1747
                1748 ;
                1749 ;
                1750 ;
                1751
                1752 ; RCV -- RECEIVE 1 TO 8 BITS OF DATA FROM THE LINE CIRCUIT
                1753 ;       SPECIFIED BY THE CLOCK VECTOR STORED IN R2 UPON ENTRY.
                1754
                1755 ; ENTRY POINT 'RCV8' RECEIVES 8 BITS OF DATA RETURNED IN 'A' REG
                1756
                1757 RCV8:
041C B908       1758        MOV     R1,#8
                1759 RCV:
041E FF         1760        MOV     A,R7    ; MOVE CLOCK VECTOR INTO A
041F 39         1761        OUTL    P1,A    ; 'CLOCK LINE' = 0
0420 8A         1762        IN      A,P2    ; READ IN NEXT BIT OF DATA
0421 89FF       1763        ORL     P1,#0FFH;'CLOCK LINE' = 1
0423 97         1764        CLR     C       ; CLEAR CARRY FLAG (ASSUME DATA = 0)
0424 37         1765        CPL     A
0425 D228       1766        JB6     RD0     ; SKIP NEXT INSTR. IF 'DATA' = 0
0427 A7         1767 RD1:   CPL     C       ; SET CARRY FLAG (SINCE DATA = 1)
0428 FB         1768 RD0:   MOV     A,R3
0429 F7         1769        RLC     A       ; MOVE NEXT DATA BIT INTO LSB
042A AB         1770        MOV     R3,A    ;    POSITION OF R3
                1771
```

```
042B E91E      1772          DJNZ   R1,RCV   ; HAVE ALL BITS BEEN RECEIVED?
               1773
042D FB        1774          MOV    A,R3     ; LOAD 'A' WITH RECEIVED DATA AND RETURN
               1775                          ;    TO CALLING ROUTINE.
042E 83        1776          RET
               1777
               1778 ;*** END OF RCV ***
               1779 $EJECT
               1780
               1781 ;     NAME          CODEC
               1782
               1783 ;
               1784 ;
               1785 ;
               1786
               1787 ; CODEC -- THE DATA CONTAINED IN THE 'A' REG. UPON ENTRY
               1788 ;          IS TRANSMITTED TO THE SELECTED LINE CIRCUIT'S
               1789 ;          CODEC.
               1790
               1791 ; ASSUMED REG. CONTENTS UPON ENTRY:
               1792 ;     R7=CLOCK VECTOR
               1793 ;     A=CODEC CONTROL DATA
               1794
               1795 CODEC:
042F AC        1796          MOV    R4,A     ; SAVE CODEC CONTROL DATA
0430 2320      1797          MOV    A,#WRCDKC
0432 9400      1798          CALL   XMIT4    ; PUT ANALOG CUSTOM I.C. IN 'WRITE TO CDR' MODE
0434 FC        1799          MOV    A,R4
0435 9406      1800          CALL   XMIT8    ; LOAD DATA INTO CODEC DATA REG.
               1801
0437 2360      1802          MOV    A,#LDCODC
0439 9400      1803          CALL   XMIT4    ; PUT DIG. I.C. IN 'LOAD CODEC' MODE
043B 54C7      1804          CALL   CKBRST   ; LOAD DATA INTO CODEC
               1805
043D 74E4      1806          CALL   RTNSH    ; PUT CUSTOM I.C. IN 'RETURN S/H' MODE
               1807
043F 83        1808          RET
               1809
               1810 ;*** END OF CODEC ***
               1811 $EJECT
               1812
               1813 ;     NAME          RQST
               1814
               1815 ;
               1816 ;
               1817 ;
               1818
               1819 ; RQST -- PERFORM THE PRELIMINARY STUFF THAT'S COMMON TO
               1820 ;          ALL 'RQXXXX' SUBROUTINES.
               1821
               1822 RQST:
               1823 ; ECHO COMMAND BYTE 4 TO SET 'RESPONSE ENABLE' FLIP-FLOP
0440 18        1824          INC    R0
0441 80        1825          MOVX   A,@R0
0442 90        1826          MOVX   @R0,A
               1827
```

```
                1828 ; MOVE FUNCTION CODE BYTE OF REQUEST COMMAND INTO 'RQFNCD'
0443 E925       1829           MOV     R1,#RQFNCD
0445 FD         1830           MOV     A,R5
0446 A1         1831           MOV     @R1,A
                1832
                1833 ; SET 'RQST A BAR/B' TO THE VALUE OF FLAG F1
0447 B920       1834           MOV     R1,#LNCRDS      ; ADDR. OF LINE CARD STATUS BYTE
0449 F1         1835           MOV     A,@R1
044A 7650       1836           JF1     $+6             ; SKIP NEXT 3 INSTRUCTIONS IF 'F1' = 1
                1837
                1838 ; REQUEST COMMAND WAS RECEIVED OVER 'A' PCM HIGHWAY
044C 53FB       1839           ANL     A,#0FBH         ; CLEAR 'RQST A BAR/B' (BIT 2)
044E A1         1840           MOV     @R1,A
044F 83         1841           RET
                1842
                1843 ; REQUEST COMMAND WAS RECEIVED OVER 'B' PCM HIGHWAY
0450 4304       1844           ORL     A,#04H          ; SET 'RQST A BAR/B' (BIT 2)
0452 A1         1845           MOV     @R1,A
0453 83         1846           RET
                1847
                1848 ;*** END OF RQST ***
                1849 $EJECT
                1850
                1851 ;         NAME            DTR
                1852
                1853 ;
                1854 ;
                1855 ;
                1856
                1857 ; DTR -- DISPLAY SELF-TEST RESULTS AND FLASH THE 'BUSY INDICATE'
                1858 ;         LED IF A HARDWARE FAILURE WAS DETECTED
                1859
0454 BA04       1860 DTR:      MOV     R2,#4
0456 B82A       1861           MOV     R0,#TESTR
0458 27         1862           CLR     A
0459 40         1863 DTR2:     ORL     A,@R0           ; READ NEXT 'TEST RESULTS' BYTE
045A 9671       1864           JNZ     BADB            ; JUMP TO BADB IF ANY ERROR WAS DETECTED
045C 18         1865           INC     R0
045D EA59       1866           DJNZ    R2,DTR2         ; REPEAT FOR ALL TEST RESULTS BYTES
                1867
                1868 ; BOARD GOOD -- NO ERRORS WERE DETECTED BY SELF-TEST SOFTWARE
045F F0         1869           MOV     A,@R0           ; READ 'GOOD BOARD' DOWN COUNTER
0460 9663       1870           JNZ     $+3             ; SKIP NEXT INSTR. IF DOWN COUNT NON ZERO
0462 93         1871           RETR
0463 18         1872           INC     R0              ; ADDR. OF 'BLINK COUNTER'
0464 10         1873           INC     @R0             ; INCREMENT 'BLINK COUNTER'
0465 F0         1874           MOV     A,@R0
0466 C66C       1875           JZ      DTR3
0468 F27D       1876           JB7     BLNK1           ; SLOW BLINK FOR A GOOD BOARD
046A 847A       1877           JMP     BLNK0
                1878 DTR3:
                1879 ; IF 'BLINK COUNTER' = 0, THEN DECREMENT 'GOOD BOARD' DOWN COUNTER
046C C8         1880           DEC     R0
046D F0         1881           MOV     A,@R0
046E 07         1882           DEC     A
046F A0         1883           MOV     @R0,A
```

```
0470 93        1884          RETR
               1885
               1886 BADB:
               1887 ; BOARD BAD -- SELF-TEST SOFTWARE DETECTED A HARDWARE MALFUNCTION
0471 B82F      1888          MOV     R0,#BLINKC
0473 10        1889          INC     @R0        ; INCREMENT 'BLINK COUNTER'
0474 F0        1890          MOV     A,@R0
0475 F278      1891          JB7     BLNKX      ; BLINK ONLY HALF THE TIME, DISPLAY 'BUSY' STATUS
0477 93        1892          RETR               ;    THE OTHER HALF.
0478 927D      1893 BLNKX:   JB4     BLNK1      ; FAST BLINK FOR BAD BOARD
               1894
047A 9AEF      1895 BLNK0:   ANL     P2,#0EFH   ; TURN-OFF LED
047C 93        1896          RETR
               1897
047D 8A10      1898 BLNK1:   ORL     P2,#10H    ; TURN-ON LED
047F 93        1899          RETR
               1900 ;*** END OF DTR ***
               1901 $EJECT
               1902
               1903 ;        NAME            LDFXAD
               1904
               1905 ;
               1906 ;
               1907 ;
               1908
               1909 ; LDFXAD -- LOAD LINE CARD'S FIXED ADDRESS INTO CONTROL COMM. I.C.'S
               1910 ;              EXPECTED ADDRESS REG.
               1911
               1912 LDFXAD:
               1913 ; CLEAR 'LOAD BAR' & 'CLK' INPUTS OF 'FIXED ADDRESS' SHIFT REG.
0480 9ADE      1914          ANL     P2,#0DEH
               1915
               1916 ; SET 'LOAD BAR' INPUT OF 'FIXED ADDR.' S/R
0482 8A01      1917          ORL     P2,#01H
               1918
               1919 ; INITIALIZE BIT COUNTER
0484 B808      1920          MOV     R0,#8
               1921
0486 97        1922 LFA1:    CLR     C          ; CLEAR C FLAG
0487 269A      1923          JNT0    $+3
0489 A7        1924          CPL     C          ; SET C IF NEXT BIT=1
               1925
               1926 ; C = NEXT BIT OF FIXED ADDR.
048A F7        1927          RLC     A          ; MOVE NEXT BIT INTO LSB OF ACCUMULATOR
               1928
               1929 ; PULSE CLOCK LINE
048B 8A20      1930          ORL     P2,#20H
048D 9ADF      1931          ANL     P2,#0DFH
               1932
048F E886      1933          DJNZ    R0,LFA1
               1934
0491 B808      1935          MOV     R0,#CFXADD
0493 90        1936          MOVX    @R0,A      ; LOAD 'FIXED ADDRESS' INTO CONTROL COMM. I.C.
               1937
0494 83        1938          RET
               1939
```

```
1940 ;*** END OF LDFXHD ***
1941 $EJECT
1942
1943 ;       NAME            LNTST
1944
1945 ;
1946 ;
1947 ;
1948
1949 ; LNTST — LINE TEST ROUTINE
1950
1951 LNTST:
0495 18            1952            INC     R0
0496 80            1953            MOVX    A,@R0
0497 90            1954            MOVX    @R0,A
0498 14E4          1955            CALL    FRWAIT ; ECHO COMMAND AS RESPONSE
                   1956
                   1957 ; TEST DIGITAL PER-LINE CUSTOM I.C.
049A F400          1958            CALL    DIGICT
                   1959
                   1960 ; TEST ANALOG PER-LINE CUSTOM I.C.
049C F44D          1961            CALL    ANAICT
                   1962
                   1963 ; PERFORM CHECKSUM TEST OF PROGRAM MEMORY
049E 94D8          1964            CALL    ROMT
                   1965
                   1966 ; RETURN S/H DATA ON PORT 1 INPUTS
04A0 74E4          1967            CALL    RTNSH
                   1968
04A2 83            1969            RET
                   1970
                   1971 ;*** END OF LNTST ***
                   1972 $EJECT
                   1973
                   1974 ;       NAME            DELAY
                   1975
                   1976 ;
                   1977 ;
                   1978 ;
                   1979
                   1980 ; DELAY — DELAY SUBROUTINE, THE CONTENTS OF THE 'A' REG. AT ENTRY
                   1981 ;         IS THE DELAY IN MILLISECONDS.
                   1982
                   1983 DELAY:
04A3 AA            1984            MOV     R2,A
04A4 235A          1985            MOV     A,#90   ; 90 @ 4.096 MHZ, 132 @ 6 MHZ,
                   1986                            ; 180 @ 8.192 MHZ, 242 @ 11 MHZ
04A6 07            1987            DEC     A
04A7 96A6          1988            JNZ     $-1
04A9 EAA4          1989            DJNZ    R2,$-5
04AB 83            1990            RET
                   1991
                   1992 ;*** END OF DELAY ***
                   1993 $EJECT
                   1994
                   1995 ;       NAME            RSDHS
```

```
                1996
                1997 ;
                1998 ;
                1999 ;
                2000
                2001 ; RSDHS — RESET 'DELTA HOOK STATUS' BIT OF THE SPECIFIED LINE CKT.
                2002
                2003 RSDHS:
                2004 ; ECHO COMMAND BYTE 4 TO SET 'RESPONSE ENA' FF
04AC 18         2005         INC     R0
04AD 80         2006         MOVX    A,@R0
04AE 90         2007         MOVX    @R0,A
                2008
                2009 ; CLEAR SELECTED LINE CIRCUIT'S 'DELTA H/S' BIT
04AF B922       2010         MOV     R1,#DLTAHS
04B1 F1         2011         MOV     A,@R1
04B2 5F         2012         ANL     A,R7     ; CLEAR BIT OF 'DLTAHS' CORRESPONDING TO
04B3 A1         2013         MOV     @R1,A    ;   SPECIFIED LINE CKT.
04B4 96BC       2014         JNZ     RSDHS1
                2015
                2016 ; ALL 'DLTAHS' BITS ARE ZERO, CLEAR "OR'D DELTA H/S" BIT OF 'LNCRDS'
04B6 B920       2017         MOV     R1,#LNCRDS
04B8 F1         2018         MOV     A,@R1
04B9 53FE       2019         ANL     A,#0FEH
04BB A1         2020         MOV     @R1,A
                2021
04BC 83         2022 RSDHS1: RET
                2023
                2024 ; *** END OF RSDHS ***
                2025 $EJECT
                2026
                2027 ;        NAME            SMPTX4
                2028
                2029 ;
                2030 ;
                2031 ;
                2032
                2033 ; SMPTX4 — SAMPLES TX PCM CHANNEL 4 AND COUNTS THE NUMBER OF OCCURRANCES
                2034 ;          OF THE PCM VALUE CORRESPONDING TO THE ABSOLUTE PEAK AMPLITUDE
                2035 ;          OF THE SIGNAL ON CHAN. 4.  THE NUMBER OF SAMPLES TAKEN IS
                2036 ;          SPECIFIED IN COMMAND BYTE 3 (THE MIN. NUMBER OF SAMPLES IS 1,
                2037 ;          THE MAX. IS 256 (0).)
                2038
                2039 SMPTX4:
04BD 9440       2040         CALL    RUST
04BF C8         2041         DEC     R0
04C0 80         2042         MOVX    A,@R0    ; FETCH NO. OF SAMPLES TO BE EXAMINED
04C1 AA         2043         MOV     R2,A
                2044
                2045 ; WAIT FOR RESPONSE FRAME, RETURN RESPONSE, THEN CONTINUE
04C2 14E4       2046         CALL    FRWAIT
                2047
                2048 ; SAMPLE TX CHAN. 4 (R2) TIMES
04C4 84C7       2049         CALL    FPL      ; TAKE THE NUMBER OF SAMPLES SPECIFIED IN R2
                2050                          ; (ABSOLUTE PEAK PCM VALUE RETURNED IN R4,
                2051                          ;  NUMBER OF OCCURANCES IS RETURNED IN R3)
```

```
                2052
                2053 ; PUT PEAK VALUE & NO. OF OCCURANCES IN REQUESTED DATA BYTES
04C6 B926       2054        MOV     R1,#RQBYT1
04C8 FC         2055        MOV     A,R4
04C9 A1         2056        MOV     @R1,A   ; FETCH PEAK VALUE AND PUT IN 'RQBYT1'
04CA 19         2057        INC     R1
04CB FB         2058        MOV     A,R3
04CC A1         2059        MOV     @R1,A   ; FETCH NO. OF OCCURANCES AND PUT IN 'RQBYT2'
                2060
                2061 ; JUMP INTO GNADJ SUBROUTINE TO FINISH UP
04CD A4B2       2062        JMP     ENDADJ
                2063
                2064 ;*** END OF SMPTX4 ***
                2065 $EJECT
                2066
                2067 ;       NAME            RDROM
                2068
                2069 ;
                2070 ;
                2071 ;
                2072
                2073 ; RDROM -- READ BYTE OF PROGRAM MEMORY SPECIFIED BY BITS (2-0) OF FUNCTION
                2074 ;         CODE BYTE AND BITS (7-0) OF COMMAND BYTE 3 TO FORM AN
                2075 ;         ELEVEN-BIT ADDRESS (FUNCTION CODE BITS (2-0) ARE MOST SIGNIFICANT)
                2076
                2077 RDROM:
04CF FE         2078        MOV     A,R6
04D0 AA         2079        MOV     R2,A    ; PAGE SELECT
04D1 80         2080        MOVX    A,@R0
04D2 AB         2081        MOV     R3,A    ; BYTE SELECT
04D3 18         2082        INC     R0
04D4 F4DD       2083        CALL    GETROM
04D6 90         2084        MOVX    @R0,A   ; PUT FETCHED DATA IN RESPONSE REG. BYTE 4
04D7 83         2085        RET
                2086
                2087 ;*** END OF RDROM ***
                2088 $EJECT
                2089
                2090 ;       NAME            ROMT
                2091
                2092 ;
                2093 ;
                2094 ;
                2095
                2096 ; ROMT -- CHECKSUM TEST OF PROGRAM MEMORY
                2097
                2098 ROMT:
                2099 ; CLEAR 'ROM TEST FAILED' FLAG
04D8 B92A       2100        MOV     R1,#TESTR
04DA F1         2101        MOV     A,@R1
04DB 53FD       2102        ANL     A,#0FDH
04DD A1         2103        MOV     @R1,A
                2104
                2105 ; INITIALIZE CHECKSUM BYTE AND ADDRESS POINTERS
04DE BC00       2106        MOV     R4,#0   ; CHECKSUM BYTE
04E0 BB00       2107        MOV     R3,#0   ; BYTE POINTER
```

```
04E2 BA08      2108           MOV    R2,#8    ; PAGE POINTER
               2109
               2110 ; SUM ALL BYTES OF PROGRAM MEMORY
04E4 F4DD      2111           CALL   GETROM
04E6 6C        2112           ADD    A,R4
04E7 AC        2113           MOV    R4,A
04E8 EBE4      2114           DJNZ   R3,$-4   ; HAVE ALL BYTES OF THIS PAGE BEEN SUMMED?
04EA EAE4      2115           DJNZ   R2,$-6   ; HAVE ALL PAGES BEEN SUMMED?
               2116
               2117 ; TEST CHECK SUM FOR ZERO
04EC 96EF      2118           JNZ    ROMF     ; TEST FAILS IF CHECKSUM NOT ZERO
04EE 83        2119           RET
               2120
               2121 ROMF:
               2122 ; CHECKSUM NOT ZERO----SET 'ROM TEST FAILED' FLAG
04EF F1        2123           MOV    A,@R1
04F0 4302      2124           ORL    A,#2
04F2 A1        2125           MOV    @R1,A
04F3 83        2126           RET
               2127
               2128 ;*** END OF ROMT ***
               2129 $EJECT
               2130
               2131 ;      NAME            RGNADJ
               2132
               2133 ;
               2134 ;
               2135 ;
               2136
               2137 ; RGNADJ -- RX GAIN AUTO-ADJUST ROUTINE
               2138
0500           2139           ORG    500H
               2140 RGNADJ:
               2141 ; SET FLAG F0 (RX GAIN ADJ. OPERATION)
0500 85        2142           CLR    F0
0501 95        2143           CPL    F0
               2144
               2145 ; SAVE 2ND LINE CIRCUIT'S 'INDEX' IN TEMP1
0502 B96B      2146           MOV    R1,#TEMP1
0504 80        2147           MOVX   A,@R0
0505 5307      2148           ANL    A,#7
0507 A1        2149           MOV    @R1,A
               2150
               2151 ; ECHO COMMAND BYTE 4 TO SET 'RESPONSE ENA' FF
0508 18        2152           INC    R0
0509 80        2153           MOVX   A,@R0
050A 90        2154           MOVX   @R0,A
               2155
               2156 ; WAIT FOR RESPONSE FRAME
050B 14E4      2157           CALL   FRWAIT
               2158
               2159 ; ARE 2ND LINE CKT'S 'INDEX' & SELECTED LINT CKT'S 'INDEX' EQUAL?
050D B96B      2160           MOV    R1,#TEMP1
050F F1        2161           MOV    A,@R1
0510 DE        2162           XRL    A,R6
0511 9614      2163           JNZ    RGA1
```

```
                    2164
                    2165 ; INDICES ARE EQUAL-----TEST CANNOT BE PERFORMED
0513 83             2166         RET
                    2167
                    2168 RGA1:
                    2169 ; PULL-IN 'TEST RELAY', ETC. FOR SELECTED LINE CKT.
                    2170 ; EVEN BAR/ODD = 1, EURO SEL = 0, POWER = 1, TR BAR = 0,
                    2171 ; RR BAR = 1, LC ENA = 0, ILS = 0, A BAR/B PCM SEL = 0
0514 BAA8           2172         MOV     R2,#0A8H
0516 3431           2173         CALL    LDDIG   ; LOAD DIGITAL I.C. & RETURN WITH LINE CKT. IN
                    2174                         ;  'RETURN S/H' MODE
                    2175
                    2176 $EJECT
                    2177 ; PULL-IN 'TEST RELAY', ETC. FOR 2ND LINE CKT.
0518 B96B           2178         MOV     R1,#TEMP1
051A 2E             2179         XCH     A,R6
051B 21             2180         XCH     A,@R1
051C AE             2181         MOV     R6,A
051D 23EF           2182         MOV     A,#(CLKVCT-(100H*(CLKVCT/100H)))
051F 6E             2183         ADD     A,R6
0520 E3             2184         MOVP3   A,@A    ; TABLE LOOK-UP 2ND LINE CKT'S 'CLK VECTOR'
0521 AF             2185         MOV     R7,A
                    2186
                    2187 ; EVEN BAR/ODD = 0, EURO SEL = 0, POWER = 1, TR BAR = 0, RR BAR = 1,
                    2188 ; LC ENA = 1, ILS = 0, A BAR/B PCM SEL = 0
0522 BA2C           2189         MOV     R2,#2CH
0524 3431           2190         CALL    LDDIG   ; LOAD DIGITAL I.C. & RETURN WITH LINE CIRCUIT
                    2191                         ;  IN 'RETURN S/H' MODE
                    2192
                    2193 ; ASSIGN 2ND LINE CKT'S TX & RX CHANNELS
0526 2340           2194         MOV     A,#40H  ; TX PCM CH. 4 ===> CODEC TX CH. 0
0528 942F           2195         CALL    CODEC
052A 238A           2196         MOV     A,#8AH  ; RX PCM NOT USED ===> CODEC RX CH. 0AH
052C 942F           2197         CALL    CODEC   ; CODEC SUBROUTINE RETURNS WITH LINE CKT.
                    2198                         ;  IN 'RETURN S/H' MODE
                    2199
                    2200 ; ASSIGN SELECTED LINE CKT'S TX & RX CHANNELS
052E B96B           2201         MOV     R1,#TEMP1
0530 2E             2202         XCH     A,R6
0531 21             2203         XCH     A,@R1
0532 AE             2204         MOV     R6,A
0533 23EF           2205         MOV     A,#(CLKVCT-(100H*(CLKVCT/100H)))
0535 6E             2206         ADD     A,R6
0536 E3             2207         MOVP3   A,@A    ; TABLE LOOK-UP SELECTED LINE CKT'S 'CLK VECT'
0537 AF             2208         MOV     R7,A
                    2209
0538 2340           2210         MOV     A,#40H  ; NOT INTERESTED IN SELECTED LINE CKT'S TX PCM
053A 942F           2211         CALL    CODEC
053C 2389           2212         MOV     A,#89H  ; RECEIVE 'DIGITAL MILLIWATT' ON RX PCM CH. 9
053E 942F           2213         CALL    CODEC
                    2214
0540 A454           2215         JMP     GNADJ
                    2216
                    2217 ; *** END OF RGNADJ ***
                    2218 $EJECT
```

```
                2219
                2220 ;          NAME            TGNADJ
                2221
                2222 ;
                2223 ;
                2224 ;
                2225
                2226 ; TGNADJ -- TX GAIN AUTO-ADJUST ROUTINE
                2227
                2228 TGNADJ:
                2229 ; CLEAR FLAG F0 (TX GAIN ADJ. OPERATION)
0542  85        2230          CLR     F0
                2231
                2232 ; ECHO COMMAND BYTE 4 TO SET 'RESPONSE ENA' FF
0543  18        2233          INC     R0
0544  80        2234          MOVX    A,@R0
0545  90        2235          MOVX    @R0,A
                2236
                2237 ; WAIT FOR RESPONSE FRAME
0546  14E4      2238          CALL    FRWAIT
                2239
                2240 ; PULL-IN 'TEST RELAY', ETC.
                2241 ; EVEN BAR/ODD = 0, EURO SEL = 0, POWER = 1, TR BAR = 0,
                2242 ; RR BAR = 1, LC ENA = 1, ILS = 0, A BAR/B PCM SEL = 0
0548  BA2C      2243          MOV     R2,#2CH
054A  3431      2244          CALL    LDDIG
                2245
                2246 ; ASSIGN TX & RX CHANNELS
054C  2340      2247          MOV     A,#40H ; TX PCM CH. 4 ===> CODEC TX CH. 0
054E  942F      2248          CALL    CODEC
0550  233A      2249          MOV     A,#03AH ; RX PCM NOT NEEDED FOR TEST
0552  942F      2250          CALL    CODEC  ; CODEC SUBROUTINE RETURNS WITH LINE CIRCUIT
                2251                         ;   IN 'RETURN S/H' MODE
                2252
                2253 ; ENTER 'GNADJ'
                2254
                2255 ;*** END OF TGNADJ ***
                2256 $EJECT
                2257
                2258 ;          NAME            GNADJ
                2259
                2260 ;
                2261 ;
                2262 ;
                2263
                2264 ; GNADJ -- GAIN AUTO-ADJUST ROUTINE (CONTINUATION OF RGNADJ & TGNADJ)
                2265
                2266 GNADJ:
                2267 ; WAIT FOR RELAY CONTACT BOUNCE TO STOP.
0554  B868      2268          MOV     R0,#RELAYD
0556  F0        2269          MOV     A,@R0  ; GET RELAY DEBOUNCE DELAY VALUE
0557  94A3      2270          CALL    DELAY
                2271
                2272 ; INITIALIZE SELECTED LINE CKT'S GAIN SETTING (TX GAIN IF F0=0,
                2273 ;   RX GAIN IF F0=1)
0559  54E1      2274          CALL    RGNADD
```

```
055B B65E      2275          JF0     $+3        ; SKIP NEXT INSTR. IF RX GAIN ADJ.
055D C9        2276          DEC     R1         ; ADJUST R1 TO POINT TO 'TX GAIN' BYTE
055E B100      2277          MOV     @R1,#0
0560 3492      2278          CALL    LDGAIN     ; LOAD GAIN SETTING INTO ANALOG I.C.
               2279
               2280 GETPK:
               2281 ; WAIT FOR TEST SIGNAL TO STABILIZE AFTER GAIN CHANGE
0562 B869      2282          MOV     R0,#GNDEL
0564 F0        2283          MOV     A,@R0      ; GET GAIN ADJUST DELAY VALUE
0565 94A3      2284          CALL    DELAY
               2285
               2286 ; FIND PEAK PCM LEVEL (RETURNS 'PEAK LEVEL' IN R4, 'PEAK COUNT' IN R3)
0567 84C7      2287          CALL    FPL
               2288
               2289 ; IS 'PEAK LEVEL' < 8 (GAIN TOO HIGH) ?
0569 FC        2290          MOV     A,R4
056A 03F8      2291          ADD     A,#0F8H    ; ADD 2'S COMPLEMENT OF 8 TO 'PEAK LEVEL' VALUE
               2292                             ; CARRY FLAG WILL BE SET IF 'PEAK LEVEL')=8
056C E690      2293          JNC     GNERR1     ; GAIN TOO HIGH----HARDWARE ERROR
056E 9681      2294          JNZ     GNLO
               2295
               2296 ; 'PEAK LEVEL' VALUE = 8 OR 9
               2297 ; IS 'PEAK COUNT' < 9 (GAIN TOO LOW) ?
0570 FB        2298          MOV     A,R3
0571 03F7      2299          ADD     A,#0F7H    ; ADD 2'S COMPLEMENT OF 9 TO 'PEAK COUNT'
               2300                             ; CARRY FLAG WILL BE SET IF 'PEAK COUNT'<9
0573 E681      2301          JNC     GNLO
               2302
               2303 ; IS 'PEAK COUNT' >= 16 (GAIN TOO HIGH) ?
0575 FB        2304          MOV     A,R3
0576 03F0      2305          ADD     A,#0F0H    ; ADD 2'S COMPL. OF 16 TO 'PEAK COUNT'
0578 F690      2306          JC      GNERR1     ; IF CARRY FLAG SET, 'PEAK COUNT')=16 WHICH
               2307                             ; MEANS THAT GAIN CANNOT BE ADJUSTED WITHIN
               2308                             ; THE REQUIRED BAND----HARDWARE ERROR
               2309
               2310 $EJECT
               2311 ; GAIN IS SET WITHIN TOLERANCE----CLEAR 'ANALOG I.C. FAILED' BIT OF 'TESTRA'
057A B92D      2312          MOV     R1,#TESTRA
057C F1        2313          MOV     A,@R1
057D 5F        2314          ANL     A,R7
057E A1        2315          MOV     @R1,A
057F A4A2      2316          JMP     GNADJ1
               2317
               2318 GNLO:
               2319 ; GAIN SETTING TOO LOW----INCREMENT PRESENT SETTING BY ONE
0581 54E1      2320          CALL    RGNADD
0583 B686      2321          JF0     $+3        ; SKIP NEXT INSTR. IF RX GAIN ADJ.
0585 C9        2322          DEC     R1
0586 F1        2323          MOV     A,@R1
0587 D31F      2324          XRL     A,#1FH     ; IS GAIN ALREADY AT MAX. VALUE?
0589 C69C      2325          JZ      GNERR2     ; IF ALREADY AT MAX. GAIN SETTING, THEN
               2326                             ; MAX. GAIN TOO LOW----HARDWARE ERROR
058B 11        2327          INC     @R1        ; INCREMENT 'GAIN' BYTE IN MEMORY
058C 3492      2328          CALL    LDGAIN     ; LOAD NEW GAIN SETTING INTO ANALOG I.C.
058E A462      2329          JMP     GETPK
               2330
```

```
              2331 GNERR1:
              2332 ; DECREMENT GAIN SETTING BY ONE (IF NOT AT MIN.)
0590 54E1     2333        CALL    RGNADD
0592 B695     2334        JF0     $+3       ; SKIP NEXT INSTR. IF RX GAIN ADJ.
0594 C9       2335        DEC     R1
0595 F1       2336        MOV     A,@R1
0596 C69C     2337        JZ      GNERR2    ; CHECK IF ALREADY ZERO
0598 07       2338        DEC     A
0599 A1       2339        MOV     @R1,A
059A 3492     2340        CALL    LDGAIN
              2341
              2342 GNERR2:
              2343 ; SET 'FAILED TEST' BIT OF 'TESTRA' FOR SELECTED LINE CKT.
059C B92D     2344        MOV     R1,#TESTRA
059E FF       2345        MOV     A,R7
059F 37       2346        CPL     A
05A0 41       2347        ORL     A,@R1
05A1 A1       2348        MOV     @R1,A
              2349
              2350 GNADJ1:
              2351 ; PUT CODEC IN 'STANDBY' MODE
05A2 23FF     2352        MOV     A,#0FFH
05A4 942F     2353        CALL    CODEC
              2354
              2355 ; RELEASE 'TEST RELAY', ETC.
05A6 2330     2356        MOV     A,#LCST1
05A8 6E       2357        ADD     A,R6
05A9 A9       2358        MOV     R1,A
05AA B118     2359        MOV     @R1,#IDIG
05AC BA18     2360        MOV     R2,#IDIG
05AE 3431     2361        CALL    LDDIG
              2362 $EJECT
              2363 ; REPEAT FOR 2ND LINE CKT. IF RX GAIN ADJ.
05B0 B6BA     2364        JF0     GNADJ2
              2365
              2366 ENDADJ:
              2367 ; RESET FRAME COUNTER TO INITIALIZATION VALUE
05B2 65       2368        STOP    TCNT
05B3 2318     2369        MOV     A,#18H
05B5 62       2370        MOV     T,A
05B6 45       2371        STRT    CNT
05B7 16BA     2372        JTF     $+3       ; RESET TIMER FLAG
05B9 83       2373        RET
              2374
              2375 GNADJ2:
              2376 ; PUT 2ND LINE CKT'S 'INDEX' & 'CLOCK VECTOR' INTO THE SELECTED
              2377 ;   LINE CIRCUIT'S 'INDEX' & 'CLOCK VECTOR' REGISTERS.
05BA 85       2378        CLR     F0
05BB B96B     2379        MOV     R1,#TEMP1
05BD 2E       2380        XCH     A,R6
05BE 21       2381        XCH     A,@R1
05BF AE       2382        MOV     R6,A      ; 2ND LINE CKT'S 'INDEX' IN R6
05C0 23EF     2383        MOV     A,#(CLKVCT-(100H*(CLKVCT/100H)))
05C2 6E       2384        ADD     A,R6
05C3 E3       2385        MOVP3   A,@A
05C4 AF       2386        MOV     R7,A      ; 2ND LINE CKT'S 'CLOCK VECTOR' IN R7
```

```
05C5 A4A2          2387              JMP       GNADJ1
                   2388
                   2389 ;*** END OF GNADJ ***
                   2390 $EJECT
                   2391
                   2392 ;         NAME          FPL
                   2393
                   2394 ;
                   2395 ;
                   2396 ;
                   2397
                   2398 ; FPL -- FIND PEAK PCM LEVEL SUBROUTINE
                   2399
                   2400 FPL:
05C7 BA7D          2401              MOV       R2,#125     ; INITIALIZE SAMPLE COUNTER
05C9 B809          2402              MOV       R0,#9       ; ADDR. OF PCM SAMPLING REG.
05CB BB00          2403              MOV       R3,#0       ; INITIALIZE PEAK COUNTER
05CD BC7F          2404              MOV       R4,#7FH     ; INITIALIZE PEAK LEVEL BYTE
                   2405
05CF 45            2406              STRT      CNT
05D0 42            2407              MOV       A,T
05D1 37            2408              CPL       A
05D2 07            2409              DEC       A           ; 2'S COMPL. OF STARTING FRAME COUNT
05D3 A9            2410              MOV       R1,A
                   2411
05D4 42            2412 NXTSMP:      MOV       A,T
05D5 69            2413              ADD       A,R1
05D6 96D4          2414              JNZ       NXTSMP      ; WAIT UNTIL NEXT SAMPLE'S FRAME BEGINS
05D8 00            2415              NOP
05D9 00            2416              NOP                   ; WILL WORK AS-IS UP TO 8.192 MHZ
05DA 00            2417              NOP                   ; TWO MORE NO-OP'S ARE NEEDED FOR RELIABLE
                   2418                                    ;   OPERATION AT 11 MHZ
05DB 80            2419              MOVX      A,@R0       ; FETCH NEXT PCM SAMPLE
05DC C9            2420              DEC       R1
05DD 537E          2421              ANL       A,#7EH      ; MASK OFF SIGN BIT & LSB
05DF AD            2422              MOV       R5,A        ; TEMP SAVE IN R5
                   2423
05E0 37            2424              CPL       A
05E1 17            2425              INC       A           ; 2'S COMPL. OF SAMPLE
05E2 6C            2426              ADD       A,R4        ; CARRY SET IF SAMPLE <= CURRENT PEAK VALUE
05E3 E6E8          2427              JNC       NOPEAK
05E5 96EB          2428              JNZ       NEWPK
05E7 1B            2429              INC       R3          ; SAMPLE=CURRENT PEAK VALUE, INCREMENT PEAK CNT.
05E8 EAD4          2430 NOPEAK:      DJNZ      R2,NXTSMP   ; ANY MORE SAMPLES?
05EA 83            2431              RET
                   2432
05EB FD            2433 NEWPK:       MOV       A,R5
05EC AC            2434              MOV       R4,A        ; SAMPLE VALUE BECOMES NEW PEAK VALUE
05ED BB01          2435              MOV       R3,#1       ; RESET PEAK COUNTER
05EF EAD4          2436              DJNZ      R2,NXTSMP   ; ANY MORE SAMPLES?
05F1 83            2437              RET
                   2438
                   2439 ;*** END OF FPL ***
                   2440 $EJECT
                   2441
                   2442 ;         NAME          SLFTST
```

```
                2443
                2444 ;
                2445 ;
                2446 ;
                2447
                2448 ; SLFTST -- LINE CARD SELF-TEST ROUTINE
                2449
0600            2450            ORG      600H
                2451 SLFTST:
                2452 ; CHECK DATA MEMORY
0600 E48A       2453            JMP      RAMT
                2454 RAMRET:
                2455 ; INITIALIZE TEST RESULTS BYTES
0602 B82D       2456            MOV      R0,#TESTR+3
0604 B903       2457            MOV      R1,#3
0606 B000       2458            MOV      @R0,#0
0608 C8         2459            DEC      R0
0609 E906       2460            DJNZ     R1,$-3
                2461
                2462 ; CHECK PROGRAM MEMORY
060B 9408       2463            CALL     ROMT
                2464
                2465 ; CHECK PER-CARD CUSTOM CONTROL COMMUNICATIONS I.C.
060D D424       2466            CALL     COMICT
                2467
                2468 ; CHECK DIGITAL & ANALOG PER-LINE CUSTOM I.C.'S
060F 7445       2469            CALL     RAMRS
                2470 ;##################################################################
0611 BE02       2471            MOV      R6,#2      ;
0613 BFFD       2472            MOV      R7,#0FDH   ;
                2473 ;##################################################################
0615 CE         2474 ST1:       DEC      R6         ; NEXT LINE CKT. TO BE TESTED
0616 F400       2475            CALL     DIGICT     ; TEST DIGITAL PER-LINE CUSTOM I.C.
0618 F44D       2476            CALL     ANAICT     ; TEST ANALOG PER-LINE CUSTOM I.C.
061A FF         2477            MOV      A,R7
061B 77         2478            RR       A
061C AF         2479            MOV      R7,A       ; NEXT LINE CKT'S CLOCK VECTOR
061D FE         2480            MOV      A,R6
061E 9615       2481            JNZ      ST1        ; HAVE ALL LINE CKTS. BEEN TESTED?
                2482
                2483 ; RETURN S/H ON PORT 1
0620 74E4       2484            CALL     RTNSH
                2485
                2486 ; RETURN TO POWER-ON RESET SEQUENCE
0622 6413       2487            JMP      STRET      ; SELF TEST ROUTINE'S RETURN ADDRESS
                2488
                2489 ;*** END OF SLFTST ***
                2490 $EJECT
                2491
                2492 ;          NAME     COMICT
                2493
                2494 ;
                2495 ;
                2496 ;
                2497
                2498 ; COMICT -- TEST ROUTINE FOR THE PER-CARD CUSTOM CONTROL
```

```
                        2499 ;               COMMUNICATIONS I.C.
                        2500
                        2501 COMICT:
8624 15                 2502          DIS     I
                        2503
                        2504 ; RESET 'COM I.C. FAILED' BIT OF TESTR
8625 B92A               2505          MOV     R1,#TESTR
8627 F1                 2506          MOV     A,@R1
8628 53FB               2507          ANL     A,#0FBH
862A A1                 2508          MOV     @R1,A
                        2509
                        2510 ; CHECK OPERATION OF MODE REGISTER (WALKING 1/0 TEST)
                        2511 ;   WALKING 1'S TEST
862B B980               2512          MOV     R1,#CMODE
862D BC00               2513          MOV     R4,#0    ; INITIALIZE TEST DATA BYTE
862F BA08               2514          MOV     R2,#8    ; INITIALIZE TEST COUNTER
                        2515 WALK1:
8631 FC                 2516          MOV     A,R4
8632 91                 2517          MOVX    @R1,A
8633 81                 2518          MOVX    A,@R1    ; WRITE THEN READ BACK NEXT TEST BYTE
8634 DC                 2519          XRL     A,R4     ; COMPARE WITH EXPECTED DATA
8635 96C7               2520          JNZ     CFAIL
8637 FC                 2521          MOV     A,R4
8638 97                 2522          CLR     C
8639 A7                 2523          CPL     C        ; SET C
863A F7                 2524          RLC     A
863B AC                 2525          MOV     R4,A     ; PUT NEXT TEST DATA BYTE INTO R4
863C EA31               2526          DJNZ    R2,WALK1
                        2527
                        2528 ;   WALKING 0'S TEST
863E BA08               2529          MOV     R2,#8
                        2530 WALK0:
8640 FC                 2531          MOV     A,R4
8641 91                 2532          MOVX    @R1,A
8642 81                 2533          MOVX    A,@R1
8643 DC                 2534          XRL     A,R4     ; COMPARE WITH EXPECTED DATA
8644 96C7               2535          JNZ     CFAIL
8646 FC                 2536          MOV     A,R4
8647 97                 2537          CLR     C        ; CLEAR C
8648 F7                 2538          RLC     A
8649 AC                 2539          MOV     R4,A
864A EA40               2540          DJNZ    R2,WALK0
                        2541
                        2542 $EJECT
                        2543
                        2544 ; SET UP MODE CONTROL REG. FOR TEST
864C 2383               2545          MOV     A,#083H  ; 'A' SHIFT REG. FEEDBACK SELECTED
864E 91                 2546          MOVX    @R1,A
                        2547
                        2548 ; SET UP TEST DATA IN REGS 2,3,4,&5
864F BD63               2549          MOV     R5,#63H     ; BYTE 1
8651 BCC1               2550          MOV     R4,#0C1H    ; BYTE 2
8653 BBF8               2551          MOV     R3,#0F8H    ; BYTE 3
8655 BA0F               2552          MOV     R2,#0FH     ; BYTE 4
                        2553
                        2554 ; LOAD S/R'S WITH TEST DATA AND VERIFY
```

```
0657 BE02      2555            MOV     R6,#2
0659 B80E      2556            MOV     R0,#0EH
065B 27        2557            CLR     A
065C 90        2558 COM00:     MOVX    @R0,A
065D 18        2559            INC     R0
065E B905      2560            MOV     R1,#5       ; INIT. TEST DATA POINTER
0660 BF04      2561            MOV     R7,#4       ; INIT. BYTE COUNTER
               2562 COM01:
0662 F1        2563            MOV     A,@R1
0663 37        2564            CPL     A           ; INVERT TEST DATA
0664 90        2565            MOVX    @R0,A       ; & WRITE INTO S/R
0665 C9        2566            DEC     R1
0666 EF62      2567            DJNZ    R7,COM01
               2568
               2569 ;   LOAD OTHER S/R WITH TEST DATA
0668 B905      2570            MOV     R1,#5
066A BF04      2571            MOV     R7,#4
               2572 COM02:
066C F1        2573            MOV     A,@R1
066D 90        2574            MOVX    @R0,A       ; WRITE TEST DATA INTO S/R
066E C9        2575            DEC     R1
066F EF6C      2576            DJNZ    R7,COM02
               2577
               2578 ;   VERIFY INVERTED TEST DATA IN S/R
0671 B905      2579            MOV     R1,#5
0673 BF04      2580            MOV     R7,#4
               2581 COM03:
0675 80        2582            MOVX    A,@R0       ; FETCH NEXT BYTE FROM S/R
0676 37        2583            CPL     A           ; & INVERT
0677 D1        2584            XRL     A,@R1       ; COMPARE WITH EXPECTED DATA
0678 96C7      2585            JNZ     CFAIL
067A C9        2586            DEC     R1
067B EF75      2587            DJNZ    R7,COM03
               2588
               2589 $EJECT
               2590 ;   VERIFY DATA IN OTHER S/R
067D B905      2591            MOV     R1,#5
067F BF04      2592            MOV     R7,#4
               2593 COM04:
0681 80        2594            MOVX    A,@R0       ; FETCH NEXT BYTE FROM S/R
0682 D1        2595            XRL     A,@R1       ; & COMPARE WITH EXPECTED DATA
0683 96C7      2596            JNZ     CFAIL
0685 C9        2597            DEC     R1
0686 EF81      2598            DJNZ    R7,COM04
               2599
               2600 ;   REPEAT ONLY INVERTING THE DATA WRITTEN EACH S/R
0688 B80E      2601            MOV     R0,#0EH
068A 2304      2602            MOV     A,#4
068C 90        2603            MOVX    @R0,A
068D EE5C      2604            DJNZ    R6,COM00
               2605
               2606 ;   LOAD 'FIXED ADDRESS' REGISTER
068F B808      2607            MOV     R0,#CFXADD
0691 FB        2608            MOV     A,R3
0692 90        2609            MOVX    @R0,A
               2610
```

```
                2611 ; INITIALIZE FRAME COUNTER FOR TEST
0693 65         2612           STOP    TCNT
0694 23F6       2613           MOV     A,#0F6H ; (-10 DECIMAL)
0696 62         2614           MOV     T,A
0697 1699       2615           JTF     $+2     ; RESETS 'TIMER FLAG'
0699 B908       2616           MOV     R1,#8
069B 45         2617           STRT    CNT
                2618
                2619 ; BEGIN TEST OF THE DYNAMIC OPERATION OF THE I.C.
069C 1409       2620           CALL    CNTLE1  ; SYNCHRONIZES SOFTWARE TO FRAME CLOCK, THEN
                2621                           ;   ENABLES CONTROL S/R SHIFTING
069E B900       2622           MOV     R0,#CMODE
06A0 B90C       2623           MOV     R1,#CSTS
                2624
                2625 ; WAIT UNTIL FRAME COUNTER OVERFLOWS
06A2 16A6       2626 LC005:    JTF     CCNT    ; EXIT LOOP IF TERMINAL COUNT IS REACHED
06A4 C4A2       2627           JMP     LC005   ; REPEAT LOOP
                2628
06A6 81         2629 CCNT:     MOVX    A,@R1
06A7 92A6       2630           JB4     CCNT    ; LOOP UNTIL 'CNTRL WINDOW' = 0
06A9 65         2631           STOP    TCNT    ; HALT FRAME COUNTER
06AA 27         2632           CLR     A       ;     &
06AB 90         2633           MOVX    @R0,A   ;   SHIFTING
                2634
                2635 $EJECT
                2636 ; VERIFY THAT BOTH ADDR. MATCH FLAGS ARE SET AND THAT THE FRAME
                2637 ;   COUNT IS CORRECT.
06AC 81         2638           MOVX    A,@R1
06AD 37         2639           CPL     A
06AE 12C7       2640           JB0     CFAIL   ; TEST 'A' ADDR. MATCH FLAG
06B0 32C7       2641           JB1     CFAIL   ;  "   'B'   "      "    "
                2642
                2643 ; LOAD EXPECTED DATA INTO REGS. R5, R4, R3, & R2
06B2 BDF8       2644           MOV     R5,#0F8H
06B4 BC0F       2645           MOV     R4,#0FH
06B6 BB63       2646           MOV     R3,#63H
06B8 BAC1       2647           MOV     R2,#0C1H
                2648
                2649 ; VERIFY THE CONTENTS OF BOTH SHIFT REGISTERS
06BA D4D0       2650           CALL    DATCHK
06BC B804       2651           MOV     R0,#4
06BE D4D2       2652           CALL    DATCHK+2
06C0 748F       2653           CALL    CNTLRS  ; RESET COMM. I.C.
06C2 83         2654           RET
                2655
06C3 C7         2656 CFAIL1:   MOV     A,PSW
06C4 0307       2657           ADD     A,#7    ; MODULO 8 DECREMENT OF STACK POINTER
06C6 D7         2658           MOV     PSW,A
06C7 B82A       2659 CFAIL:    MOV     R0,#TESTR
06C9 F0         2660           MOV     A,@R0
06CA 4304       2661           ORL     A,#04H  ; SET 'CTEST FAILED' FLAG
06CC A0         2662           MOV     @R0,A
06CD 748F       2663           CALL    CNTLRS  ; RESET COMM. I.C.
06CF 83         2664           RET
                2665
                2666 ; SUBROUTINE DATCHK ****************************************
```

```
06D0 B800    2667 DATCHK: MOV   R0,#0    ; R0 POINTS TO BYTE 1 OF 'A' S/R
06D2 BF04    2668         MOV   R7,#4    ; INIT. BYTE COUNTER
06D4 B905    2669         MOV   R1,#5    ; INIT. TEST DATA POINTER
             2670
06D6 80      2671 LC008:  MOVX  A,@R0    ; READ NEXT BYTE OUT OF S/R
06D7 D1      2672         XRL   A,@R1    ;   & COMPARE WITH THE EXPECTED VALUE
06D8 96C3    2673         JNZ   CFAIL1
06DA 18      2674         INC   R0       ; ADJUST R0 TO POINT TO NEXT BYTE
06DB C9      2675         DEC   R1       ; ADJUST R1 TO POINT TO NEXT EXPECTED BYTE
06DC EFD6    2676         DJNZ  R7,LC008 ; REPEAT UNTIL ALL 4 BYTES OF S/R ARE CHECKED
             2677
06DE 83      2678         RET
             2679 ; END OF DATCHK ***********************************
             2680
             2681
             2682 ;*** END OF COMICT ***
             2683 $EJECT
             2684
             2685 ;         NAME          DIGICT
             2686
             2687 ;
             2688 ;
             2689 ;
             2690
             2691 ; DIGICT -- CHECKS DIGITAL PER-LINE CUSTOM I.C.'S
             2692
0700         2693         ORG   700H
             2694 DIGICT:
             2695 ; INITIALIZE 'TEST FAILED' BITS FOR DIGITAL PER-LINE CUSTOM I.C.
0700 B82C    2696         MOV   R0,#TESTRD
0702 F0      2697         MOV   A,@R0
0703 5F      2698         ANL   A,R7     ; INITIALIZE LINE CKT'S 'TESTRD' BIT
0704 A0      2699         MOV   @R0,A
             2700
0705 B82B    2701         MOV   R0,#TESTRC
0707 F0      2702         MOV   A,@R0
0708 5F      2703         ANL   A,R7     ; INITIALIZE LINE CKT'S 'TESTRC' BIT
0709 A0      2704         MOV   @R0,A
             2705
             2706 ; SET UP FOR DIGITAL I.C. STATUS REG. TEST
070A BC00    2707         MOV   R4,#WRDIG
070C BD80    2708         MOV   R5,#RDDIG
070E 85      2709         CLR   F0       ; DIG TEST--F0=0, CDR TEST--F0=1
             2710
070F BA02    2711 DIG1:   MOV   R2,#2    ; INIT. TEST COUNTER
0711 B84B    2712         MOV   R0,#(LOW DTDATA) ; INITIALIZE TEST DATA POINTER
             2713
             2714 ; LOAD TEST DATA INTO CUSTOM I.C.'S REG.
0713 FC      2715 DIG2:   MOV   A,R4
0714 9400    2716         CALL  XMIT4
0716 F8      2717         MOV   A,R0
0717 A3      2718         MOVP  A,@A     ; LOAD TEST DATA INTO CUSTOM I.C. REG.
0718 9406    2719         CALL  XMIT8
             2720
             2721 ; VERIFY THAT DATA WERE WRITTEN CORRECTLY
071A FD      2722         MOV   A,R5
```

```
071B 9400      2723           CALL    XMIT4
071D 941C      2724           CALL    RCV8
071F A9        2725           MOV     R1,A
0720 F8        2726           MOV     A,R0
0721 A3        2727           MOVP    A,@A
0722 D9        2728           XRL     A,R1     ; COMPARE READ DATA WITH TEST DATA
0723 C62F      2729           JZ      NXTDIG
               2730
               2731 $EJECT
               2732 ; DATA DO NOT MATCH -- ERROR DETECTED
0725 B92B      2733           MOV     R1,#TESTRC
0727 B62B      2734           JF0     CDRF
0729 B92C      2735           MOV     R1,#TESTRD
072B FF        2736 CDRF:     MOV     A,R7
072C 37        2737           CPL     A
072D 41        2738           ORL     A,@R1    ; SET BIT CORRESPONDING TO THIS LINE CKT.
072E A1        2739           MOV     @R1,A
               2740
               2741 NXTDIG:
072F 18        2742           INC     R0       ; ADJUST TEST DATA POINTER FOR NEXT TEST ITER.
0730 EA13      2743           DJNZ    R2,DIG2
               2744
0732 FC        2745           MOV     A,R4
0733 9400      2746           CALL    XMIT4
0735 23FF      2747           MOV     A,#ICODEC
0737 B63E      2748           JF0     CINIT
0739 2330      2749           MOV     A,#LCST1
073B 6E        2750           ADD     A,R6
073C A9        2751           MOV     R1,A
073D F1        2752           MOV     A,@R1
               2753
073E 9406      2754 CINIT:    CALL    XMIT8    ; RESORE CONTENTS OF REGISTER
               2755
0740 B64A      2756           JF0     DIGEND   ; HAS CDR TEST BEEN PERFORMED?
               2757
               2758 ; SET UP FOR CDR TEST
0742 BC20      2759           MOV     R4,#WRCDRC
0744 BDA0      2760           MOV     R5,#RDCDR
0746 85        2761           CLR     F0
0747 95        2762           CPL     F0       ; SET F0 (INDICATES CDR TEST PHASE)
0748 E40F      2763           JMP     DIG1
               2764
               2765 ; DIGITAL I.C. TEST COMPLETED
074A 83        2766 DIGEND:   RET
               2767
               2768 ; DIGITAL I.C. TEST DATA
               2769 ;++++++++++++++++++++++++++++++++++++++++
074B 63        2770 DTDATA:   DB      063H     ; TEST DATA BYTE 1
074C 9C        2771           DB      09CH     ;  "    "    "  2
               2772 ;++++++++++++++++++++++++++++++++++++++++
               2773
               2774 ;*** END OF DIGICT ***
               2775 $EJECT
               2776
               2777 ;         NAME             ANAICT
               2778
```

```
                2779 ;
                2780 ;
                2781 ;
                2782
                2783 ; ANAICT -- CHECKS ANALOG PER-LINE CUSTOM I.C.'S
                2784
                2785 ANAICT:
                2786 ; RESET LINE CKT'S 'TESTRA' BIT
074D B92D       2787         MOV     R0,#TESTRA
074F F0         2788         MOV     A,@R0
0750 5F         2789         ANL     A,R7
0751 A0         2790         MOV     @R0,A
                2791
0752 B934       2792         MOV     R0,#(LOW ATDATA) ; INITIALIZE TEST DATA POINTER
0754 BA02       2793         MOV     R2,#2            ; INITIALIZE TEST DATA COUNTER
                2794
                2795 ; LOAD TEST DATA INTO ANALOG I.C.'S REG
0756 2340       2796 ANA3:   MOV     A,#WRANA
0758 9400       2797         CALL    XMIT4
075A BC03       2798         MOV     R4,#3  ; INIT. BYTE COUNTER
                2799
075C F8         2800 ANA35:  MOV     A,R0
075D A3         2801         MOVP    A,@A   ; FETCH NEXT TEST DATA BYTE
075E 9406       2802         CALL    XMIT8  ; LOAD NEXT BYTE OF TEST DATA INTO ANA. REG
0760 18         2803         INC     R0     ; INCREMENT TEST DATA POINTER
0761 EC5C       2804         DJNZ    R4,ANA35
                2805
                2806 ; VERIFY THAT DATA WERE WRITTEN CORRECTLY
0763 C8         2807         DEC     R0
0764 C8         2808         DEC     R0
0765 C8         2809         DEC     R0
0766 23C0       2810         MOV     A,#RDANA
0768 9400       2811         CALL    XMIT4
                2812
076A BC03       2813         MOV     R4,#3  ; INIT. BYTE COUNTER
                2814
076C 941C       2815 ANA4:   CALL    RCV8   ; VERIFY NEXT BYTE
076E A9         2816         MOV     R1,A
076F F8         2817         MOV     A,R0
0770 A3         2818         MOVP    A,@A
0771 D9         2819         XRL     A,R1
0772 18         2820         INC     R0
0773 967C       2821         JNZ     ANAF
0775 EC6C       2822         DJNZ    R4,ANA4
                2823
0777 EA56       2824         DJNZ    R2,ANA3
                2825
                2826 $EJECT
                2827 ANA5:
                2828 ; TEST COMPLETED----RELOAD ANALOG REG. WITH DATA STORED IN RAM
0779 3492       2829         CALL    LDGAIN
077B 83         2830         RET
                2831
                2832 ANAF:
                2833 ; ERROR WAS DETECTED
077C B92D       2834         MOV     R0,#TESTRA
```

```
077E FF      2835           MOV    A,R7
077F 37      2836           CPL    A
0780 40      2837           ORL    A,@R0     ; SET 'ANA I.C. FAILS' FLAG
0781 A0      2838           MOV    @R0,A
0782 E479    2839           JMP    ANA5
             2840
             2841 ; ANALOG I.C. TEST DATA
             2842 ;++++++++++++++++++++++++++++++++++++++++++++++++++++++++
0784 63      2843 ATDATA: DB     063H, 0C1H, 0F8H   ; TEST DATA TRIPLET 1
0785 C1
0786 F8
0787 9C      2844           DB     09CH, 03EH, 007H   ;  "    "    "    2
0788 3E
0789 07
             2845 ;++++++++++++++++++++++++++++++++++++++++++++++++++++++++
             2846
             2847 ;*** END OF ANAICT ***
             2848 $EJECT
             2849
             2850 ;       NAME         RAMT
             2851
             2852 ;
             2853 ;
             2854 ;
             2855
             2856 ; RAMT -- CHECKS 8049'S DATA MEMORY
             2857
             2858 RAMT:
             2859 ; LOAD DATA MEMORY WITH TEST PATTERN 1 (EVEN BYTES=55H, ODD BYTES=AAH)
078A B87F    2860           MOV    R0,#LSTBYT
078C 23AA    2861           MOV    A,#0AAH
078E A0      2862 RAMT1:    MOV    @R0,A
078F 37      2863           CPL    A
0790 E88E    2864           DJNZ   R0,RAMT1
             2865
             2866 ; VERIFY TEST PATTERN 1
0792 B87F    2867           MOV    R0,#LSTBYT       ; (7FH IN THE 8049)
0794 B93F    2868           MOV    R1,#(LSTBYT-1)/2 ; (3FH)
0796 F0      2869 RAMT2:    MOV    A,@R0
0797 D3AA    2870           XRL    A,#0AAH
0799 96C4    2871           JNZ    RAMF
079B C8      2872           DEC    R0
079C F0      2873           MOV    A,@R0
079D D355    2874           XRL    A,#55H
079F 96C4    2875           JNZ    RAMF
07A1 C8      2876           DEC    R0
07A2 E996    2877           DJNZ   R1,RAMT2
             2878
             2879 ; LOAD DATA MEMORY WITH TEST PATTERN 2 (EVEN BYTES=AAH, ODD BYTES=55H)
07A4 B87F    2880           MOV    R0,#LSTBYT
07A6 2355    2881           MOV    A,#55H
07A8 A0      2882 RAMT3:    MOV    @R0,A
07A9 37      2883           CPL    A
07AA E8A8    2884           DJNZ   R0,RAMT3
             2885
             2886 $EJECT
```

```
                        2887 ; VERIFY TEST PATTERN 2
07AC B87F               2888        MOV     R0,#LSTBYT       , (7FH)
07AE B93F               2889        MOV     R1,#(LSTBYT-1)/2 , (3FH)
07B0 F0                 2890 RAMT4: MOV     A,@R0
07B1 D355               2891        XRL     A,#55H
07B3 96C4               2892        JNZ     RAMF
07B5 C8                 2893        DEC     R0
07B6 F0                 2894        MOV     A,@R0
07B7 D3AA               2895        XRL     A,#0AAH
07B9 96C4               2896        JNZ     RAMF
07BB C8                 2897        DEC     R0
07BC E9B0               2898        DJNZ    R1,RAMT4
                        2899
                        2900 ; RAM TEST PASSED----CLEAR 'RAM TEST FAILED' BIT OF 'TESTR'
07BE B82A               2901        MOV     R0,#TESTR
07C0 B000               2902        MOV     @R0,#0   ; RESET 'TEST RESULTS' BYTE
                        2903
                        2904 ; RETURN TO SLFTST
07C2 C402               2905        JMP     RAMRET  , RAM TEST ROUTINE'S RETURN ADDRESS
                        2906
                        2907 RAMF:
                        2908 ; RAM TEST FAILED----SET 'RAM TEST FAILED' BIT OF 'TESTR'
07C4 B82A               2909        MOV     R0,#TESTR
07C6 B001               2910        MOV     @R0,#01H         ; SET 'RAM TEST FAILED' BIT
                        2911
                        2912 ; RETURN TO SLFTST
07C8 C402               2913        JMP     RAMRET
                        2914
                        2915 ;*** END OF RAMT ***
                        2916 $EJECT
                        2917
                        2918 ;      NAME            GETROM
                        2919
                        2920 ;
                        2921 ;
                        2922 ;
                        2923
                        2924 ; GETROM -- FETCH BYTE OF PROGRAM MEMORY
                        2925
                        2926 ;      R2 = PAGE ADDRESS (0 - 7)
                        2927 ;      R3 = BYTE ADDRESS (0 TO 0FFH)
                        2928
07DD                    2929        ORG     7DDH
                        2930 GETROM:
07DD FA                 2931        MOV     A,R2     ; FETCH PAGE ADDRESS
07DE 5307               2932        ANL     A,#7
07E0 03E3               2933        ADD     A,#(LOW ROMTBL)
07E2 B3                 2934        JMPP    @A
                        2935
                        2936 ROMTBL:
                        2937 ; PROGRAM MEMORY PAGE JUMP TABLE
07E3 EB                 2938        DB      (LOW ($+8))
07E4 ED                 2939        DB      (LOW ($+9))
07E5 EF                 2940        DB      (LOW ($+10))
07E6 F1                 2941        DB      (LOW ($+11))
07E7 F3                 2942        DB      (LOW ($+12))
```

```
07E8 F5          2943          DB      (LOW ($+13))
07E9 F7          2944          DB      (LOW ($+14))
07EA F9          2945          DB      (LOW RDPG7)
                 2946
                 2947          JMP     RDPG0
07EB 04FD        2947          JMP     RDPG0
07ED 24FD        2948          JMP     RDPG1
07EF 44FD        2949          JMP     RDPG2
07F1 64FD        2950          JMP     RDPG3
07F3 84FD        2951          JMP     RDPG4
07F5 A4FD        2952          JMP     RDPG5
07F7 C4FD        2953          JMP     RDPG6
07F9 FB          2954 RDPG7:   MOV     A,R3    ; FETCH BYTE ADDRESS
07FA A3          2955          MOVP    A,@A    ; FETCH ROM DATA BYTE
07FB 83          2956          RET
                 2957
                 2958 ;++++++++++++++++++++++++
                 2959 ; ROM TEST CHECKSUM BYTE
07FC 00          2960          DB      0
                 2961 ;++++++++++++++++++++++++
                 2962 $EJECT
                 2963 ; ROMT----PAGE 0
00FD             2964          ORG     0FDH
00FD FB          2965 RDPG0:   MOV     A,R3    ; FETCH BYTE ADDRESS
00FE A3          2966          MOVP    A,@A    ; FETCH ROM DATA BYTE
00FF 83          2967          RET
                 2968
                 2969 ; ROMT----PAGE 1
01FD             2970          ORG     1FDH
01FD FB          2971 RDPG1:   MOV     A,R3
01FE A3          2972          MOVP    A,@A
01FF 83          2973          RET
                 2974
                 2975 ; ROMT----PAGE 2
02FD             2976          ORG     2FDH
02FD FB          2977 RDPG2:   MOV     A,R3
02FE A3          2978          MOVP    A,@A
02FF 83          2979          RET
                 2980
                 2981 ; ROMT----PAGE 3
03FD             2982          ORG     3FDH
03FD FB          2983 RDPG3:   MOV     A,R3
03FE A3          2984          MOVP    A,@A
03FF 83          2985          RET
                 2986
                 2987 ; ROMT----PAGE 4
04FD             2988          ORG     4FDH
04FD FB          2989 RDPG4:   MOV     A,R3
04FE A3          2990          MOVP    A,@A
04FF 83          2991          RET
                 2992
                 2993 ; ROMT----PAGE 5
05FD             2994          ORG     5FDH
05FD FB          2995 RDPG5:   MOV     A,R3
05FE A3          2996          MOVP    A,@A
05FF 83          2997          RET
                 2998
```

```
2999 , ROMT---PAGE 6
06FD            3000            ORG     6FDH
06FD F8         3001 RDF06:     MOV     A,R3
06FE A3         3002            MOVP    A,@A
06FF 83         3003            RET
                3004
                3005 ;*** END OF GETROM ***
                3006 $EJECT
```

What is claimed is:

1. A rate conversion arrangement for interfacing first and second time-division multiplex lines each operating at a first data rate to a time-division multiplexed bus operating at a second data rate, said second data rate being a multiple of said first data rate, each of said lines carrying a plurality of frame organized PCM channels each frame having a first number of channels, each of said channels comprising a predetermined number of data bits, said arrangement comprising:

first memory means for storing data bits;
second memory means for storing data bits;
first receiving means for receiving first data bits from said first line at said first data rate;
second receiving means for receiving second data bits from said second line at said first data rate;
first storing means for storing said first data bits in said first memory means;
second storing means for storing said second data bits in said second memory means;
first reading means for reading said stored first data bits for one channel from said memory means;
second reading means for reading said stored second data bits for another channel from said second memory means;
means for transmitting said read first data bits and said read second data bits over said bus at said second data rate,
said read first data bits for said one channel and said read second data bits for said another channel being transmitted in a predetermined sequence; and
second means for receiving data bits at said second rate from said bus and for transmitting data bits from first predetermined channels of said bus in sequential channels of said first line at said first data rate and for transmitting data bits from other predetermined channels of said bus in sequential channels of said second line at said first data rate.

2. An arrangement in accordance with claim 1, wherein said second means comprises:
third memory means for storing data bits;
fourth memory means for storing data bits;
third receiving means coupled to said bus receiving third data bits from said first predetermined channels at said second rate;
fourth receiving means coupled to said bus for receiving fourth data bits from said other predetermined channels at said second rate;
third storing means for storing said received third data bits in said third memory means;
fourth storing means for storing said received fourth data bits in said fourth memory means;
third reading means for reading said stored third data bits from said third memory means;
fourth reading means for reading said stored fourth data bits from said fourth memory means;
third transmitting means for transmitting said read third data bits over said first line at said first data rate; and
fourth transmitting means for transmitting said read fourth data bits over said second line.

3. An arrangement in accordance with claim 1, wherein predetermined ones of said frames received on said first and second lines include one or more bits of first predetermined information, said arrangement comprising means for extracting said one or more bits of predetermined information.

4. An arrangement in accordance with claim 2, further comprising:
means for inserting one or more bits of second predetermined information in predetermined ones of said frames on said first line; and
means for inserting one or more bits of second predetermined information in predetermined ones of said frames on said second line.

5. An arrangement in accordance with claim 4, wherein predetermined onees of said frames received on said first and second lines include one or more bits of first predetermined information, said arrangement comprising means for extracting said one or more bits of predetermined information.

6. An arrangement in accordance with claim 4, wherein said second predetermined information comprises common channel or signalling information.

7. An arrangement in accordance with claims 3, 4, or 5, wherein said first predetermined information comprises common channel or signalling information.

8. A rate conversion arrangement comprising:
first and second time-division multiplex lines, each operating at a first data rate, each of said lines carrying a first plurality of frame organized first channels, each frame of said first plurality of frames having a plurality of first channels, each of said first channels comprising a first predetermined number of data bits,
a time-division multiplexed bus operating at a second data rate, said second data rate being a multiple of said first data rate,
said bus carrying a second plurality of frame organized channels, each frame of said second plurality of frames having a plurality of second channels, each of said second channels comprising a second predetermined number of data bits;
first memory means coupled to said bus for storing second channel data bits;
second memory means coupled to said bus for storing second channel data bits;
first storing means coupled to said first memory means for causing said first memory means to store second channel data bits from first predetermined ones of said second channels;
second storing means coupled to said second memory means for causing said second memory means to store second channel data bits from other predetermined ones of said second channels;

first means for reading said second channel data bits stored in said first memory means and for transmitting said data bits from said first memory over said first line at said first rate; and second means for reading said second channel data bits stored in said second memory means and for transmitting said data bits from said second memory over said second line at said first rate.

9. An arrangement in accordance with claim 8, wherein said second data rate is greater than twice said first data rate.

10. An arrangement in accordance with claim 9, wherein the number of said first channels in each frame of said first plurality of frames is "n"; and the number of second channels in each frame of said second plurality of frames is "2n".

11. An arrangement in accordance with claim 10, wherein each frame of said second plurality of frames further comprises one or more additional channels for carrying other information.

12. An arrangement in accordance with claim 11, further comprising:

clocking means for controlling said first and second memory means such that data bits of said one or more additional channels are not stored in said first and second memory means.

13. An arrangement in accordance with claim 8, further comprising: third memory means coupled to said first line for storing said first channel data bits;

fourth memory means coupled to said second line for storing said first channel data bits;

third storing means coupled to said third memory means for causing said third memory means to store first channel data bits from said first line at said first data rate;

fourth storing means coupled to said fourth memory means for causing said fourth memory means to store first channel data bits from said second line at said first data rate; and third reading means for reading said stored first channel data bits from said third and fourth memory means and for transmitting said stored first channel data bits in a predetermined sequence at said second data rate over said bus.

14. An arrangement in accordance with claim 13, wherein said predetermined sequence comprises transmitting said stored first channel data bits from said third memory means in alternate ones of said second channels and transmitting said stored first channel data bits from said fourth memory means in intermediate ones of said second channel.

* * * * *